US012669790B2

(12) United States Patent
Park et al.

(10) Patent No.: US 12,669,790 B2
(45) Date of Patent: Jun. 30, 2026

(54) BUILDING MANAGEMENT SYSTEM WITH NESTED STREAM GENERATION

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vaidhyanathan Venkiteswaran, Brookfield, WI (US); Erik S. Paulson, Madison, WI (US); Vijaya S. Chennupati, Brookfield, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 0 days.

(21) Appl. No.: 18/747,298

(22) Filed: Jun. 18, 2024

(65) Prior Publication Data

US 2024/0338002 A1      Oct. 10, 2024

Related U.S. Application Data

(63) Continuation of application No. 17/856,353, filed on Jul. 1, 2022, now Pat. No. 12,055,908, which is a
(Continued)

(51) Int. Cl.
*G06F 7/02*       (2006.01)
*G05B 15/02*       (2006.01)
(Continued)

(52) U.S. Cl.
CPC ........... *G05B 19/042* (2013.01); *G05B 15/02* (2013.01); *G05B 23/0264* (2013.01);
(Continued)

(58) Field of Classification Search
CPC .. G05B 19/042; G05B 15/02; G05B 23/0264; G05B 2219/24024; G05B 2219/25011;
(Continued)

(56) References Cited

U.S. PATENT DOCUMENTS

| | | |
|---|---|---|
| 5,177,420 A | 1/1993 | Wada et al. |
| 5,301,109 A | 4/1994 | Landauer et al. |
| (Continued) | | |

FOREIGN PATENT DOCUMENTS

| | | |
|---|---|---|
| AU | 2019226217 A1 | 11/2020 |
| AU | 2019226264 A1 | 11/2020 |
| (Continued) | | |

OTHER PUBLICATIONS

Balaji et al, "Brick: Metadata schema for portable smart building applications," Applied Energy, 2018 (20 pages).
(Continued)

*Primary Examiner* — Bruce M Moser
(74) *Attorney, Agent, or Firm* — Foley & Lardner LLP

(57) ABSTRACT

A building management system (BMS) includes building equipment configured to provide samples of one or more data points in the building management system and a timeseries service. The timeseries service is configured to identify a first timeseries processing workflow that uses an input timeseries as an input and defines processing operations to be applied to the samples of the input timeseries, perform the processing operations defined by the first timeseries processing workflow to generate a first derived timeseries comprising a first set of derived timeseries samples, identify a second timeseries processing workflow that uses the first derived timeseries as an input and defines processing operations to be applied to the samples of the first derived timeseries, and perform the processing operations defined by the second timeseries processing workflow to
(Continued)

generate a second derived timeseries comprising a second set of derived timeseries samples.

20 Claims, 18 Drawing Sheets

Related U.S. Application Data continuation of application No. 16/567,534, filed on Sep. 11, 2019, now Pat. No. 11,378,926, which is a continuation of application No. 16/142,943, filed on Sep. 26, 2018, now Pat. No. 10,452,043, which is a continuation-in-part of application No. 15/644,560, filed on Jul. 7, 2017, now Pat. No. 10,417,245, and a continuation-in-part of application No. 15/644,581, filed on Jul. 7, 2017, now Pat. No. 10,169,486, and a continuation-in-part of application No. 15/644,519, filed on Jul. 7, 2017, now Pat. No. 10,095,756.

(60) Provisional application No. 62/612,228, filed on Dec. 29, 2017, provisional application No. 62/564,247, filed on Sep. 27, 2017, provisional application No. 62/457,654, filed on Feb. 10, 2017.

(51) Int. Cl.

| | |
|---|---|
| *G05B 19/042* | (2006.01) |
| *G05B 23/02* | (2006.01) |
| *G06F 16/00* | (2019.01) |
| *G06F 16/2458* | (2019.01) |
| *G06F 16/25* | (2019.01) |
| *G06F 16/901* | (2019.01) |

(52) U.S. Cl.
CPC ........ *G06F 16/2474* (2019.01); *G06F 16/258* (2019.01); *G06F 16/9024* (2019.01); *G05B 2219/24024* (2013.01); *G05B 2219/25011* (2013.01); *G05B 2219/2614* (2013.01)

(58) Field of Classification Search
CPC ........... G05B 2219/2614; G06F 16/258; G06F 16/2474; G06F 16/9024
See application file for complete search history.

(56) References Cited

U.S. PATENT DOCUMENTS

| | | | |
|---|---|---|---|
| 5,446,677 A | 8/1995 | Jensen et al. |
| 5,581,478 A | 12/1996 | Cruse et al. |
| 5,659,593 A | 8/1997 | Tzvieli |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,609,132 B1 | 8/2003 | White et al. |
| 6,626,366 B2 | 9/2003 | Kayahara et al. |
| 6,645,780 B1 | 11/2003 | Sonderman et al. |
| 6,646,660 B1 | 11/2003 | Patty |
| 6,704,016 B1 | 3/2004 | Oliver et al. |

| | | | |
|---|---|---|---|
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,405,854 B2 * | 8/2016 | Jerzak .............. G06F 16/24524 |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,015,069 B1 | 7/2018 | Blank |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,297 B2 * | 1/2019 | Stewart ................. G06F 9/5094 |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,599,478 B1 | 3/2020 | Ghare et al. |
| 10,649,424 B2 | 5/2020 | Nixon et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,838,782 B2 | 11/2020 | Liongosari |

(56)                References Cited

U.S. PATENT DOCUMENTS

| | | |
|---|---|---|
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0198228 A1 | 9/2005 | Bajwa et al. |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0208693 A1 | 9/2007 | Chang et al. |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0063678 A1 | 3/2009 | Maegawa et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0152878 A1 | 6/2010 | Chu et al. |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0004578 A1 | 1/2011 | Momma et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0005220 A1 | 1/2012 | Schindlauer et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086010 A1 | 4/2013 | Wenzel et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0205155 A1 | 7/2014 | Chung et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0313032 A1 | 10/2014 | Sager et al. |
| 2014/0325292 A1 | 10/2014 | Spivey et al. |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0148961 A1 | 5/2015 | Kim et al. |
| 2015/0156031 A1 | 6/2015 | Fadell et al. |
| 2015/0160953 A1 | 6/2015 | Kienle |
| 2015/0168931 A1 | 6/2015 | Jin |
| 2015/0172300 A1 | 6/2015 | Cochenour |
| 2015/0178421 A1 | 6/2015 | Borrelli et al. |

(56) References Cited

U.S. PATENT DOCUMENTS

| | | |
|---|---|---|
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316902 A1 | 11/2015 | Wenzel et al. |
| 2015/0316907 A1 | 11/2015 | Elbsat et al. |
| 2015/0316918 A1 | 11/2015 | Schleiss et al. |
| 2015/0323948 A1 | 11/2015 | Jeong et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0023960 A1 | 1/2016 | Goodwin |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1* | 8/2016 | Song .................... G06Q 10/20 |
| 2016/0260063 A1 | 9/2016 | Harris et al. |
| 2016/0277374 A1 | 9/2016 | Reid et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0342906 A1 | 11/2016 | Shaashua et al. |
| 2016/0350364 A1 | 12/2016 | Anicic et al. |
| 2016/0357169 A1 | 12/2016 | Di Cairano et al. |
| 2016/0357521 A1* | 12/2016 | Zhang ...................... G06F 8/34 |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1* | 2/2017 | Warner ............ G06Q 10/06312 |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0118240 A1 | 4/2017 | Devi Reddy et al. |
| 2017/0123389 A1* | 5/2017 | Baez ....................... H04W 4/70 |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0198932 A1 | 7/2017 | Sato et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0286572 A1 | 10/2017 | Hershey et al. |
| 2017/0294132 A1 | 10/2017 | Colmenares |
| 2017/0315522 A1 | 11/2017 | Kwon et al. |
| 2017/0315697 A1* | 11/2017 | Jacobson .............. H04L 12/281 |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0075038 A1* | 3/2018 | Azvine ................... G06F 16/22 |
| 2018/0114140 A1 | 4/2018 | Chen et al. |
| 2018/0121248 A1 | 5/2018 | Delaney et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0232423 A1 | 8/2018 | Park et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1* | 3/2019 | Xie .................... H04L 12/2829 |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0351116 A1 | 11/2020 | Jetzfellner |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |

(56) References Cited

U.S. PATENT DOCUMENTS

| | | |
|---|---|---|
| 2021/0044957 A1 | 2/2021 | Norp et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0214555 A1 | 7/2023 | Harvey et al. |
| 2023/0252205 A1 | 8/2023 | Harvey et al. |
| 2023/0334200 A1 | 10/2023 | Meiners |

FOREIGN PATENT DOCUMENTS

| | | |
|---|---|---|
| CN | 101206673 A | 6/2008 |
| CN | 101248984 A | 8/2008 |
| CN | 101415011 A | 4/2009 |
| CN | 101478848 A | 7/2009 |
| CN | 102004859 A | 4/2011 |
| CN | 102136099 A | 7/2011 |
| CN | 102136100 A | 7/2011 |
| CN | 102201065 A | 9/2011 |
| CN | 102650876 A | 8/2012 |
| CN | 103069444 A | 4/2013 |
| CN | 104040583 A | 9/2014 |
| CN | 104603832 A | 5/2015 |
| CN | 104731896 A | 6/2015 |
| CN | 104919484 A | 9/2015 |
| CN | 105591583 A | 5/2016 |
| CN | 105659263 A | 6/2016 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2002-056054 A | 2/2002 |
| JP | 2003-162573 A | 6/2003 |
| JP | 2005-050098 A | 2/2005 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2008/043082 A2 | 4/2008 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2016/020953 A1 | 2/2016 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al, "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema for Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema for Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

Chan, Y.F. et al., "Efficient Implementation of PID Control Algorithm Using FPGA Technology," Department of Electrical & Computer Engineering, University of Western Ontario, London, Ontario, Canada, 43rd IEEE Conference on Decision and Control, Dec. 14-17, 2004, pp. 4885-4890.

Chinese Notice of Allowance on CN Appl. No. 201780089444.9 dated May 24, 2023 (25 pages with English language translation).

Chinese Office Action on CN Appl. No. 201780089444.9 dated Feb. 17, 2022 (67 pages with English language translation).

Chinese Office Action on CN Appl. No. 201780089444.9 dated Nov. 4, 2022 (75 pages with English language translation).

Chinese Office Action on CN Appl. Ser. No. 201780003995.9 dated Apr. 8, 2021 (21 pages with English language translation).

Chinese Office action on CN Appl. Ser. No. 201780043400.2 dated Apr. 25, 2021 (15 pages with English language translation).

Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).

(56) References Cited

OTHER PUBLICATIONS

Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Meng et al., "Design and Implementation of EPCglobal Application Level Events Engine," Computer Engineering, Jun. 20, 2008, vol. 34, No. 12 (pp. 248, 249, 253 with English language abstract).
Nissin Electric Co., Ltd., "Smart power supply system (SPSS)," Outline of the scale verification plan, Nissin Electric Technical Report, Japan, Apr. 23, 2014, vol. 59, No. 1 (23 pages with English language abstract).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Search Report and Written Opinion for Singapore Patent App. No. 11201907381U dated Oct. 7, 2020, 9 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).

(56)            References Cited

OTHER PUBLICATIONS

Sinha, Sudhi, "Making Big Data Work For Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3c, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

Written Opinion for Singapore Application No. 11201907381U, dated Sep. 20, 2021, 6 pages.

Zhou, Q. et al., "Knowledge-infused and Consistent Complex Event Processing over Real-time and Persistent Streams," Further Generation Computer Systems, 2017, 76 (pp. 391-406).

* cited by examiner

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 4 | 12:00 | 15:59 | Hot |
| 5 | 16:00 | 18:59 | Warm |
| 6 | 19:00 | 21:59 | Cool |
| 7 | 22:00 | 23:59 | Cold |

| Timestamp | OAT | State |
|---|---|---|
| 00:00 | 43 | Cold |
| 01:00 | 48 | Cold |
| 02:00 | 51 | Cool |
| 03:00 | 54 | Cool |
| 04:00 | 57 | Cool |
| 05:00 | 60 | Cool |
| 06:00 | 65 | Cool |
| 07:00 | 69 | Cool |
| 08:00 | 76 | Cool |
| 09:00 | 83 | Warm |
| 10:00 | 94 | Warm |
| 11:00 | 99 | Warm |
| 12:00 | 108 | Hot |
| 13:00 | 110 | Hot |
| 14:00 | 110 | Hot |
| 15:00 | 106 | Hot |
| 16:00 | 98 | Warm |
| 17:00 | 91 | Warm |
| 18:00 | 81 | Warm |
| 19:00 | 74 | Cool |
| 20:00 | 65 | Cool |
| 21:00 | 54 | Cool |
| 22:00 | 48 | Cold |
| 23:00 | 44 | Cold |

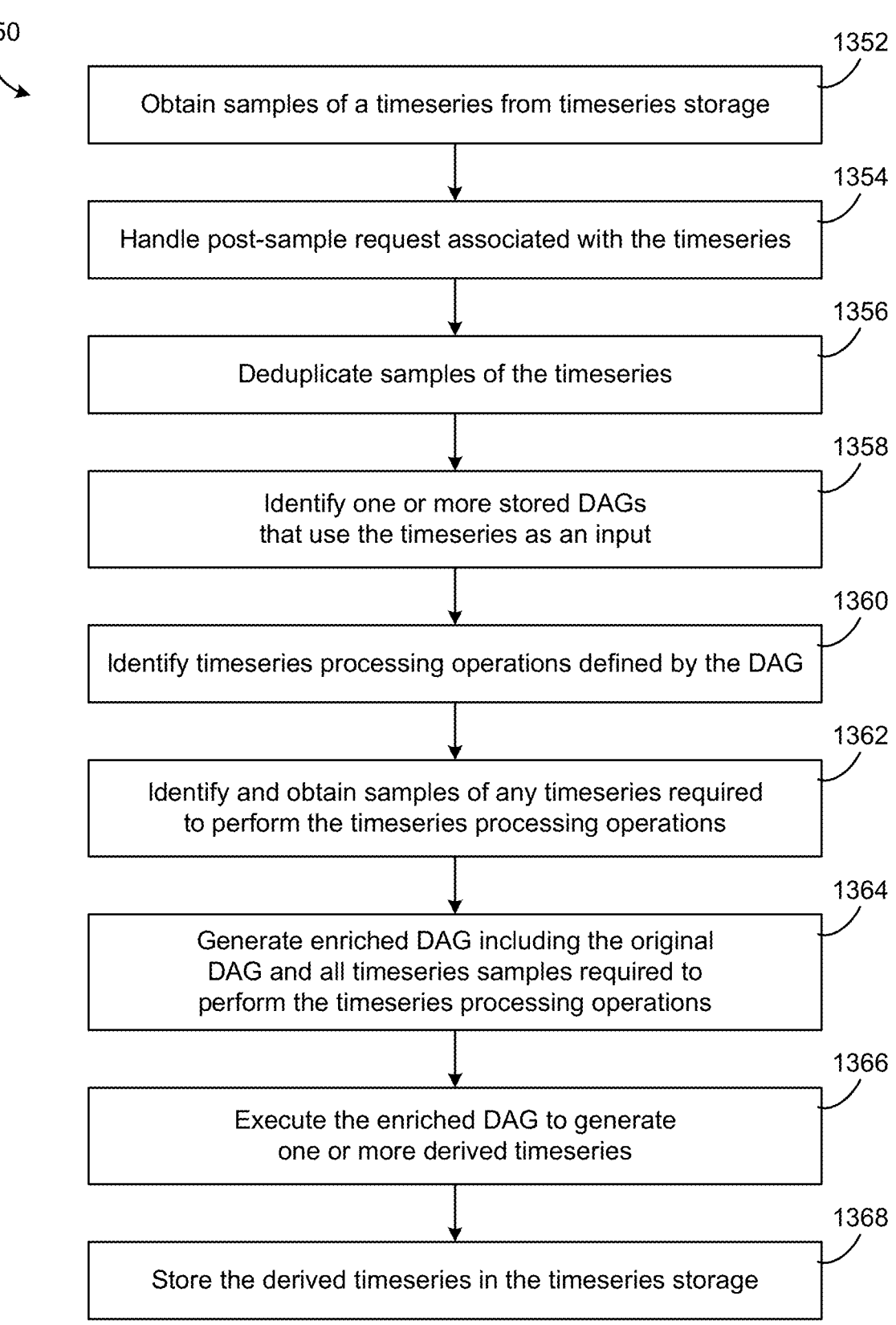

1350

1352
Obtain samples of a timeseries from timeseries storage

1354
Handle post-sample request associated with the timeseries

1356
Deduplicate samples of the timeseries

1358
Identify one or more stored DAGs
that use the timeseries as an input

1360
Identify timeseries processing operations defined by the DAG

1362
Identify and obtain samples of any timeseries required
to perform the timeseries processing operations 1364
Generate enriched DAG including the original
DAG and all timeseries samples required to
perform the timeseries processing operations 1366
Execute the enriched DAG to generate
one or more derived timeseries 1368
Store the derived timeseries in the timeseries storage

FIG. 13B

BUILDING MANAGEMENT SYSTEM WITH NESTED STREAM GENERATION

CROSS-REFERENCE TO RELATED PATENT APPLICATIONS

This application is a continuation of U.S. patent application Ser. No. 17/856,353 filed Jul. 1, 2022, which is a continuation of U.S. patent application Ser. No. 16/567,534 filed Sep. 11, 2019 (now U.S. Pat. No. 11,378,926) which is a continuation of U.S. patent application Ser. No. 16/142, 943 filed Sep. 26, 2018 (now U.S. Pat. No. 10,452,043). U.S. patent application Ser. No. 16/142,943 filed Sep. 26, 2018 (now U.S. Pat. No. 10,452,043) claims the benefit of and priority to U.S. Provisional Patent Application No. 62/564, 247 filed Sep. 27, 2017 and U.S. Provisional Patent Application No. 62/612,228 filed Dec. 29, 2017. U.S. patent application Ser. No. 16/142,943 filed Sep. 26, 2018 (now U.S. Pat. No. 10,452,043) is also a continuation-in-part of U.S. patent application Ser. No. 15/644,519 filed Jul. 7, 2017 (now U.S. Pat. No. 10,095,756), which claims the benefit of and priority to U.S. Provisional Patent Application No. 62/457,654 filed Feb. 10, 2017. U.S. patent application Ser. No. 16/142,943 filed Sep. 26, 2018 (now U.S. Pat. No. 10,452,043) is also a continuation-in-part of U.S. patent application Ser. No. 15/644,581 filed Jul. 7, 2017 (now U.S. Pat. No. 10,169,486), which claims the benefit of and priority to U.S. Provisional Patent Application No. 62/457, 654 filed Feb. 10, 2017. U.S. patent application Ser. No. 16/142,943 filed Sep. 26, 2018 (now U.S. Pat. No. 10,452, 043) is also a continuation-in-part of U.S. patent application Ser. No. 15/644,560 filed Jul. 7, 2017 (now U.S. Pat. No. 10,417,245), which claims the benefit of and priority to U.S. Provisional Patent Application No. 62/457,654 filed Feb. 10, 2017. The entire disclosure of each of these patent applications is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can collect data from sensors and other types of building equipment. Data can be collected over time and combined into streams of timeseries data. Each sample of the timeseries data can include a timestamp and a data value. Some BMSs store raw timeseries data in a relational database without significant organization or processing at the time of data collection. Applications that consume the timeseries data are typically responsible for retrieving the raw timeseries data from the database and generating views of the timeseries data that can be presented via a chart, graph, or other user interface. These processing steps are typically performed in response to a request for the timeseries data, which can significantly delay data presentation at query time.

SUMMARY

One implementation of the present disclosure is a building management system (BMS). The BMS includes building equipment, a data collector, a timeseries service, and a timeseries storage interface. The building equipment are configured to provide samples of one or more data points in the building management system. The data collector is configured to collect the samples from the building equipment and generate one or more input timeseries including a plurality of the samples. The timeseries service is configured to identify a first timeseries processing workflow that uses the input timeseries as an input and defines one or more processing operations to be applied to the samples of the input timeseries, perform the one or more processing operations defined by the first timeseries processing workflow to generate a first derived timeseries including a first set of derived timeseries samples, identify a second timeseries processing workflow that uses the first derived timeseries as an input and defines one or more processing operations to be applied to the samples of the first derived timeseries, and perform the one or more processing operations defined by the second timeseries processing workflow to generate a second derived timeseries including a second set of derived timeseries samples. The timeseries storage interface is configured to store the input timeseries and the first and second derived timeseries in a timeseries database.

In some embodiments, the building equipment include at least one of sensors, HVAC equipment lighting equipment, access control equipment, or security equipment.

In some embodiments, generating the first derived timeseries includes transforming one or more samples of the input timeseries into one or more samples of the first set of derived timeseries samples by applying the one or more samples of the input timeseries as an input to the first timeseries processing workflow and assembling the first set of derived timeseries samples to form the first derived timeseries.

In some embodiments, generating the second derived timeseries includes transforming one or more samples of the first set of derived timeseries samples into one or more samples of the second set of derived timeseries samples by applying the one or more samples of the first set of derived timeseries samples as an input to the second timeseries processing workflow and assembling the second set of derived timeseries samples to form the second derived timeseries.

In some embodiments, the timeseries service is configured to identify one or more other timeseries to be used as inputs to the first timeseries processing workflow and generate an enriched timeseries processing workflow comprising the first timeseries processing workflow, the input timeseries, and the one or more other timeseries.

In some embodiments, the BMS includes the timeseries database. The timeseries database can store a plurality of timeseries. In some embodiments, the timeseries service includes a timeseries identifier configured to identify the input timeseries or the first derived timeseries from the plurality of timeseries stored in the timeseries database.

In some embodiments, the BMS includes a directed acyclic graph (DAG) database storing a plurality of DAGs, each of the DAGs defining a timeseries processing workflow. In some embodiments, the timeseries service includes a DAG identifier configured to determine whether any of the DAGs stored in the DAG database use the input timeseries or the first derived timeseries as an input.

In some embodiments, upon generating a derived timeseries, the timeseries service is configured to (a) determine whether the derived timeseries is used as an input to any of a plurality of stored timeseries processing workflows and (b) in response to a determination that the derived timeseries is used as an input to at least one of the stored timeseries processing workflows, perform one or more processing operations defined by the timeseries processing workflows that use the derived timeseries as an input to generate another derived timeseries.

In some embodiments, the timeseries service is configured to iteratively repeat steps (a) and (b) until the derived timeseries generated in step (b) is not used as an input to any of the plurality of stored timeseries processing workflows.

In some embodiments, the timeseries database includes at least one of a local timeseries database within the building management system or a hosted timeseries database at a remote location relative to the building management system.

In some embodiments, the input timeseries is a timeseries of measurements obtained from a sensor and at least one of the first derived timeseries or the second derived timeseries is an abnormal event timeseries that indicates whether each of the measurements is normal or abnormal.

In some embodiments, the input timeseries is a timeseries of building access events obtained from a physical access control device associated with a building space and at least one of the first derived timeseries or the second derived timeseries is an abnormal event timeseries that indicates whether each of the access events is normal or abnormal.

Another implementation of the present disclosure is building management system (BMS) for managing timeseries data provided by building equipment. The BMS includes one or more computer-readable storage media having instructions stored thereon. When executed by one or more processors, the instructions cause the one or more processors to collect samples of the timeseries data from the building equipment and generate one or more input timeseries including a plurality of the samples, identify a first timeseries processing workflow that uses the input timeseries as an input and defines one or more processing operations to be applied to the samples of the input timeseries, perform the one or more processing operations defined by the first timeseries processing workflow to generate a first derived timeseries including a first set of derived timeseries samples, identify a second timeseries processing workflow that uses the first derived timeseries as an input and defines one or more processing operations to be applied to the samples of the first derived timeseries, perform the one or more processing operations defined by the second timeseries processing workflow to generate a second derived timeseries including a second set of derived timeseries samples, and store the input timeseries and the first and second derived timeseries in a timeseries database.

In some embodiments, the building equipment include at least one of sensors, HVAC equipment lighting equipment, access control equipment, or security equipment.

In some embodiments, generating the first derived timeseries includes transforming one or more samples of the input timeseries into one or more samples of the first set of derived timeseries samples by applying the one or more samples of the input timeseries as an input to the first timeseries processing workflow and assembling the first set of derived timeseries samples to form the first derived timeseries.

In some embodiments, generating the second derived timeseries includes transforming one or more samples of the first set of derived timeseries samples into one or more samples of the second set of derived timeseries samples by applying the one or more samples of the first set of derived timeseries samples as an input to the second timeseries processing workflow and assembling the second set of derived timeseries samples to form the second derived timeseries.

In some embodiments, the instructions cause the one or more processors to identify one or more other timeseries to be used as inputs to the first timeseries processing workflow and generate an enriched timeseries processing workflow comprising the first timeseries processing workflow, the input timeseries, and the one or more other timeseries.

In some embodiments, the BMS includes the timeseries database. The timeseries database can store a plurality of timeseries. In some embodiments, the instructions cause the one or more processors to identify the input timeseries or the first derived timeseries from the plurality of timeseries stored in the timeseries database.

In some embodiments, the BMS includes a directed acyclic graph (DAG) database storing a plurality of DAGs, each of the DAGs defining a timeseries processing workflow. In some embodiments, the instructions cause the one or more processors to determine whether any of the DAGs stored in the DAG database use the input timeseries or the first derived timeseries as an input.

In some embodiments, upon generating a derived timeseries, the instructions cause the one or more processors to (a) determine whether the derived timeseries is used as an input to any of a plurality of stored timeseries processing workflows and (b) in response to a determination that the derived timeseries is used as an input to at least one of the stored timeseries processing workflows, perform one or more processing operations defined by the timeseries processing workflows that use the derived timeseries as an input to generate another derived timeseries.

In some embodiments, the instructions cause the one or more processors to iteratively repeat steps (a) and (b) until the derived timeseries generated in step (b) is not used as an input to any of the plurality of stored timeseries processing workflows.

In some embodiments, the timeseries database includes at least one of a local timeseries database within the building management system or a hosted timeseries database at a remote location relative to the building management system.

In some embodiments, the input timeseries is a timeseries of measurements obtained from a sensor and at least one of the first derived timeseries or the second derived timeseries is an abnormal event timeseries that indicates whether each of the measurements is normal or abnormal.

In some embodiments, the input timeseries is a timeseries of building access events obtained from a physical access control device associated with a building space and at least one of the first derived timeseries or the second derived timeseries is an abnormal event timeseries that indicates whether each of the access events is normal or abnormal.

Another implementation of the present disclosure is a method for managing timeseries data provided by building equipment. The method includes collecting samples of the timeseries data from the building equipment and generating one or more input timeseries comprising a plurality of the samples, identifying a first timeseries processing workflow that uses the input timeseries as an input and defines one or more processing operations to be applied to the samples of the input timeseries, performing the one or more processing operations defined by the first timeseries processing workflow to generate a first derived timeseries comprising a first set of derived timeseries samples, identifying a second timeseries processing workflow that uses the first derived timeseries as an input and defines one or more processing operations to be applied to the samples of the first derived timeseries, performing the one or more processing operations defined by the second timeseries processing workflow to generate a second derived timeseries comprising a second set of derived timeseries samples, and storing the input timeseries and the first and second derived timeseries in a timeseries database.

In some embodiments, the building equipment includes at least one of sensors, HVAC equipment lighting equipment, access control equipment, or security equipment.

In some embodiments, generating the first derived timeseries includes transforming one or more samples of the input timeseries into one or more samples of the first set of derived timeseries samples by applying the one or more samples of the input timeseries as an input to the first timeseries processing workflow and assembling the first set of derived timeseries samples to form the first derived timeseries.

In some embodiments, generating the second derived timeseries includes transforming one or more samples of the first set of derived timeseries samples into one or more samples of the second set of derived timeseries samples by applying the one or more samples of the first set of derived timeseries samples as an input to the second timeseries processing workflow and assembling the second set of derived timeseries samples to form the second derived timeseries.

In some embodiments, the method includes identifying one or more other timeseries to be used as inputs to the first timeseries processing workflow and generating an enriched timeseries processing workflow comprising the first timeseries processing workflow, the input timeseries, and the one or more other timeseries.

In some embodiments, the timeseries database stores a plurality of timeseries. The method may include identifying the input timeseries or the first derived timeseries from the plurality of timeseries stored in the timeseries database.

In some embodiments, the method includes storing a plurality of directed acyclic graphs (DAG) in a DAG database, each of the DAGs defining a timeseries processing workflow. The method may include determining whether any of the DAGs stored in the DAG database use the input timeseries or the first derived timeseries as an input.

In some embodiments, the method includes, upon generating a derived timeseries (a) determining whether the derived timeseries is used as an input to any of a plurality of stored timeseries processing workflows and (b) in response to a determination that the derived timeseries is used as an input to at least one of the stored timeseries processing workflows, performing one or more processing operations defined by the timeseries processing workflows that use the derived timeseries as an input to generate another derived timeseries.

In some embodiments, the method includes iteratively repeating steps (a) and (b) until the derived timeseries generated in step (b) is not used as an input to any of the plurality of stored timeseries processing workflows.

In some embodiments, the timeseries database comprises at least one of a local timeseries database within the building management system or a hosted timeseries database at a remote location relative to the building management system.

In some embodiments, the input timeseries is a timeseries of measurements obtained from a sensor and at least one of the first derived timeseries or the second derived timeseries is an abnormal event timeseries that indicates whether each of the measurements is normal or abnormal.

In some embodiments, the input timeseries is a timeseries of building access events obtained from a physical access control device associated with a building space and at least one of the first derived timeseries or the second derived timeseries is an abnormal event timeseries that indicates whether each of the access events is normal or abnormal.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 13B is a flowchart of a process which can be performed by the workflow manager of FIG. 13A, according to some embodiments.

DETAILED DESCRIPTION

Overview

Figure 1:
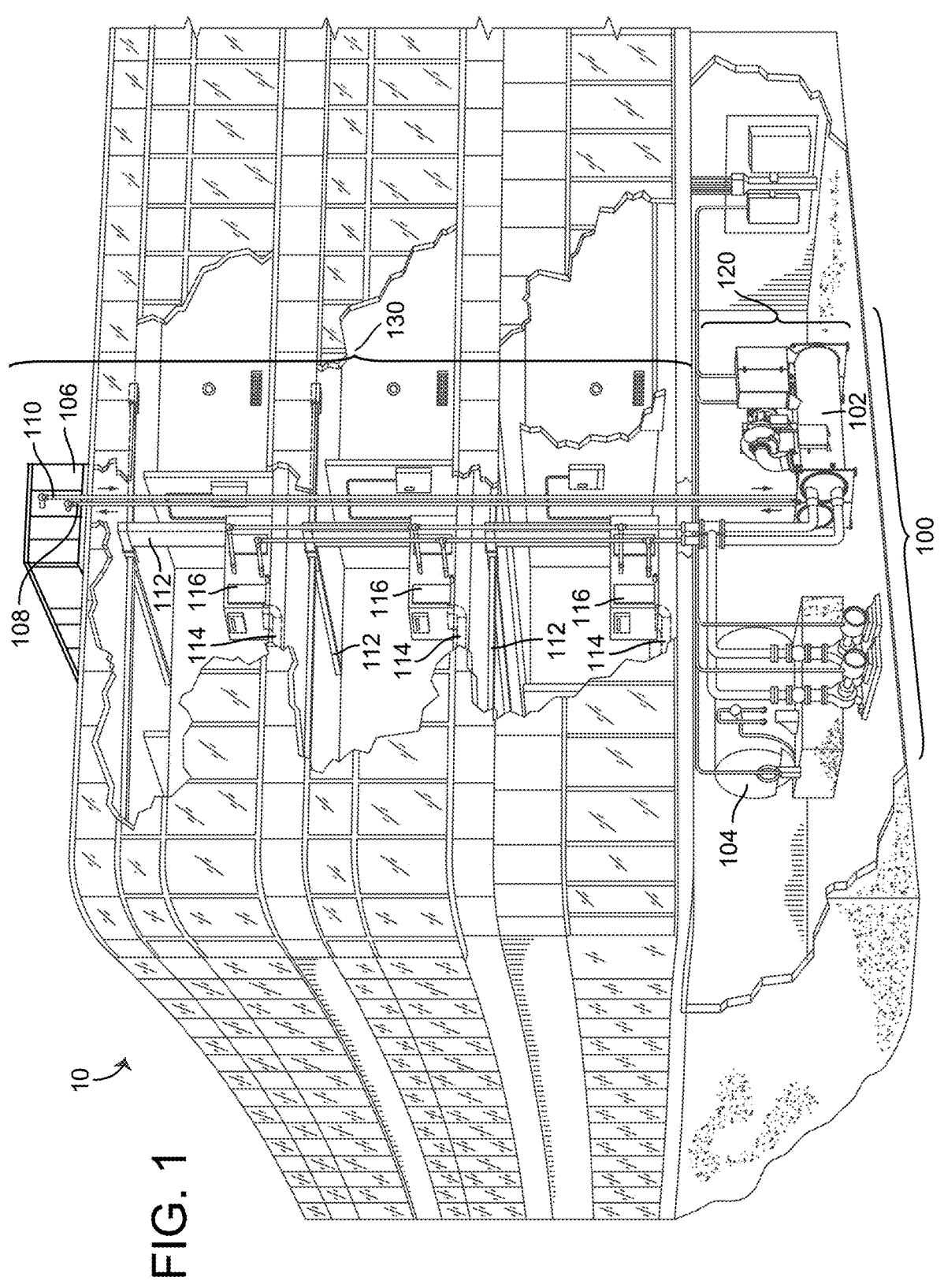
FIG. 1 is a drawing of a building equipped with a building management system (BMS) and a HVAC system, according to some embodiments.

Referring generally to the FIGURES, a building management system (BMS) with nested stream generation is shown, according to various embodiments. The BMS is configured to collect data samples from building equipment (e.g., sensors, controllable devices, building subsystems, etc.) and generate raw timeseries data from the data samples. The BMS can process the raw timeseries data using a variety of data platform services to generate derived timeseries data (e.g., data rollup timeseries, virtual point timeseries, fault detection timeseries, etc.). The derived timeseries data can be provided to various applications and/or stored in local or hosted storage. In some embodiments, the BMS includes three different layers that separate (1) data collection, (2) data storage, retrieval, and analysis, and (3) data visualization. This allows the BMS to support a variety of applications that use the derived timeseries data and allows new applications to reuse the infrastructure provided by the data platform services.

In some embodiments, the BMS includes a data collector configured to collect raw data samples from the building equipment. The data collector can generate a raw data timeseries including a plurality of the raw data samples and store the raw data timeseries in the timeseries database. In some embodiments, the data collector stores each of the raw data samples with a timestamp. The timestamp can include a local time indicating the time at which the raw data sample was collected in whichever time zone the raw data sample was collected. The timestamp can also include a time offset indicating a difference between the local time and universal time. The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs.

In some embodiments, the data platform services include a sample aggregator. The sample aggregator can aggregate predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by the data aggregator provide an efficient mechanism for various applications to query the timeseries data. For example, the applications can construct visualizations of the timeseries data (e.g., charts, graphs, etc.) using the pre-aggregated data rollups instead of the raw timeseries data. This allows the applications to simply retrieve and present the pre-aggregated data rollups without requiring applications to perform an aggregation in response to the query. Since the data rollups are pre-aggregated, the applications can present the data rollups quickly and efficiently without requiring additional processing at query time to generate aggregated timeseries values.

In some embodiments, the data platform services include a virtual point calculator. The virtual point calculator can calculate virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, the virtual point calculator can calculate a virtual data point ($pointID_3$) by adding two or more actual data points ($pointID_1$ and $pointID_2$) (e.g., $pointID_3=pointID_1+pointID_2$). As another example, the virtual point calculator can calculate an enthalpy data point ($pointID_4$) based on a measured temperature data point ($pointID_5$) and a measured pressure data point ($pointID_6$) (e.g., $pointID_4=enthalpy(pointID_5, pointID_6)$). The virtual data points can be stored as derived timeseries data.

Applications can access and use the virtual data points in the same manner as the actual data points. The applications do not need to know whether a data point is an actual data point or a virtual data point since both types of data points can be stored as derived timeseries data and can be handled in the same manner by the applications. In some embodiments, the derived timeseries data are stored with attributes designating each data point as either a virtual data point or an actual data point. Such attributes allow the applications to identify whether a given timeseries represents a virtual data point or an actual data point, even though both types of data points can be handled in the same manner by the applications.

In some embodiments, the data platform services include a fault detector configured to analyze the timeseries data to detect faults. Fault detection can be performed by applying a set of fault detection rules to the timeseries data to determine whether a fault is detected at each interval of the timeseries. Fault detections can be stored as derived timeseries data. For example, new timeseries can be generated with data values that indicate whether a fault was detected at each interval of the timeseries. The time series of fault detections can be stored along with the raw timeseries data and/or derived timeseries data in local or hosted data storage. These and other features of the building management system are described in greater detail below.

Building Management System and HVAC System

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
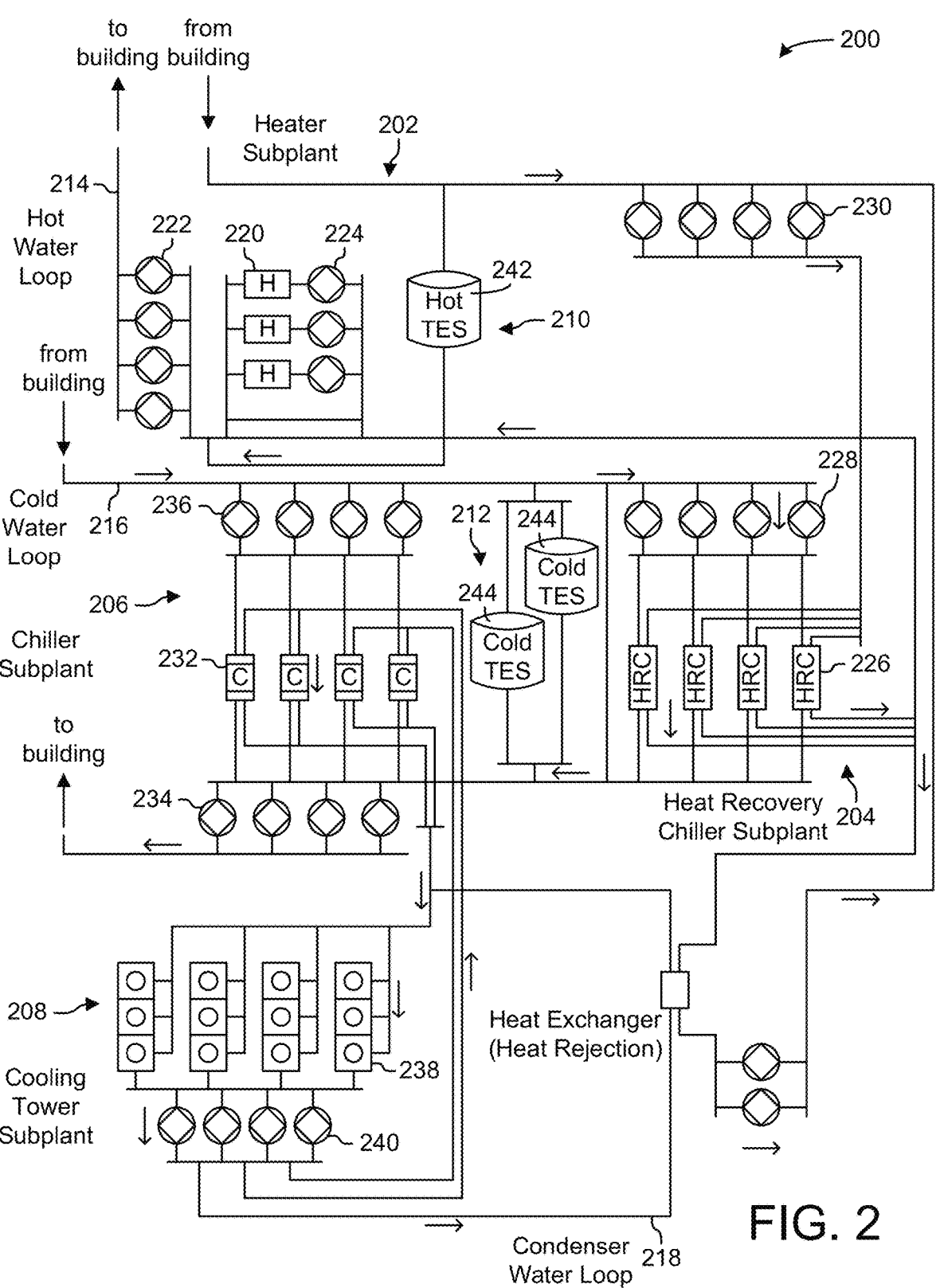
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
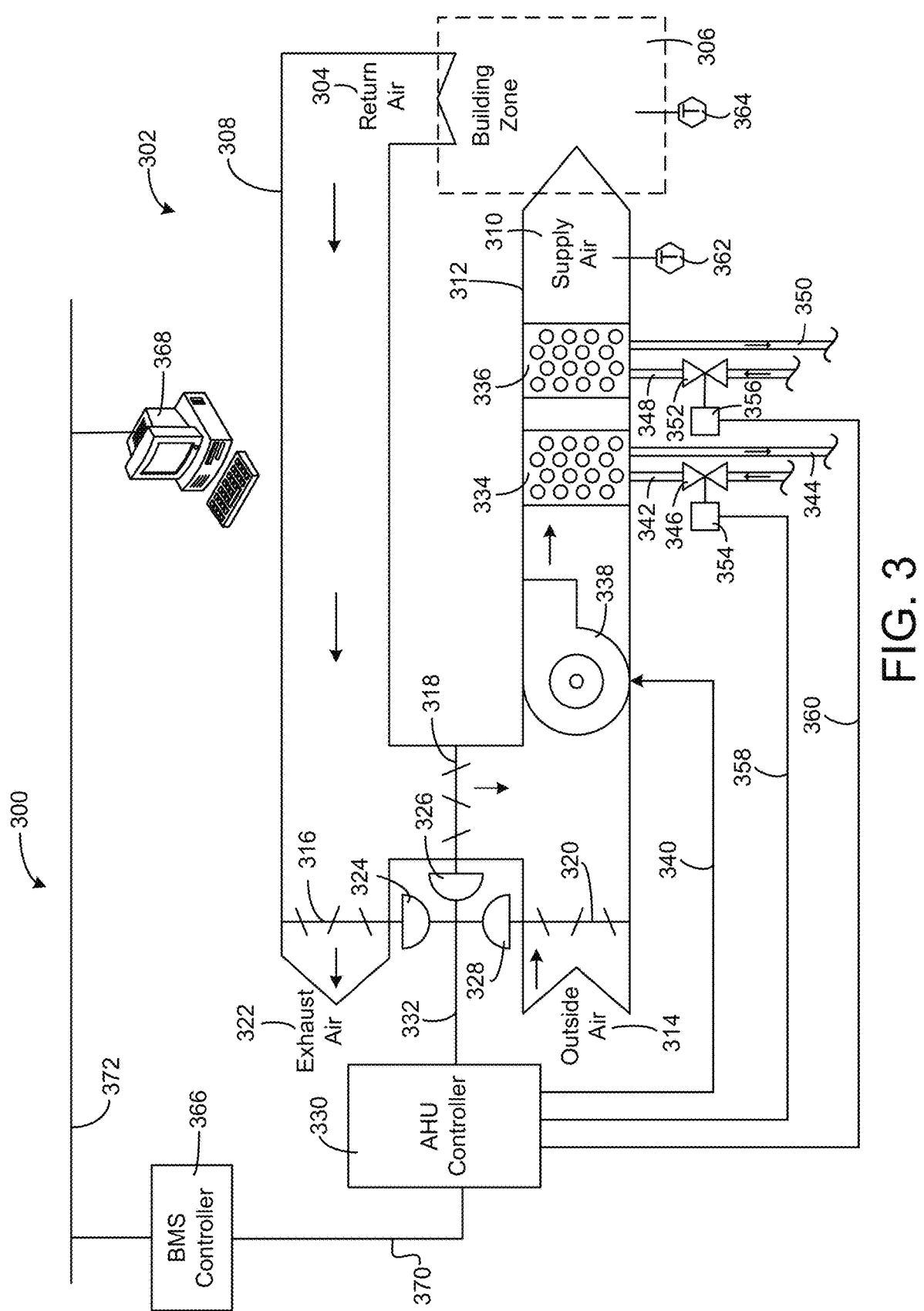
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller

330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
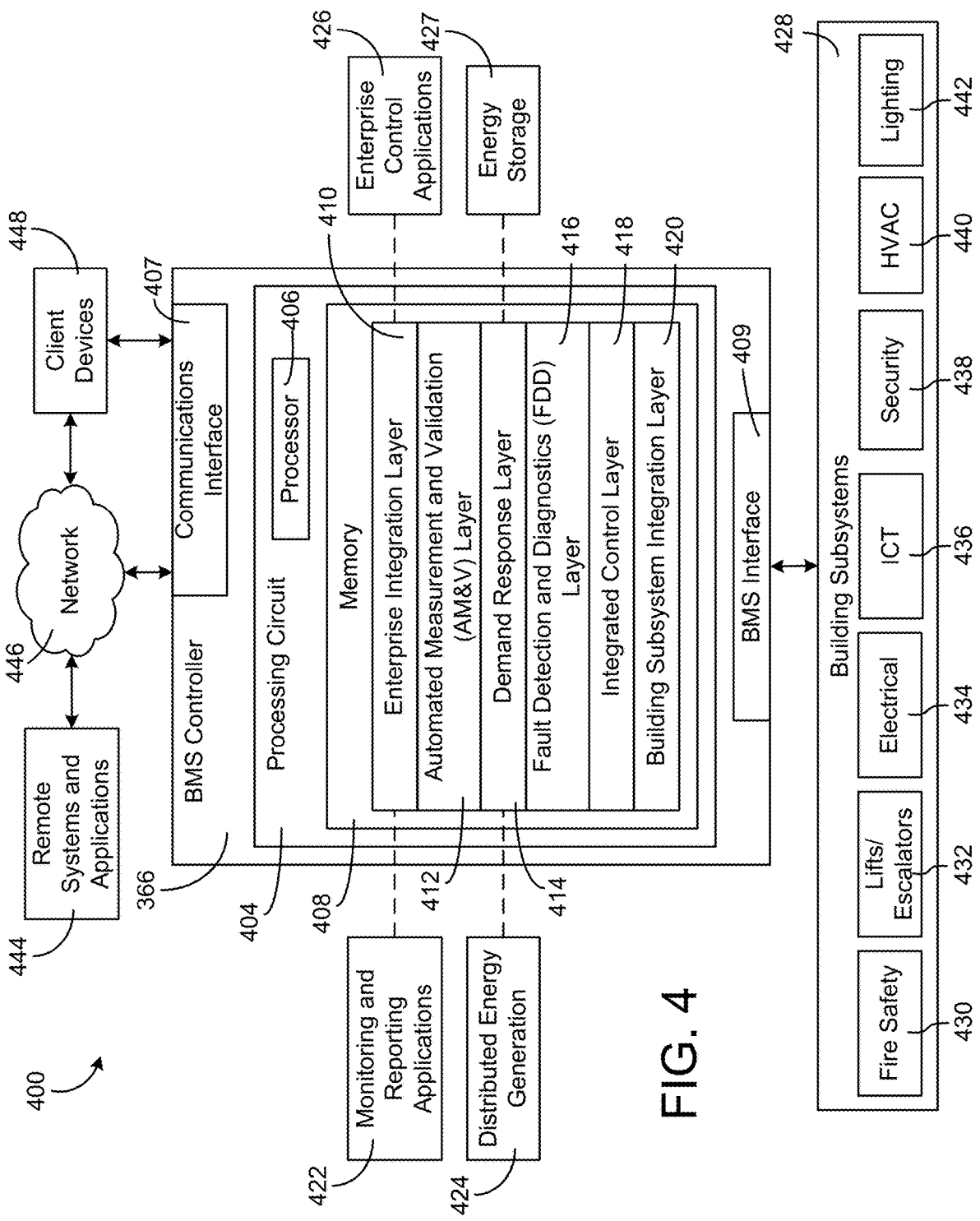
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translates communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System With Data Platform Services

Figure 5:
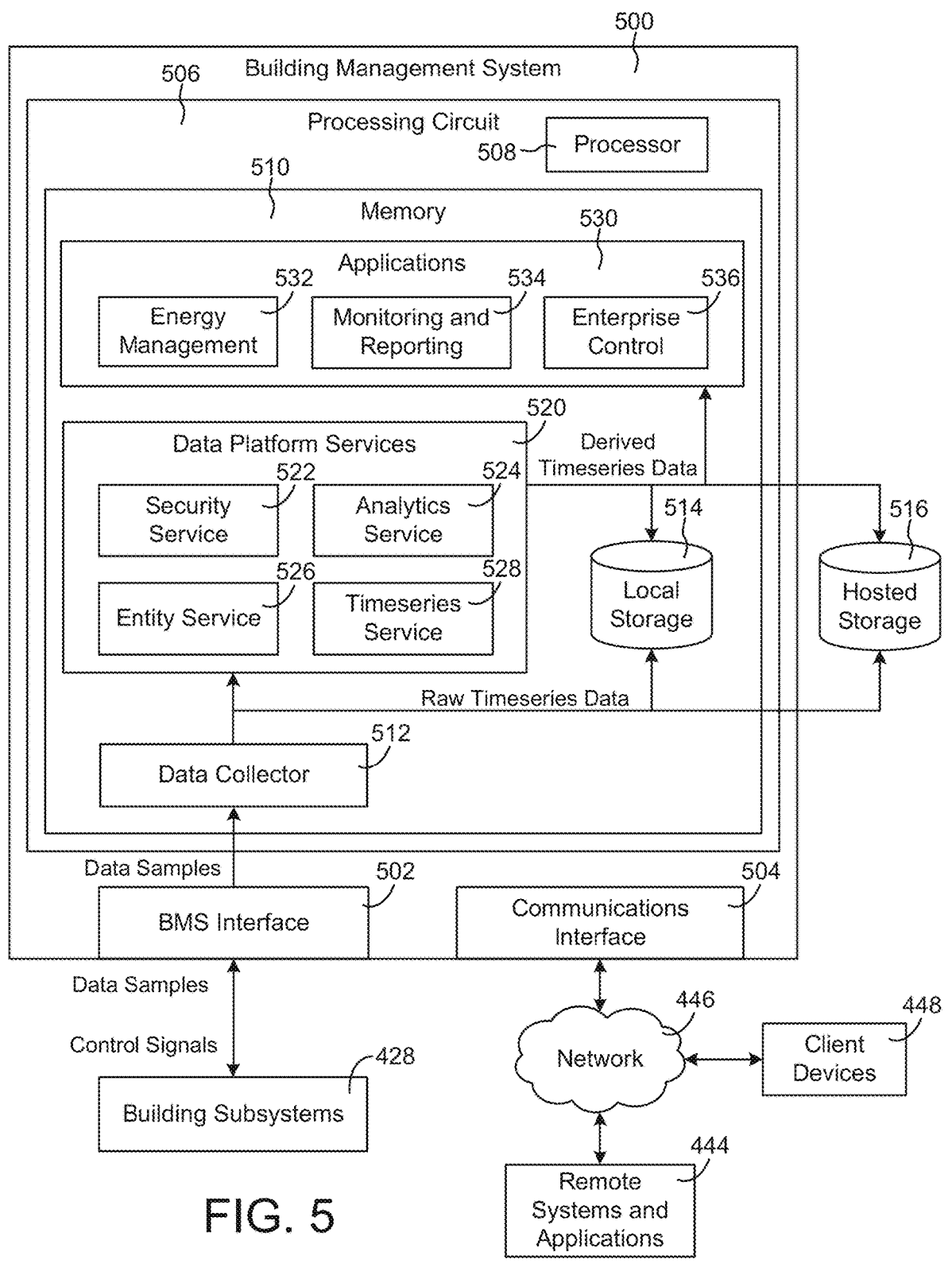
FIG. 5 is a block diagram of another BMS which can be used in the building of FIG. 1, including a data collector, data platform services, applications, and a dashboard layout generator, according to some embodiments.

Referring now to FIG. 5, a block diagram of another building management system (BMS) 500 is shown, according to some embodiments. BMS 500 can be configured to collect data samples from building subsystems 428 and generate raw timeseries data from the data samples. BMS 500 can process and transform the raw timeseries data using data platform services 520 to generate derived timeseries data. Throughout this disclosure, the term "derived time-series data" is used to describe the result or output of a transformation or other timeseries processing operation performed by data platform services 520 (e.g., data aggregation, data cleansing, virtual point calculation, etc.). The derived timeseries data can be provided to various applications 530 and/or stored in local storage 514 or hosted storage 516 (e.g., as materialized views of the raw timeseries data). In some embodiments, BMS 500 separates data collection; data storage, retrieval, and analysis; and data visualization into three different layers. This allows BMS 500 to support a variety of applications 530 that use the derived timeseries data and allows new applications 530 to reuse the existing infrastructure provided by data platform services 520.

Before discussing BMS 500 in greater detail, it should be noted that the components of BMS 500 can be integrated within a single device (e.g., a supervisory controller, a BMS controller, etc.) or distributed across multiple separate systems or devices. For example, the components of BMS 500 can be implemented as part of a METASYS® brand building automation system, as sold by Johnson Controls Inc. In other embodiments, some or all of the components of BMS 500 can be implemented as part of a cloud-based computing system configured to receive and process data from one or more building management systems. In other embodiments, some or all of the components of BMS 500 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building equipment.

BMS 500 can include many of the same components as BMS 400, as described with reference to FIG. 4. For example, BMS 500 is shown to include a BMS interface 502 and a communications interface 504. Interfaces 502-504 can include wired or wireless communications interfaces (e.g., jacks, antennas, transmitters, receivers, transceivers, wire terminals, etc.) for conducting data communications with building subsystems 428 or other external systems or devices. Communications conducted via interfaces 502-504 can be direct (e.g., local wired or wireless communications) or via a communications network 446 (e.g., a WAN, the Internet, a cellular network, etc.).

Communications interface 504 can facilitate communications between BMS 500 and external applications (e.g., remote systems and applications 444) for allowing user control, monitoring, and adjustment to BMS 500. Communications interface 504 can also facilitate communications between BMS 500 and client devices 448. BMS interface 502 can facilitate communications between BMS 500 and building subsystems 428. BMS 500 can be configured to communicate with building subsystems 428 using any of a variety of building automation systems protocols (e.g., BACnet, Modbus, ADX, etc.). In some embodiments, BMS 500 receives data samples from building subsystems 428 and provides control signals to building subsystems 428 via BMS interface 502.

Building subsystems 428 can include building electrical subsystem 434, information communication technology (ICT) subsystem 436, security subsystem 438, HVAC subsystem 440, lighting subsystem 442, lift/escalators subsystem 432, and/or fire safety subsystem 430, as described with reference to FIG. 4. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3. Each of building subsystems 428 can include any number of devices, controllers, and connections for completing its individual functions and control activities. Building subsystems 428 can include building equipment (e.g., sensors, air handling units, chillers, pumps, valves, etc.) configured to monitor and control a building condition such as temperature, humidity, airflow, etc.

Still referring to FIG. 5, BMS 500 is shown to include a processing circuit 506 including a processor 508 and memory 510. Processor 508 can be a general purpose or specific purpose processor, an application specific integrated circuit (ASIC), one or more field programmable gate arrays (FPGAs), a group of processing components, or other suitable processing components. Processor 508 is configured to execute computer code or instructions stored in memory 510 or received from other computer readable media (e.g., CDROM, network storage, a remote server, etc.).

Memory 510 can include one or more devices (e.g., memory units, memory devices, storage devices, etc.) for storing data and/or computer code for completing and/or facilitating the various processes described in the present disclosure. Memory 510 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to processor 508 via processing circuit 506 and can include computer code for executing (e.g., by processor 508) one or more processes described herein. When processor 508 executes instructions stored in memory 510, processor 508 generally configures processing circuit 506 to complete such activities.

Still referring to FIG. 5, BMS 500 is shown to include a data collector 512. Data collector 512 is shown receiving data samples from building subsystems 428 via BMS interface 502. In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 512 can receive data samples from multiple different devices within building subsystems 428.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 500. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 512 adds timestamps to the data samples based on the times at which the data samples are received. Data collector 512 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 512 is as follows:

$$[ < key, timestamp_1, value_1 >, < key, timestamp_2,$$

$$value_2 >, < key, timestamp_3, value_3 >]$$

where key is an identifier of the source of the raw data samples (e.g., timeseries ID, sensor ID, etc.), $timestamp_i$ identifies the time at which the ith sample was collected, and $value_i$ indicates the value of the ith sample.

Data collector 512 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 512 organizes the raw timeseries data. Data collector 512 can identify a system or device associated with each of the data points. For example, data collector 512 can associate a data point with a temperature sensor, an air handler, a chiller, or any other type of system or device. In various embodiments, data collector uses the name of the data point, a range of values of the data point, statistical characteristics of the data point, or other attributes of the data point to identify a particular system or device associated with the data point. Data collector 512 can then determine how that system or device relates to the other systems or devices in the building site. For example, data collector 512 can determine that the identified system or device is part of a larger system (e.g., a HVAC system) or serves a particular space (e.g., a particular building, a room or zone of the building, etc.). In some embodiments, data collector 512 uses or creates an entity graph when organizing the timeseries data. An example of such an entity graph is described in greater detail with reference to FIG. 10A.

Data collector 512 can provide the raw timeseries data to data platform services 520 and/or store the raw timeseries data in local storage 514 or hosted storage 516. As shown in FIG. 5, local storage 514 can be data storage internal to BMS 500 (e.g., within memory 510) or other on-site data storage local to the building site at which the data samples are collected. Hosted storage 516 can include a remote database, cloud-based data hosting, or other remote data storage. For example, hosted storage 516 can include remote data storage located off-site relative to the building site at which the data samples are collected. Local storage 514 and hosted storage 516 can be configured to store the raw timeseries data obtained by data collector 512, the derived timeseries data generated by data platform services 520, and/or directed acyclic graphs (DAGs) used by data platform services 520 to process the timeseries data.

Still referring to FIG. 5, BMS 500 is shown to include data platform services 520. Data platform services 520 can receive the raw timeseries data from data collector 512 and/or retrieve the raw timeseries data from local storage 514 or hosted storage 516. Data platform services 520 can include a variety of services configured to analyze, process, and transform the raw timeseries data. For example, data platform services 520 are shown to include a security service 522, an analytics service 524, an entity service 526, and a timeseries service 528. Security service 522 can assign security attributes to the raw timeseries data to ensure that the timeseries data are only accessible to authorized individuals, systems, or applications. Entity service 524 can assign entity information to the timeseries data to associate data points with a particular system, device, or space. Timeseries service 528 and analytics service 524 can apply various transformations, operations, or other functions to the raw timeseries data to generate derived timeseries data.

In some embodiments, timeseries service 528 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 528 provide an efficient mechanism for applications 530 to query the timeseries data. For example, applications 530 can construct visualizations of the timeseries data (e.g., charts, graphs, etc.) using the pre-aggregated data rollups instead of the raw timeseries data. This allows applications 530 to simply retrieve and present the pre-aggregated data rollups without requiring applications 530 to perform an aggregation in response to the query. Since the data rollups are pre-aggregated, applications 530 can present the data rollups quickly and efficiently without requiring additional processing at query time to generate aggregated timeseries values.

In some embodiments, timeseries service 528 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 528 can calculate a virtual data point (pointID$_3$) by adding two or more actual data points (pointID$_1$ and pointID$_2$) (e.g., pointID$_3$=pointID$_1$+pointID$_2$). As another example, timeseries service 528 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$). The virtual data points can be stored as derived timeseries data.

Applications 530 can access and use the virtual data points in the same manner as the actual data points. Applications 530 do not need to know whether a data point is an actual data point or a virtual data point since both types of data points can be stored as derived timeseries data and can be handled in the same manner by applications 530. In some embodiments, the derived timeseries are stored with attributes designating each data point as either a virtual data point or an actual data point. Such attributes allow applications 530 to identify whether a given timeseries represents a virtual data point or an actual data point, even though both types of data points can be handled in the same manner by applications 530. These and other features of timeseries service 528 are described in greater detail with reference to FIG. 6.

In some embodiments, analytics service 524 analyzes the raw timeseries data and/or the derived timeseries data to detect faults. Analytics service 524 can apply a set of fault detection rules to the timeseries data to determine whether a fault is detected at each interval of the timeseries. Fault detections can be stored as derived timeseries data. For example, analytics service 524 can generate a new fault detection timeseries with data values that indicate whether a fault was detected at each interval of the timeseries. An example of such a fault detection timeseries is described in greater detail with reference to FIG. 9B. The fault detection timeseries can be stored as derived timeseries data along with the raw timeseries data in local storage 514 or hosted storage 516.

Still referring to FIG. 5, BMS 500 is shown to include several applications 530 including an energy management application 532, monitoring and reporting applications 534, and enterprise control applications 536. Although only a few applications 530 are shown, it is contemplated that applications 530 can include any of a variety of applications configured to use the derived timeseries generated by data platform services 520. In some embodiments, applications 530 exist as a separate layer of BMS 500 (i.e., separate from data platform services 520 and data collector 512). This allows applications 530 to be isolated from the details of how the derived timeseries are generated. In other embodiments, applications 530 can exist as remote applications that run on remote systems or devices (e.g., remote systems and applications 444, client devices 448).

Applications 530 can use the derived timeseries data to perform a variety data visualization, monitoring, and/or control activities. For example, energy management application 532 and monitoring and reporting application 534 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point. Several examples of user interfaces that can be generated based on the derived timeseries data are described in U.S. patent application Ser. No. 15/182,579 filed Jun. 14, 2016, and U.S. Provisional Patent Application No. 62/446,284 filed Jan. 13, 2017. The entire disclosures of both these patent applications are incorporated by reference herein.

Enterprise control application 536 can use the derived timeseries data to perform various control activities. For example, enterprise control application 536 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 428. In some embodiments, building subsystems 428 use the control signals to operate building equipment. Operating the building equipment can affect the measured or calculated values of the data samples provided to BMS 500. Accordingly, enterprise control application 536 can use the derived timeseries data as feedback to control the systems and devices of building subsystems 428.

Timeseries Data Platform Service

Figure 6:
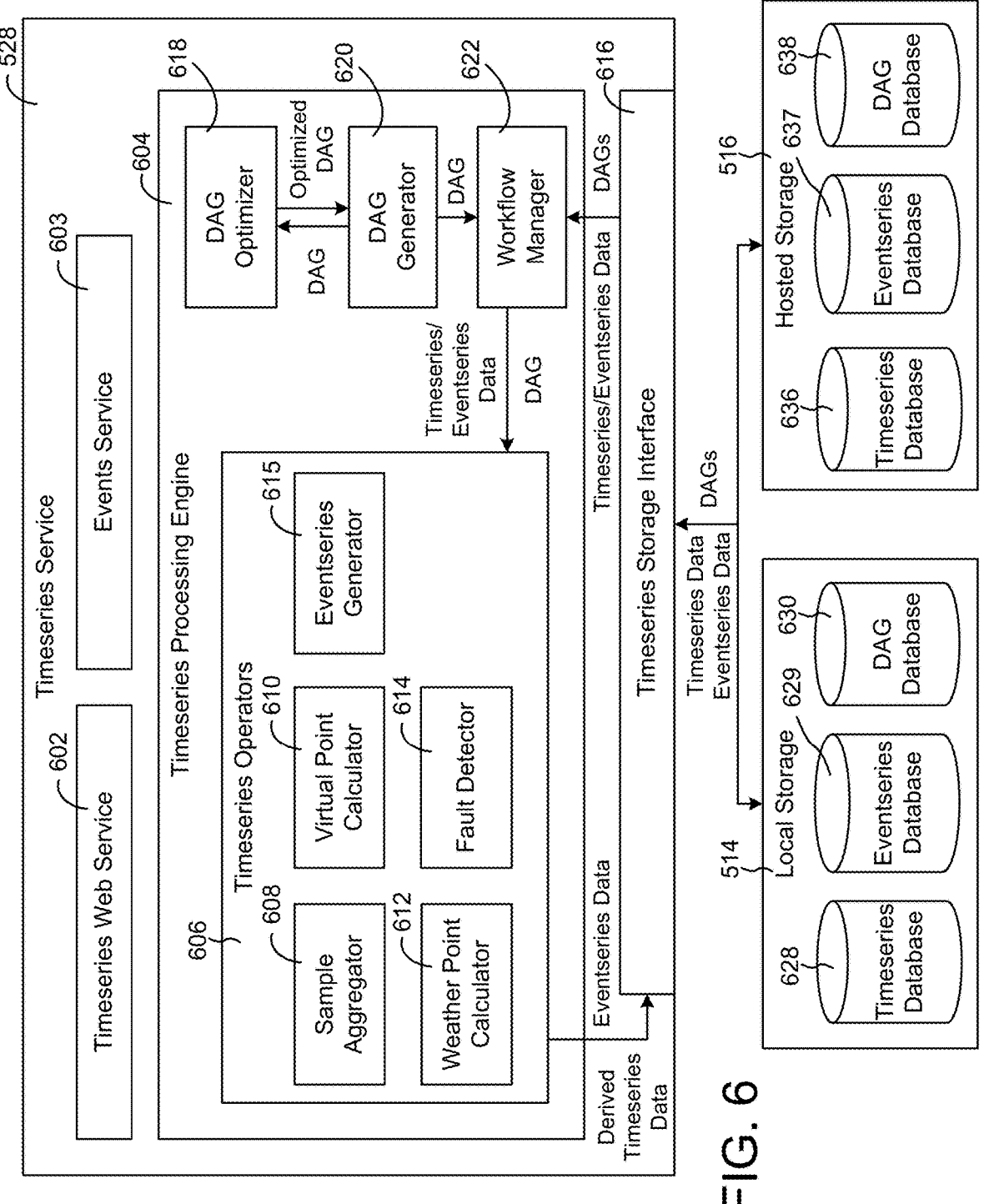
FIG. 6 is a block diagram of a timeseries service which can be implemented as some of the data platform services shown in FIG. 5, according to some embodiments.

Referring now to FIG. 6, a block diagram illustrating timeseries service 528 in greater detail is shown, according to some embodiments. Timeseries service 528 is shown to include a timeseries web service 602, an events service 603, a timeseries processing engine 604, and a timeseries storage interface 616. Timeseries web service 602 can be configured to interact with web-based applications to send and/or receive timeseries data. In some embodiments, timeseries web service 602 provides timeseries data to web-based applications. For example, if one or more of applications 530 are web-based applications, timeseries web service 602 can provide derived timeseries data and raw timeseries data to the web-based applications. In some embodiments, timeseries web service 602 receives raw timeseries data from a web-based data collector. For example, if data collector 512 is a web-based application, timeseries web service 602 can receive data samples or raw timeseries data from data collector 512.

Timeseries storage interface 616 can be configured to store and read samples of various timeseries (e.g., raw timeseries data and derived timeseries data) and eventseries (described in greater detail below). Timeseries storage interface 616 can interact with local storage 514 and/or hosted storage 516. For example, timeseries storage interface 616 can retrieve timeseries data from a local timeseries database 628 within local storage 514 or from a hosted timeseries database 636 within hosted storage 516. In some embodiments, timeseries storage interface 616 reads samples from a specified start time or start position in the timeseries to a specified stop time or a stop position in the timeseries. Similarly, timeseries storage interface 616 can retrieve eventseries data from a local eventseries database 629 within local storage 514 or from a hosted eventseries database 637 within hosted storage 516. Timeseries storage interface 616 can also store timeseries data in local timeseries database 628 or hosted timeseries database 636 and can store eventseries data in local eventseries database 629 or hosted eventseries database 637. Advantageously, timeseries storage interface 616 provides a consistent interface which enables logical data independence.

In some embodiments, timeseries storage interface 616 stores timeseries as lists of data samples, organized by time. For example, timeseries storage interface 616 can store timeseries in the following format:

[ < key, timestamp$_1$, value$_1$ >, < key, timestamp$_2$, value$_2$ >, < key, timestamp$_3$, value$_3$ >]

where key is an identifier of the source of the data samples (e.g., timeseries ID, sensor ID, etc.), timestamp$_i$ identifies a time associated with the ith sample, and value$_1$ indicates the value of the ith sample.

In some embodiments, timeseries storage interface 616 stores eventseries as lists of events having a start time, an end time, and a state. For example, timeseries storage interface 616 can store eventseries in the following format:

[ < eventID$_1$, start_timestamp$_1$, end_timestamp$_1$, state$_1$ >,

... , < eventID$_N$, start_timestamp$_N$, end_timestamp$_N$, state$_N$ >]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 616 stores timeseries and eventseries in a tabular format. Timeseries storage interface 616 can store timeseries and eventseries in various tables having a column for each attribute of the timeseries/eventseries samples (e.g., key, timestamp, value). The timeseries tables can be stored in local timeseries database 628 and/or hosted timeseries database 636, whereas the eventseries tables can be stored in local eventseries database 629 and/or hosted eventseries database 637. In some embodiments, timeseries storage interface 616 caches older data to local storage 514 or hosted storage 516 but stores newer data in RAM. This may improve read performance when the newer data are requested for processing.

In some embodiments, timeseries storage interface 616 omits one or more of the attributes when storing the timeseries samples. For example, timeseries storage interface 616 may not need to repeatedly store the key or timeseries ID for each sample in the timeseries. In some embodiments, timeseries storage interface 616 omits timestamps from one or more of the samples. If samples of a particular timeseries have timestamps at regular intervals (e.g., one sample each minute), timeseries storage interface 616 can organize the samples by timestamps and store the values of the samples in a row. The timestamp of the first sample can be stored along with the interval between the timestamps. Timeseries storage interface 616 can determine the timestamp of any sample in the row based on the timestamp of the first sample and the position of the sample in the row.

In some embodiments, timeseries storage interface 616 stores one or more samples with an attribute indicating a change in value relative to the previous sample value. The change in value can replace the actual value of the sample when the sample is stored in local timeseries database 628 or hosted timeseries database 636. This allows timeseries storage interface 616 to use fewer bits when storing samples and their corresponding values. Timeseries storage interface 616 can determine the value of any sample based on the value of the first sample and the change in value of each successive sample.

In some embodiments, timeseries storage interface 616 creates containers or data objects in which samples of timeseries data and/or eventseries data can be stored. The containers can be JSON objects or other types of containers configured to store one or more timeseries samples and/or eventseries samples. Timeseries storage interface 616 can be configured to add samples to the containers and read samples from the containers. For example, timeseries storage interface 616 can receive a set of samples from data collector 512, timeseries web service 602, events service 603, and/or timeseries processing engine 604. Timeseries storage interface 616 can add the set of samples to a container and send the container to local storage 514 or hosted storage 516.

Timeseries storage interface 616 can use containers when reading samples from local storage 514 or hosted storage 516. For example, timeseries storage interface 616 can retrieve a set of samples from local storage 514 or hosted storage 516 and add the samples to a container. In some embodiments, the set of samples include all samples within a specified time period (e.g., samples with timestamps in the specified time period) or eventseries samples having a specified state. Timeseries storage interface 616 can provide the container of samples to timeseries web service 602, events service 603, timeseries processing engine 604, applications 530, and/or other components configured to use the timeseries/eventseries samples.

Still referring to FIG. 6, timeseries processing engine 604 is shown to include several timeseries operators 606. Timeseries operators 606 can be configured to apply various operations, transformations, or functions to one or more input timeseries to generate output timeseries and/or eventseries. The input timeseries can include raw timeseries data and/or derived timeseries data. Timeseries operators 606 can be configured to calculate aggregate values, averages, or apply other mathematical operations to the input timeseries. In some embodiments, timeseries operators 606 generate virtual point timeseries by combining two or more input timeseries (e.g., adding the timeseries together), creating multiple output timeseries from a single input timeseries, or applying mathematical operations to the input timeseries. In some embodiments, timeseries operators 606 perform data cleansing operations or deduplication operations on an input timeseries. In some embodiments, timeseries operators 606 use the input timeseries to generate eventseries based on the values of the timeseries samples (described in greater detail below). The output timeseries can be stored as derived timeseries data in local storage 514 and/or hosted storage 516. Similarly, the eventseries can be stored as eventseries data in local storage 514 and/or hosted storage 516.

In some embodiments, timeseries operators 606 do not change or replace the raw timeseries data, but rather generate various "views" of the raw timeseries data. The views can be queried in the same manner as the raw timeseries data. For example, samples can be read from the raw timeseries data, transformed to create the view, and then provided as an output. Because the transformations used to create the views can be computationally expensive, the views can be stored as "materialized views" in local timeseries database 628 or hosted timeseries database 636. These materialized views are referred to as derived timeseries data throughout the present disclosure.

Timeseries operators 606 can be configured to run at query time (e.g., when a request for derived timeseries data is received) or prior to query time (e.g., when new raw data samples are received, in response to a defined event or trigger, etc.). This flexibility allows timeseries operators 606 to perform some or all of their operations ahead of time and/or in response to a request for specific derived data timeseries. For example, timeseries operators 606 can be configured to pre-process one or more timeseries that are read frequently to ensure that the timeseries are updated whenever new data samples are received. However, timeseries operators 606 can be configured to wait until query time to process one or more timeseries that are read infrequently to avoid performing unnecessary processing operations.

In some embodiments, timeseries operators 606 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a local DAG database 630 within local storage 514, in a hosted DAG database 638 within hosted storage 516, or internally within timeseries processing engine 604. DAGs can be retrieved by workflow manager 622 and used to determine how and when to process incoming data samples. Exemplary systems and methods for creating and using DAGs are described in greater detail below.

Timeseries operators 606 can perform aggregations for dashboards, cleansing operations, logical operations for rules and fault detection, machine learning predictions or classifications, call out to external services, or any of a variety of other operations which can be applied to timeseries data. The operations performed by timeseries operators 606 are not limited to sensor data. Timeseries operators 606 can also operate on event data or function as a billing engine for a consumption or tariff-based billing system.

Sample Aggregation

Still referring to FIG. 6, timeseries operators 606 are shown to include a sample aggregator 608. Sample aggregator 608 can be configured to generate derived data rollups from the raw timeseries data. For each data point, sample aggregator 608 can aggregate a set of data values having timestamps within a predetermined time interval (e.g., a quarter-hour, an hour, a day, etc.) to generate an aggregate data value for the predetermined time interval. For example, the raw timeseries data for a particular data point may have a relatively short interval (e.g., one minute) between consecutive samples of the data point. Sample aggregator 608 can generate a data rollup from the raw timeseries data by aggregating all of the samples of the data point having timestamps within a relatively longer interval (e.g., a quarter-hour) into a single aggregated value that represents the longer interval.

For some types of timeseries, sample aggregator 608 performs the aggregation by averaging all of the samples of the data point having timestamps within the longer interval. Aggregation by averaging can be used to calculate aggregate values for timeseries of non-cumulative variables such as a measured value. For other types of timeseries, sample aggregator 608 performs the aggregation by summing all of the samples of the data point having timestamps within the longer interval. Aggregation by summation can be used to calculate aggregate values for timeseries of cumulative variables such as the number of faults detected since the previous sample.

Figures 7A, 7B:
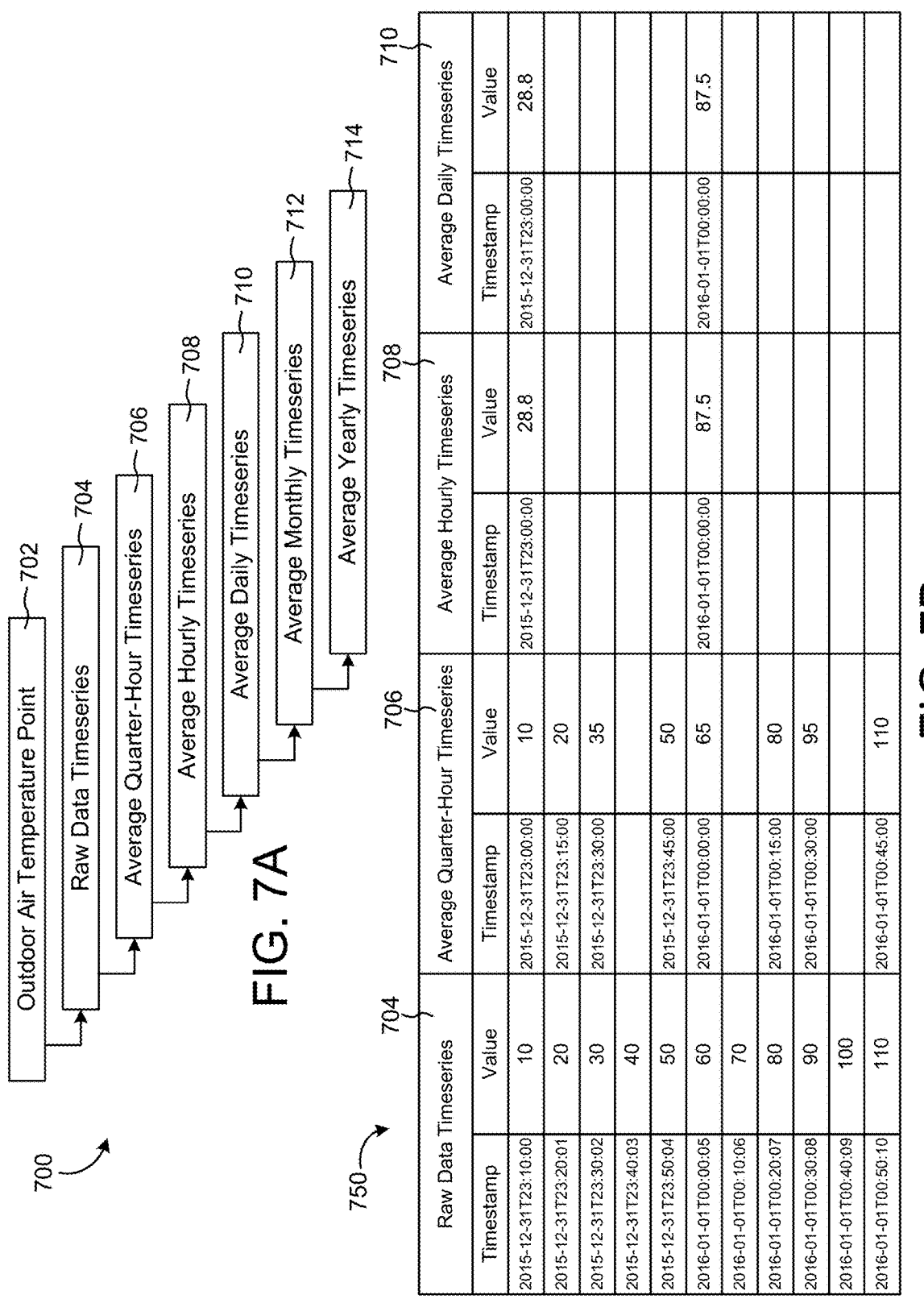
FIG. 7A is a block diagram illustrating an aggregation technique which can be used by the sample aggregator shown in FIG. 6 to aggregate raw data samples, according to some embodiments.
FIG. 7B is a data table which can be used to store raw data timeseries and a variety of derived data timeseries which can be generated by the timeseries service of FIG. 6, according to some embodiments.

Referring now to FIGS. 7A-7B, a block diagram 700 and a data table 750 illustrating an aggregation technique which can be used by sample aggregator 608 is shown, according to some embodiments. In FIG. 7A, a data point 702 is shown. Data point 702 is an example of a measured data point for which timeseries values can be obtained. For example, data point 702 is shown as an outdoor air temperature point and has values which can be measured by a temperature sensor. Although a specific type of data point 702 is shown in FIG. 7A, it should be understood that data point 702 can be any type of measured or calculated data point. Timeseries values of data point 702 can be collected by data collector 512 and assembled into a raw data timeseries 704.

As shown in FIG. 7B, the raw data timeseries 704 includes a timeseries of data samples, each of which is shown as a separate row in data table 750. Each sample of raw data timeseries 704 is shown to include a timestamp and a data value. The timestamps of raw data timeseries 704 are ten minutes and one second apart, indicating that the sampling interval of raw data timeseries 704 is ten minutes and one second. For example, the timestamp of the first data sample is shown as 2015-12-31T23:10:00 indicating that the first data sample of raw data timeseries 704 was collected at 11:10:00 PM on Dec. 31, 2015. The timestamp of the second data sample is shown as 2015-12-31T23:20:01 indicating that the second data sample of raw data timeseries 704 was collected at 11:20:01 PM on Dec. 31, 2015. In some embodiments, the timestamps of raw data timeseries 704 are stored along with an offset relative to universal time, as previously described. The values of raw data timeseries 704 start at a value of 10 and increase by 10 with each sample. For example, the value of the second sample of raw data timeseries 704 is 20, the value of the third sample of raw data timeseries 704 is 30, etc.

In FIG. 7A, several data rollup timeseries 706-714 are shown. Data rollup timeseries 706-714 can be generated by sample aggregator 608 and stored as derived timeseries data. The data rollup timeseries 706-714 include an average quarter-hour timeseries 706, an average hourly timeseries 708, an average daily timeseries 710, an average monthly timeseries 712, and an average yearly timeseries 714. Each of the data rollup timeseries 706-714 is dependent upon a parent timeseries. In some embodiments, the parent timeseries for each of the data rollup timeseries 706-714 is the timeseries with the next shortest duration between consecutive timeseries values. For example, the parent timeseries for average quarter-hour timeseries 706 is raw data timeseries 704. Similarly, the parent timeseries for average hourly timeseries 708 is average quarter-hour timeseries 706; the parent timeseries for average daily timeseries 710 is average hourly timeseries 708; the parent timeseries for average monthly timeseries 712 is average daily timeseries 710; and the parent timeseries for average yearly timeseries 714 is average monthly timeseries 712.

Sample aggregator 608 can generate each of the data rollup timeseries 706-714 from the timeseries values of the corresponding parent timeseries. For example, sample aggregator 608 can generate average quarter-hour timeseries 706 by aggregating all of the samples of data point 702 in raw data timeseries 704 that have timestamps within each quarter-hour. Similarly, sample aggregator 608 can generate average hourly timeseries 708 by aggregating all of the timeseries values of average quarter-hour timeseries 706 that have timestamps within each hour. Sample aggregator 608 can generate average daily timeseries 710 by aggregating all of the time series values of average hourly timeseries 708 that have timestamps within each day. Sample aggregator 608 can generate average monthly timeseries 712 by aggregating all of the time series values of average daily timeseries 710 that have timestamps within each month. Sample aggregator 608 can generate average yearly timeseries 714 by aggregating all of the time series values of average monthly timeseries 712 that have timestamps within each year.

In some embodiments, the timestamps for each sample in the data rollup timeseries 706-714 are the beginnings of the aggregation interval used to calculate the value of the sample. For example, the first data sample of average quarter-hour timeseries 706 is shown to include the timestamp 2015-12-31T23:00:00. This timestamp indicates that the first data sample of average quarter-hour timeseries 706 corresponds to an aggregation interval that begins at 11:00:00 PM on Dec. 31, 2015. Since only one data sample of raw data timeseries 704 occurs during this interval, the value of the first data sample of average quarter-hour timeseries 706 is the average of a single data value (i.e., average(10)=10). The same is true for the second data sample of average quarter-hour timeseries 706 (i.e., average (20)=20).

The third data sample of average quarter-hour timeseries 706 is shown to include the timestamp 2015-12-31T23:30:00. This timestamp indicates that the third data sample of average quarter-hour timeseries 706 corresponds to an aggregation interval that begins at 11:30:00 PM on Dec. 31, 2015. Since each aggregation interval of average quarter-hour timeseries 706 is a quarter-hour in duration, the end of the aggregation interval is 11:45:00 PM on Dec. 31, 2015. This aggregation interval includes two data samples of raw data timeseries 704 (i.e., the third raw data sample having a value of 30 and the fourth raw data sample having a value of 40). Sample aggregator 608 can calculate the value of the third sample of average quarter-hour timeseries 706 by averaging the values of the third raw data sample and the fourth raw data sample (i.e., average (30, 40)=35). Accordingly, the third sample of average quarter-hour timeseries 706 has a value of 35. Sample aggregator 608 can calculate the remaining values of average quarter-hour timeseries 706 in a similar manner.

Still referring to FIG. 7B, the first data sample of average hourly timeseries 708 is shown to include the timestamp 2015-12-31T23:00:00. This timestamp indicates that the first data sample of average hourly timeseries 708 corresponds to an aggregation interval that begins at 11:00:00 PM on Dec. 31, 2015. Since each aggregation interval of average hourly timeseries 708 is an hour in duration, the end of the aggregation interval is 12:00:00 AM on Jan. 1, 2016. This aggregation interval includes the first four samples of average quarter-hour timeseries 706. Sample aggregator 608 can calculate the value of the first sample of average hourly timeseries 708 by averaging the values of the first four values of average quarter-hour timeseries 706 (i.e., average (10, 20, 35, 50)=28.8). Accordingly, the first sample of average hourly timeseries 708 has a value of 28.8. Sample aggregator 608 can calculate the remaining values of average hourly timeseries 708 in a similar manner.

The first data sample of average daily timeseries 710 is shown to include the timestamp 2015-12-31T00:00:00. This timestamp indicates that the first data sample of average daily timeseries 710 corresponds to an aggregation interval that begins at 12:00:00 AM on Dec. 31, 2015. Since each aggregation interval of the average daily timeseries 710 is a day in duration, the end of the aggregation interval is 12:00:00 AM on Jan. 1, 2016. Only one data sample of average hourly timeseries 708 occurs during this interval. Accordingly, the value of the first data sample of average daily timeseries 710 is the average of a single data value (i.e., average(28.8)=28.8). The same is true for the second data sample of average daily timeseries 710 (i.e., average (87.5)=87.5).

In some embodiments, sample aggregator 608 stores each of the data rollup timeseries 706-714 in a single data table (e.g., data table 750) along with raw data timeseries 704. This allows applications 530 to retrieve all of the timeseries 704-714 quickly and efficiently by accessing a single data table. In other embodiments, sample aggregator 608 can store the various timeseries 704-714 in separate data tables which can be stored in the same data storage device (e.g., the same database) or distributed across multiple data storage devices. In some embodiments, sample aggregator 608 stores data timeseries 704-714 in a format other than a data table. For example, sample aggregator 608 can store timeseries 704-714 as vectors, as a matrix, as a list, or using any of a variety of other data storage formats.

In some embodiments, sample aggregator 608 automatically updates the data rollup timeseries 706-714 each time a new raw data sample is received. Updating the data rollup timeseries 706-714 can include recalculating the aggregated values based on the value and timestamp of the new raw data sample. When a new raw data sample is received, sample aggregator 608 can determine whether the timestamp of the new raw data sample is within any of the aggregation intervals for the samples of the data rollup timeseries 706-714. For example, if a new raw data sample is received with a timestamp of 2016-01-01T00:52:00, sample aggregator 608 can determine that the new raw data sample occurs within the aggregation interval beginning at timestamp 2016-01-01T00:45:00 for average quarter-hour timeseries 706. Sample aggregator 608 can use the value of the new raw data point (e.g., value=120) to update the aggregated value of the final data sample of average quarter-hour timeseries 706 (i.e., average(110, 120)=115).

If the new raw data sample has a timestamp that does not occur within any of the previous aggregation intervals, sample aggregator 608 can create a new data sample in average quarter-hour timeseries 706. The new data sample in average quarter-hour timeseries 706 can have a new data timestamp defining the beginning of an aggregation interval that includes the timestamp of the new raw data sample. For example, if the new raw data sample has a timestamp of 2016-01-01T01:00:11, sample aggregator 608 can determine that the new raw data sample does not occur within any of the aggregation intervals previously established for average quarter-hour timeseries 706. Sample aggregator 608 can generate a new data sample in average quarter-hour timeseries 706 with the timestamp 2016-01-01T01:00:00 and can calculate the value of the new data sample in average quarter-hour timeseries 706 based on the value of the new raw data sample, as previously described.

Sample aggregator 608 can update the values of the remaining data rollup timeseries 708-714 in a similar manner. For example, sample aggregator 608 determine whether the timestamp of the updated data sample in average quarter-hour timeseries is within any of the aggregation intervals for the samples of average hourly timeseries 708. Sample aggregator 608 can determine that the timestamp 2016-01-01T00:45:00 occurs within the aggregation interval beginning at timestamp 2016-01-01T00:00:00 for average hourly time-series 708. Sample aggregator 608 can use the updated value of the final data sample of average quarter-hour timeseries 706 (e.g., value=115) to update the value of the second sample of average hourly timeseries 708 (i.e., average(65, 80, 95, 115)=88.75). Sample aggregator 608 can use the updated value of the final data sample of average hourly timeseries 708 to update the final sample of average daily timeseries 710 using the same technique.

In some embodiments, sample aggregator 608 updates the aggregated data values of data rollup timeseries 706-714 each time a new raw data sample is received. Updating each time a new raw data sample is received ensures that the data rollup timeseries 706-714 always reflect the most recent data samples. In other embodiments, sample aggregator 608 updates the aggregated data values of data rollup timeseries 706-714 periodically at predetermined update intervals (e.g., hourly, daily, etc.) using a batch update technique. Updating periodically can be more efficient and require less data processing than updating each time a new data sample is received, but can result in aggregated data values that are not always updated to reflect the most recent data samples.

In some embodiments, sample aggregator 608 is config-ured to cleanse raw data timeseries 704. Cleansing raw data timeseries 704 can include discarding exceptionally high or low data. For example, sample aggregator 608 can identify a minimum expected data value and a maximum expected data value for raw data timeseries 704. Sample aggregator 608 can discard data values outside this range as bad data. In some embodiments, the minimum and maximum expected values are based on attributes of the data point represented by the timeseries. For example, data point 702 represents a measured outdoor air temperature and therefore has an expected value within a range of reasonable outdoor air temperature values for a given geographic location (e.g., between −20° F. and 110° F.). Sample aggregator 608 can discard a data value of 330 for data point 702 since a temperature value of 330° F. is not reasonable for a mea-sured outdoor air temperature.

In some embodiments, sample aggregator 608 identifies a maximum rate at which a data point can change between consecutive data samples. The maximum rate of change can be based on physical principles (e.g., heat transfer prin-ciples), weather patterns, or other parameters that limit the maximum rate of change of a particular data point. For example, data point 702 represents a measured outdoor air temperature and therefore can be constrained to have a rate of change less than a maximum reasonable rate of change for outdoor temperature (e.g., five degrees per minute). If two consecutive data samples of the raw data timeseries 704 have values that would require the outdoor air temperature to change at a rate in excess of the maximum expected rate of change, sample aggregator 608 can discard one or both of the data samples as bad data.

Sample aggregator 608 can perform any of a variety of data cleansing operations to identify and discard bad data samples. Several examples of data cleansing operations which can be performed by sample aggregator 608 are described in U.S. patent application Ser. No. 13/631,301 filed Sep. 28, 2012, the entire disclosure of which is incor-porated by reference herein. In some embodiments, sample aggregator 608 performs the data cleansing operations for raw data timeseries 704 before generating the data rollup timeseries 706-714. This ensures that raw data timeseries 704 used to generate data rollup timeseries 706-714 does not include any bad data samples. Accordingly, the data rollup timeseries 706-714 do not need to be re-cleansed after the aggregation is performed.

Virtual Points

Referring again to FIG. 6, timeseries operators 606 are shown to include a virtual point calculator 610. Virtual point calculator 610 is configured to create virtual data points and calculate timeseries values for the virtual data points. A virtual data point is a type of calculated data point derived from one or more actual data points. In some embodiments, actual data points are measured data points, whereas virtual data points are calculated data points. Virtual data points can be used as substitutes for actual sensor data when the sensor data desired for a particular application does not exist, but can be calculated from one or more actual data points. For example, a virtual data point representing the enthalpy of a refrigerant can be calculated using actual data points mea-suring the temperature and pressure of the refrigerant. Vir-tual data points can also be used to provide timeseries values for calculated quantities such as efficiency, coefficient of performance, and other variables that cannot be directly measured.

Virtual point calculator 610 can calculate virtual data points by applying any of a variety of mathematical opera-tions or functions to actual data points or other virtual data points. For example, virtual point calculator 610 can calcu-late a virtual data point ($pointID_3$) by adding two or more actual data points ($pointID_1$ and $pointID_2$) (e.g., $pointID_3 = pointID_1 + pointID_2$). As another example, virtual point calculator 610 can calculate an enthalpy data point ($pointID_4$) based on a measured temperature data point ($pointID_5$) and a measured pressure data point ($pointID_6$) (e.g., $pointID_4 = enthalpy(pointID_5, pointID_6)$). In some instances, a virtual data point can be derived from a single actual data point. For example, virtual point calculator 610 can calculate a saturation temperature ($pointID_7$) of a known refrigerant based on a measured refrigerant pressure ($pointID_8$) (e.g., $pointID_7 = T_{sat}(pointID_8)$). In general, vir-tual point calculator 610 can calculate the timeseries values of a virtual data point using the timeseries values of one or more actual data points and/or the timeseries values of one or more other virtual data points.

In some embodiments, virtual point calculator 610 uses a set of virtual point rules to calculate the virtual data points. The virtual point rules can define one or more input data points (e.g., actual or virtual data points) and the mathemati-cal operations that should be applied to the input data point(s) to calculate each virtual data point. The virtual point rules can be provided by a user, received from an external system or device, and/or stored in memory 510. Virtual point calculator 610 can apply the set of virtual point rules to the timeseries values of the input data points to calculate time-series values for the virtual data points. The timeseries values for the virtual data points can be stored as derived timeseries data in local timeseries database 628 and/or hosted timeseries database 636.

Virtual point calculator 610 can calculate virtual data points using the values of raw data timeseries 704 and/or the aggregated values of the data rollup timeseries 706-714. In some embodiments, the input data points used to calculate a virtual data point are collected at different sampling times and/or sampling rates. Accordingly, the samples of the input data points may not be synchronized with each other, which can lead to ambiguity in which samples of the input data points should be used to calculate the virtual data point. Using the data rollup timeseries 706-714 to calculate the virtual data points ensures that the timestamps of the input data points are synchronized and eliminates any ambiguity in which data samples should be used.

Figures 8, 9A, 9B:
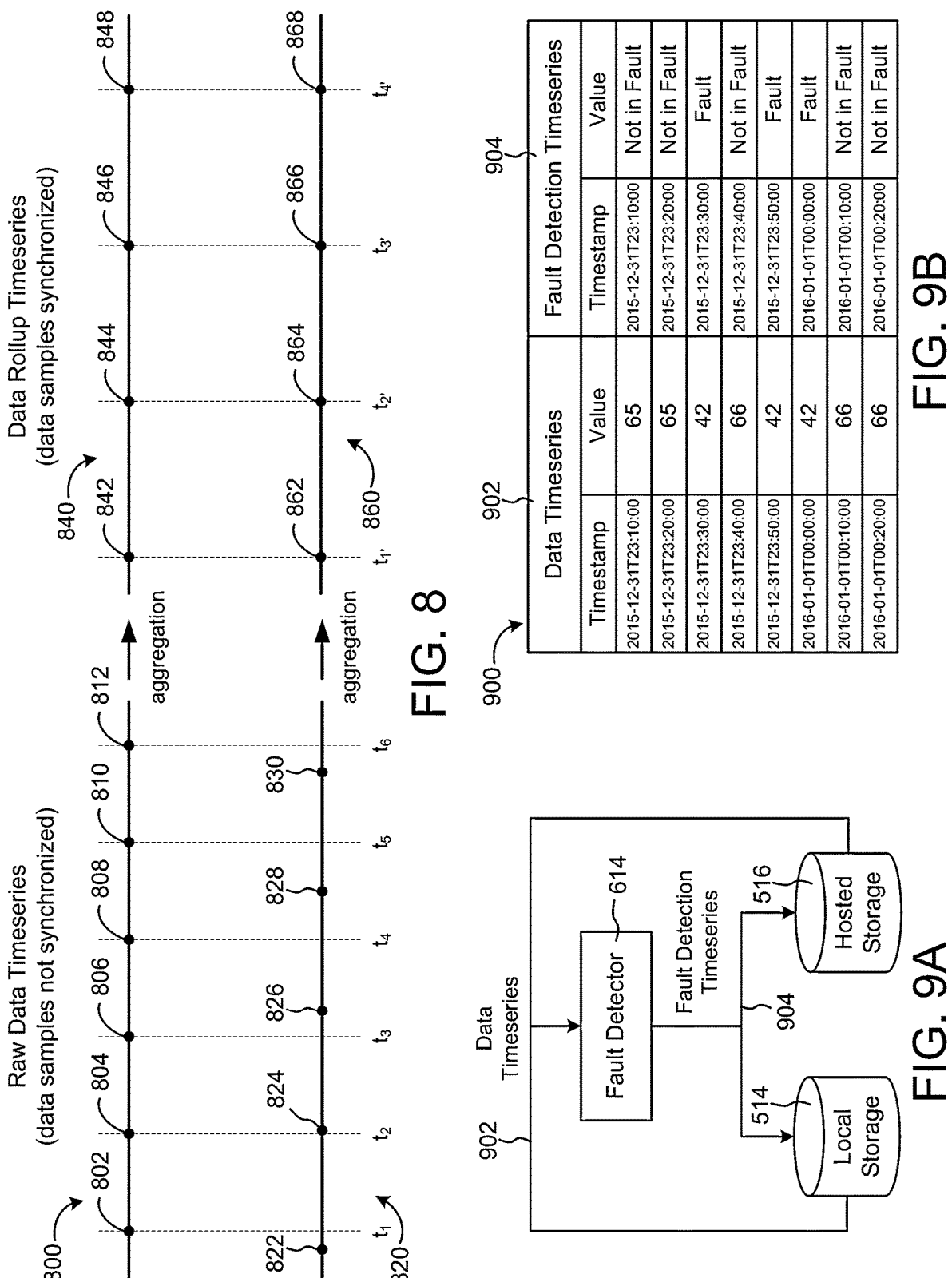
FIG. 8 is a drawing of several timeseries illustrating the synchronization of data samples which can be performed by the data aggregator shown in FIG. 6, according to some embodiments.
FIG. 9A is a flow diagram illustrating the creation and storage of a fault detection timeseries which can be performed by the fault detector shown in FIG. 6, according to some embodiments.
FIG. 9B is a data table which can be used to store the raw data timeseries and the fault detection timeseries, according to some embodiments.

Referring now to FIG. 8, several timeseries 800, 820, 840, and 860 illustrating the synchronization of data samples resulting from aggregating the raw timeseries data are shown, according to some embodiments. Timeseries 800 and 820 are raw data timeseries. Raw data timeseries 800 has several raw data samples 802-810. Raw data sample 802 is collected at time $t_1$; raw data sample 804 is collected at time $t_2$; raw data sample 806 is collected at time $t_3$; raw data sample 808 is collected at time $t_4$; raw data sample 810 is collected at time $t_5$; and raw data sample 812 is collected at time $t_6$.

Raw data timeseries 820 also has several raw data samples 822, 824, 826, 828, and 830. However, raw data samples, 822-830 are not synchronized with raw data samples 802-812. For example, raw data sample 822 is collected before time $t_1$; raw data sample 824 is collected between times $t_2$ and $t_3$; raw data sample 826 is collected between times $t_3$ and $t_4$; raw data sample 828 is collected between times $t_4$ and $t_5$; and raw data sample 830 is collected between times $t_5$ and $t_6$. The lack of synchronization between data samples 802-812 and raw data samples 822-830 can lead to ambiguity in which of the data samples should be used together to calculate a virtual data point.

Timeseries 840 and 860 are data rollup timeseries. Data rollup timeseries 840 can be generated by sample aggregator 608 by aggregating raw data timeseries 800. Similarly, data rollup timeseries 860 can be generated by sample aggregator 608 by aggregating raw data timeseries 820. Both raw data timeseries 800 and 820 can be aggregated using the same aggregation interval. Accordingly, the resulting data rollup timeseries 840 and 860 have synchronized data samples. For example, aggregated data sample 842 is synchronized with aggregated data sample 862 at time $t_1'$. Similarly, aggregated data sample 844 is synchronized with aggregated data sample 864 at time $t_2'$; aggregated data sample 846 is synchronized with aggregated data sample 866 at time $t_3'$; and aggregated data sample 848 is synchronized with aggregated data sample 868 at time $t_4'$.

The synchronization of data samples in data rollup timeseries 840 and 860 allows virtual point calculator 610 to readily identify which of the data samples should be used together to calculate a virtual point. For example, virtual point calculator 610 can identify which of the samples of data rollup timeseries 840 and 860 have the same timestamp (e.g., data samples 842 and 862, data samples 844 and 864, etc.). Virtual point calculator 610 can use two or more aggregated data samples with the same timestamp to calculate a timeseries value of the virtual data point. In some embodiments, virtual point calculator 610 assigns the shared timestamp of the input data samples to the timeseries value of the virtual data point calculated from the input data samples.

Weather Points

Referring again to FIG. 6, timeseries operators 606 are shown to include a weather point calculator 612. Weather point calculator 612 is configured to perform weather-based calculations using the timeseries data. In some embodiments, weather point calculator 612 creates virtual data points for weather-related variables such as cooling degree days (CDD), heating degree days (HDD), cooling energy days (CED), heating energy days (HED), and normalized energy consumption. The timeseries values of the virtual data points calculated by weather point calculator 612 can be stored as derived timeseries data in local timeseries database 628 and/or hosted timeseries database 636.

Weather point calculator 612 can calculate CDD by integrating the positive temperature difference between the time-varying outdoor air temperature $T_{OA}$ and the cooling balance point $T_{bC}$ for the building as shown in the following equation:

$$CDD = \int^{period} \max\{0, (T_{OA} - T_{bC})\}\, dt$$

where period is the integration period. In some embodiments, the outdoor air temperature $T_{OA}$ is a measured data point, whereas the cooling balance point $T_{bC}$ is a stored parameter. To calculate CDD for each sample of the outdoor air temperature $T_{OA}$, weather point calculator 612 can multiply the quantity max $\{0, (T_{OA}\text{-}T_{bC})\}$ by the sampling period $\Delta t$ of the outdoor air temperature $T_{OA}$. Weather point calculator 612 can calculate CED in a similar manner using outdoor air enthalpy $E_{OA}$ instead of outdoor air temperature $T_{OA}$. Outdoor air enthalpy $E_{OA}$ can be a measured or virtual data point.

Weather point calculator 612 can calculate HDD by integrating the positive temperature difference between a heating balance point $T_{bH}$ for the building and the time-varying outdoor air temperature $T_{OA}$ as shown in the following equation:

$$HDD = \int^{period} \max\{0, (T_{bH} - T_{OA})\}\, dt$$

where period is the integration period. In some embodiments, the outdoor air temperature $T_{OA}$ is a measured data point, whereas the heating balance point $T_{bH}$ is a stored parameter. To calculate HDD for each sample of the outdoor air temperature $T_{OA}$, weather point calculator 612 can multiply the quantity max $\{0, (T_{bH}\text{-}T_{OA})\}$ by the sampling period $\Delta t$ of the outdoor air temperature $T_{OA}$. Weather point calculator 612 can calculate HED in a similar manner using outdoor air enthalpy $E_{OA}$ instead of outdoor air temperature $T_{OA}$.

In some embodiments, both virtual point calculator 610 and weather point calculator 612 calculate timeseries values of virtual data points. Weather point calculator 612 can calculate timeseries values of virtual data points that depend on weather-related variables (e.g., outdoor air temperature, outdoor air enthalpy, outdoor air humidity, outdoor light intensity, precipitation, wind speed, etc.). Virtual point calculator 610 can calculate timeseries values of virtual data points that depend on other types of variables (e.g., non-weather-related variables). Although only a few weather-related variables are described in detail here, it is contemplated that weather point calculator 612 can calculate virtual data points for any weather-related variable. The weather-related data points used by weather point calculator 612 can be received as timeseries data from various weather sensors and/or from a weather service.

Fault Detection

Still referring to FIG. 6, timeseries operators 606 are shown to include a fault detector 614. Fault detector 614 can be configured to detect faults in timeseries data. In some embodiments, fault detector 614 performs fault detection for timeseries data representing meter data (e.g., measurements from a sensor) and/or for other types of timeseries data. Fault detector 614 can detect faults in the raw timeseries data and/or the derived timeseries data. In some embodiments, fault detector 614 receives fault detection rules from analytics service 524. Fault detection rules can be defined by a user (e.g., via a rules editor) or received from an external system or device. In various embodiments, the fault detection rules can be stored within local storage 514 and/or hosted storage 516. Fault detector 614 can retrieve the fault detection rules from local storage 514 or hosted storage 516 and can use the fault detection rules to analyze the timeseries data.

In some embodiments, the fault detection rules provide criteria that can be evaluated by fault detector 614 to detect faults in the timeseries data. For example, the fault detection rules can define a fault as a data value above or below a threshold value. As another example, the fault detection rules can define a fault as a data value outside a predetermined range of values. The threshold value and predetermined range of values can be based on the type of timeseries data (e.g., meter data, calculated data, etc.), the type of variable represented by the timeseries data (e.g., temperature, humidity, energy consumption, etc.), the system or device that measures or provides the timeseries data (e.g., a temperature sensor, a humidity sensor, a chiller, etc.), and/or other attributes of the timeseries data.

Fault detector 614 can apply the fault detection rules to the timeseries data to determine whether each sample of the timeseries data qualifies as a fault. In some embodiments, fault detector 614 generates a fault detection timeseries containing the results of the fault detection. The fault detection timeseries can include a set of timeseries values, each of which corresponds to a data sample of the timeseries data evaluated by fault detector 614. In some embodiments, each timeseries value in the fault detection timeseries includes a timestamp and a fault detection value. The timestamp can be the same as the timestamp of the corresponding data sample of the data timeseries. The fault detection value can indicate whether the corresponding data sample of the data timeseries qualifies as a fault. For example, the fault detection value can have a value of "Fault" if a fault is detected and a value of "Not in Fault" if a fault is not detected in the corresponding data sample of the data timeseries. The fault detection timeseries can be stored in local timeseries database 628 and/or hosted timeseries database 636 along with the raw timeseries data and the derived timeseries data.

Referring now to FIGS. 9A-9B, a block diagram and data table 900 illustrating the fault detection timeseries is shown, according to some embodiments. In FIG. 9A, fault detector 614 is shown receiving a data timeseries 902 from local storage 514 or hosted storage 516. Data timeseries 902 can be a raw data timeseries or a derived data timeseries. In some embodiments, data timeseries 902 is a timeseries of values of an actual data point (e.g., a measured temperature). In other embodiments, data timeseries 902 is a timeseries of values of a virtual data point (e.g., a calculated efficiency). As shown in table 900, data timeseries 902 includes a set of data samples. Each data sample includes a timestamp and a value. Most of the data samples have values within the range of 65-66. However, three of the data samples have values of 42.

Fault detector 614 can evaluate data timeseries 902 using a set of fault detection rules to detect faults in data timeseries 902. In some embodiments, fault detector 614 determines that the data samples having values of 42 qualify as faults according to the fault detection rules. Fault detector 614 can generate a fault detection timeseries 904 containing the results of the fault detection. As shown in table 900, fault detection timeseries 904 includes a set of data samples. Like data timeseries 902, each data sample of fault detection timeseries 904 includes a timestamp and a value. Most of the values of fault detection timeseries 904 are shown as "Not in Fault," indicating that no fault was detected for the corresponding sample of data timeseries 902 (i.e., the data sample with the same timestamp). However, three of the data samples in fault detection timeseries 904 have a value of "Fault," indicating that the corresponding sample of data timeseries 902 qualifies as a fault. As shown in FIG. 9A, fault detector 614 can store fault detection timeseries 904 in local storage 514 (e.g., in local timeseries database 628) and/or hosted storage 516 (e.g., in hosted timeseries database 636) along with the raw timeseries data and the derived timeseries data.

Fault detection timeseries 904 can be used by BMS 500 to perform various fault detection, diagnostic, and/or control processes. In some embodiments, fault detection timeseries 904 is further processed by timeseries processing engine 604 to generate new timeseries derived from fault detection timeseries 904. For example, sample aggregator 608 can use fault detection timeseries 904 to generate a fault duration timeseries. Sample aggregator 608 can aggregate multiple consecutive data samples of fault detection timeseries 904 having the same data value into a single data sample. For example, sample aggregator 608 can aggregate the first two "Not in Fault" data samples of fault detection timeseries 904 into a single data sample representing a time period during which no fault was detected. Similarly, sample aggregator 608 can aggregate the final two "Fault" data samples of fault detection timeseries 904 into a single data sample representing a time period during which a fault was detected.

In some embodiments, each data sample in the fault duration timeseries has a fault occurrence time and a fault duration. The fault occurrence time can be indicated by the timestamp of the data sample in the fault duration timeseries. Sample aggregator 608 can set the timestamp of each data sample in the fault duration timeseries equal to the timestamp of the first data sample in the series of data samples in fault detection timeseries 904 which were aggregated to form the aggregated data sample. For example, if sample aggregator 608 aggregates the first two "Not in Fault" data samples of fault detection timeseries 904, sample aggregator 608 can set the timestamp of the aggregated data sample to 2015-12-31T23:10:00. Similarly, if sample aggregator 608 aggregates the final two "Fault" data samples of fault detection timeseries 904, sample aggregator 608 can set the timestamp of the aggregated data sample to 2015-12-31T23: 50:00.

The fault duration can be indicated by the value of the data sample in the fault duration timeseries. Sample aggregator 608 can set the value of each data sample in the fault duration timeseries equal to the duration spanned by the consecutive data samples in fault detection timeseries 904 which were aggregated to form the aggregated data sample. Sample aggregator 608 can calculate the duration spanned by multiple consecutive data samples by subtracting the timestamp of the first data sample of fault detection timeseries 904 included in the aggregation from the timestamp of the next data sample of fault detection timeseries 904 after the data samples included in the aggregation.

For example, if sample aggregator 608 aggregates the first two "Not in Fault" data samples of fault detection timeseries 904, sample aggregator 608 can calculate the duration of the aggregated data sample by subtracting the timestamp 2015-12-31T23:10:00 (i.e., the timestamp of the first "Not in Fault" sample) from the timestamp 2015-12-31T23:30:00 (i.e., the timestamp of the first "Fault" sample after the consecutive "Not in Fault" samples) for an aggregated duration of twenty minutes. Similarly, if sample aggregator 608 aggregates the final two "Fault" data samples of fault detection timeseries 904, sample aggregator 608 can calculate the duration of the aggregated data sample by subtracting the timestamp 2015-12-31T23:50:00 (i.e., the timestamp of the first "Fault" sample included in the aggregation) from the timestamp 2016-01-01T00:10:00 (i.e., the timestamp of the first "Not in Fault" sample after the consecutive "Fault" samples) for an aggregated duration of twenty minutes.

Eventseries

Referring again to FIG. 6, timeseries operators 606 are shown to include an eventseries generator 615. Eventseries generator 615 can be configured to generate eventseries based on the raw data timeseries and/or the derived data timeseries. Each eventseries may include a plurality of event samples that characterize various events and define the start times and end times of the events. In the context of eventseries, an "event" can be defined as a state or condition that occurs over a period of time. In other words, an event is not an instantaneous occurrence, but rather is a non-instantaneous state or condition observed over a time period having a non-zero duration (i.e., having both a start time and a subsequent stop time). The state or condition of the event can be based on the values of the timeseries samples used to generate the eventseries. In some embodiments, eventseries generator 615 assigns a state to each timeseries sample based on the value of the timeseries sample and then aggregates multiple consecutive samples having the same state to define the time period over which that state is observed.

Eventseries generator 615 can be configured to assign a state to each sample of an input timeseries (e.g., a raw data timeseries or a derived timeseries) by applying a set of rules to each sample. The process of assigning a state to each sample of the input timeseries can be described as an event-condition-action (ECA) process. ECA refers to the structure of active rules in event driven architecture and active database systems. For example, each rule in the set of rules may include an event, a condition, and an action. The event part of the rule may specify a signal that triggers invocation of the rule. The condition part of the rule may be a logical test (or series of logical tests) that, if satisfied or evaluates to true, causes the action to be carried out. The action part of the rule may specify one or more actions to be performed when the corresponding logical test is satisfied (e.g., assigning a particular state to a sample of the input timeseries).

In some embodiments, the event part is the arrival of a new sample of an input timeseries. Different rules may apply to different input timeseries. For example, the arrival of a new sample of a first input timeseries may qualify as a first event, whereas the arrival of a new sample of a second input timeseries may qualify as a second event. Eventseries generator 615 can use the identity of the input timeseries to determine which event has occurred when a new sample of a particular input timeseries is received. In other words, eventseries generator 615 can select a particular rule to evaluate based on the identity of the input timeseries.

In some embodiments, the condition includes one or more mathematical checks or logic statements that are evaluated by eventseries generator 615. For example, evaluating the condition of a particular rule may include comparing the value of the sample of the input timeseries to a threshold value. The condition may be satisfied if the value of the sample is less than the threshold value, equal to the threshold value, or greater than the threshold value, depending on the particular logic statement specified by the condition. In some embodiments, the condition includes a series of mathematical checks that are performed by eventseries generator 615 in a predetermined order. Each mathematical check may correspond to a different action to be performed if that mathematical check is satisfied. For example, the conditions and corresponding actions may be specified as follows:

$$\text{If Value} > \theta_1, \text{Action} = \text{Action}_1$$
$$\text{Else If } \theta_1 \geq \text{Value} > \theta_2, \text{Action} = \text{Action}_2$$
$$\text{Else If } \theta_2 \geq \text{Value} > \theta_3, \text{Action} = \text{Action}_3$$
$$\text{Else If } \theta_3 \geq \text{Value}, \text{Action} = \text{Action}_4$$

where Value is the value of the sample of the input timeseries, $\theta_1$-$\theta_4$ are thresholds for the value, and $\text{Action}_1$-$\text{Action}_4$ are specific actions that are performed if the corresponding logic statement is satisfied. For example, $\text{Action}_1$ may be performed if the value of the sample is greater than $\theta_1$.

In some embodiments, the actions include assigning various states to the sample of the input timeseries. For example, $\text{Action}_1$ may include assigning a first state to the sample of the input timeseries, whereas $\text{Action}_2$ may include assigning a second state to the sample of the input timeseries. Accordingly, different states can be assigned to the sample based on the value of the sample relative to the threshold values. Each time a new sample of an input timeseries is received, eventseries generator 615 can run through the set of rules, select the rules that apply to that specific input timeseries, apply them in a predetermined order, determine which condition is satisfied, and assign a particular state to the sample based on which condition is satisfied.

One example of an eventseries which can be generated by eventseries generator 615 is an outdoor air temperature (OAT) eventseries. The OAT eventseries may define one or more temperature states and may indicate the time periods during which each of the temperature states is observed. In some embodiments, the OAT eventseries is based on a timeseries of measurements of the OAT received as a raw data timeseries. Eventseries generator 615 can use a set of rules to assign a particular temperature state (e.g., hot, warm, cool, cold) to each of the timeseries OAT samples. For example, eventseries generator 615 can apply the following set of rules to the samples of an OAT timeseries:

$$\text{If } OAT > 100, \text{State} = \text{Hot}$$
$$\text{Else If } 100 \geq OAT > 80, \text{State} = \text{Warm}$$
$$\text{Else If } 80 \geq OAT > 50, \text{State} = \text{Cool}$$
$$\text{Else If } 50 \geq OAT, \text{State} = \text{Cold}$$

where OAT is the value of a particular timeseries data sample. If the OAT is above 100, eventseries generator 615 can assign the timeseries sample to the "Hot" temperature state. If the OAT is less than or equal to 100 and greater than 80, eventseries generator 615 can assign the timeseries sample to the "Warm" temperature state. If the OAT is less than or equal to 80 and greater than 50, eventseries generator 615 can assign the timeseries sample to the "Cool" temperature state. If the OAT is less than or equal to 50, eventseries generator 615 can assign the timeseries sample to the "Cold" temperature state.

In some embodiments, eventseries generator 615 creates a new timeseries that includes the assigned states for each sample of the original input timeseries. The new timeseries may be referred to as a "state timeseries" because it indicates the state assigned to each timeseries sample. The state timeseries can be created by applying the set of rules to an input timeseries as previously described. In some embodiments, the state timeseries includes a state value and a timestamp for each sample of the state timeseries. An example of a state timeseries is as follows:

$$[\langle state_1, timestamp_1 \rangle, \langle state_2, timestamp_2 \rangle, \ldots$$
$$\langle state_N, timestamp_N \rangle]$$

where $state_i$ is the state assigned to the ith sample of the input timeseries, $timestamp_i$ is the timestamp of the ith sample of the input timeseries, and N is the total number of samples in the input timeseries. In some instances, two or more of the state values may be the same if the same state is assigned to multiple samples of the input timeseries.

In some embodiments, the state timeseries also includes the original value of each sample of the input timeseries. For example, each sample of the state timeseries may include a state value, a timestamp, and an input data value, as shown in the following equation:

$$[\langle state_1, timestamp_1, value_1 \rangle, \ldots \langle state_N, time-$$
$$stamp_N, value_N \rangle]$$

where $value_i$ is the original value of the ith sample of the input timeseries. The state timeseries is a type of derived timeseries which can be stored and processed by timeseries service 528.

Figures 9C, 9D:
FIG. 9C is a data table which can be used to store states assigned to samples of a data timeseries, according to some embodiments.
FIG. 9D is a data table including various events generated based on the assigned states shown in the table of FIG. 9C, according to some embodiments.

Referring now to FIG. 9C, a table 910 illustrating the result of assigning a temperature state to each timeseries sample is shown, according to some embodiments. Each timeseries sample is shown as a separate row of table 910. The "Time" column of table 910 indicates the timestamp associated with each sample, whereas the "OAT" column of table 910 indicates the value of each timeseries sample. The "State" column of table 910 indicates the state assigned to each timeseries sample by eventseries generator 615.

Referring now to FIG. 9D, a table 920 illustrating a set of events generated by eventseries generator 615 is shown, according to some embodiments. Each event is shown as a separate row of table 920. The "Event ID" column of table 920 indicates the unique identifier for each event (e.g., Event 1, Event 2, etc.). The "Start Time" column of table 920 indicates the time at which each event begins and the "End Time" column of table 920 indicates the time at which event ends. The "State" column of table 920 indicates the state associated with each event.

Eventseries generator 615 can generate each event shown in table 920 by identifying consecutive timeseries samples with the same assigned state and determining a time period that includes the identified samples. In some embodiments, the time period starts at the timestamp of the first sample having a given state and ends immediately before the timestamp of the next sample having a different state. For example, the first two timeseries samples shown in table 910 both have the state "Cold," whereas the third sample in table 910 has the state "Cool." Eventseries generator 615 can identify the first two samples as having the same state and can generate the time period 00:00-01:59 which includes both of the identified samples. This time period begins at the timestamp of the first sample (i.e., 00:00) and ends immediately before the timestamp of the third sample (i.e., 02:00).

Eventseries generator 615 can create an event for each group of consecutive samples having the same state.

Eventseries generator 615 can perform a similar analysis for the remaining timeseries samples in table 910 to generate each of the events shown in table 920. In some instances, multiple events can have the same state associated therewith. For example, both Event 1 and Event 7 shown in table 920 have the "Cold" state. Similarly, both Event 2 and Event 6 have the "Cool" state and both Event 3 and Event 5 have the "Warm" state. It should be noted that an event defines not only a particular state, but also a time period (i.e., a series of consecutive time samples) during which that state is observed. If the same state is observed during multiple non-consecutive time periods, multiple events having the same state can be generated to represent each of the non-consecutive time periods.

In some embodiments, eventseries generator 615 creates an eventseries for a set of events. An eventseries is conceptually similar to a timeseries in that both represent a series of occurrences. However, the samples of a timeseries correspond to instantaneous occurrences having a single timestamp, whereas the samples of an eventseries correspond to non-instantaneous events having both a start time and a stop time. For example, eventseries generator 615 may create the following eventseries for the set of events shown in table 920:

$$[\langle ID = 1, State = Cold, StartTime = 00:00, EndTime = 01:59 \rangle,$$
$$\langle ID = 2, State = Cool, StartTime = 02:00, EndTime = 08:59 \rangle,$$
$$\langle ID = 3, State = Warm, StartTime = 09:00, EndTime = 11:59 \rangle,$$
$$\langle ID = 4, State = Hot, StartTime = 12:00, EndTime = 15:59 \rangle,$$
$$\langle ID = 5, State = Warm, StartTime = 16:00, EndTime = 18:59 \rangle,$$
$$\langle ID = 6, State = Cool, StartTime = 19:00, EndTime = 21:59 \rangle,$$
$$\langle ID = 7, State = Cold, StartTime = 22:00, EndTime = 23:59 \rangle]$$

where each item within the bent brackets $\langle \ \rangle$ is an event having the attributes ID, State, StartTime, and EndTime. Events can be stored in a tabular format (as shown in FIG. 9D), as a text string (as shown above), as a data object (e.g., a JSON object), in a container format, or any of a variety of formats. Several additional examples of events and eventseries are described in detail in U.S. patent application Ser. No. 15/644,560 filed Jul. 7, 2017, the entire disclosure of which is incorporated by reference herein.

Eventseries Process

Figure 9E:
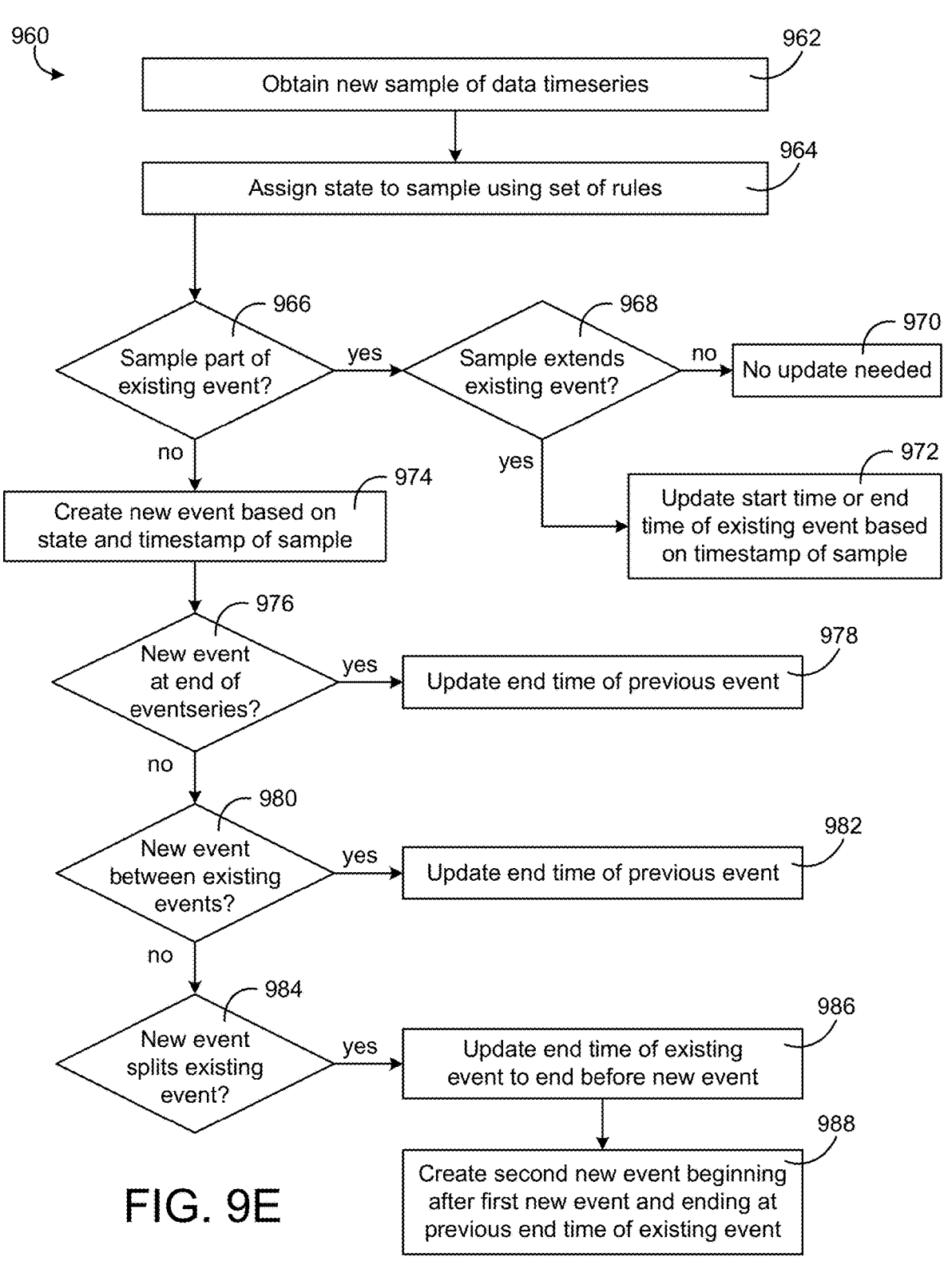
FIG. 9E is a flowchart of a process for generating and updating events and eventseries, according to some embodiments.

Referring now to FIG. 9E, a flowchart of a process 960 for creating and updating eventseries is shown, according to some embodiments. Process 960 can be performed by eventseries generator 615, as described with reference to FIGS. 6 and 9C-9D. In some embodiments, process 960 is performed to create an eventseries based on the samples of a data timeseries. Process 960 can be performed after all of the samples of the data timeseries have been collected or can be performed each time a new sample of the data timeseries is collected.

Process 960 is shown to include obtaining a new sample of a data timeseries (step 962) and assigning a state to the sample using a set of rules (step 964). In some embodiments, the sample is obtained from a sensor configured to measure a variable of interest in or around a building. For example, the sample can be a sample of a raw data timeseries. In other embodiments, the sample is a sample of a derived data timeseries generated by sample aggregator 608, virtual point calculator 610, weather point calculator 612, or other time-series operators 606. The sample can be obtained from a set of samples of a complete timeseries or can be received as the latest sample of an incoming data stream.

In some embodiments, step 964 includes applying a set of rules to the sample of the data timeseries to determine which state to assign. The set of rules may define various ranges of values and a corresponding state for each range of values. Step 964 can include assigning the sample to a particular state if the value of the value of the sample is within the corresponding range of values. For example, if the sample is a sample of outdoor air temperature (OAT), the set of rules may define various temperature ranges and a temperature state for each of the temperature ranges. One example of such a set of rules is as follows:

$$\text{If } OAT > 100, \text{State} = \text{Hot}$$

$$\text{Else If } 100 \geq OAT > 80, \text{State} = \text{Warm}$$

$$\text{Else If } 80 \geq OAT > 50, \text{State} = \text{Cool}$$

$$\text{Else If } 50 \geq OAT, \text{State} = \text{Cold}$$

where OAT is the value of a particular timeseries data sample. If the OAT is above 100, the sample can be assigned to the "Hot" temperature state. If the OAT is less than or equal to 100 and greater than 80, the sample can be assigned to the "Warm" temperature state. If the OAT is less than or equal to 80 and greater than 50, the sample can be assigned to the "Cool" temperature state. If the OAT is less than or equal to 50, the sample can be assigned to the "Cold" temperature state.

Still referring to FIG. 9E, process 960 is shown to include determining whether the sample is part of an existing event (step 966). Step 966 may include identifying all of the events in an existing eventseries and determining whether the sample belongs to any of the identified events. Each event may be defined by the combination of a particular state and a time period having both a start time and an end time. Step 966 may include determining that the sample is part of an existing event if the sample is both (1) assigned to the same state as the existing event and (2) has a timestamp that is either (a) within the time period associated with the existing event or (b) consecutive with the time period associated with the existing event. However, step 966 may include determining that the sample is not part of an existing event if the sample does not have the same state as the existing event or does not have a timestamp that that is either within the time period associated with the existing event or consecutive with the time period associated with the existing event.

In step 966, a timestamp may be considered within the time period associated with an existing event if the timestamp is between the start time of the event and the end time of the event. A timestamp may be considered consecutive with the time period associated with an existing event if the timestamp is immediately before the start time or immediately after the end time of the event. For example, if a new sample has a timestamp before the start time of an event and no other samples have intervening timestamps between the timestamp of the new sample and the start time of the event, the timestamp may be considered consecutive with the time period associated with the existing event. Similarly, if a new sample has a timestamp after the end time of an event and no other samples have intervening timestamps between the end time of the event and the timestamp of the new sample, the timestamp may be considered consecutive with the time period associated with the existing event.

If the new sample is part of an existing event (i.e., the result of step 966 is "yes"), process 960 may proceed to determining whether the new sample extends the existing event (step 968). Step 968 may include determining whether the timestamp of the new sample is consecutive with the time period associated with the existing event (i.e., immediately before the start time of the event or immediately after the end time of the event). If the timestamp of the new sample is consecutive with the time period associated with the existing event, step 968 may include determining that the sample extends the existing event. However, if the timestamp of the new sample is not consecutive with the time period associated with the existing event, step 968 may include determining that the sample does not extend the existing event.

If the sample does not extend the existing event (i.e., the result of step 968 is "no"), process 960 may include determining that no update to the existing event is needed. This situation may occur when the timestamp of the new sample is between the start time of the existing event and the end time of the existing event (i.e., within the time period associated with the existing event). Since the time period associated with the existing event already covers the timestamp of the new sample, it may be unnecessary to update the existing event to include the timestamp of the new sample.

However, if the sample extends the existing event (i.e., the result of step 968 is "yes"), process 960 may proceed to updating the start time or end time of the existing event based on the timestamp of the sample (step 972). Step 972 may include moving the start time of the event backward in time or moving the end time of the event forward in time such that the time period between the start time and the end time includes the timestamp of the new sample. For example, if the timestamp of the sample is before the start time of the event, step 972 may include replacing the start time of the existing event with the timestamp of the sample.

Similarly, if the timestamp of the sample is after the end time of the event, step 972 may include replacing the end time of the existing event with a new end time that occurs after the timestamp of the sample. For example, if the existing event has an original end time of 04:59 and the new sample has a timestamp of 05:00, step 972 may include updating the end time of the event to 05:59 (or any other time that occurs after 05:00) such that the adjusted time period associated with the event includes the timestamp of the new sample. If the original end time of the existing event is "Null" and the new sample extends the end time of the existing event, step 972 may maintain the original end time of "Null."

Returning to step 966, if the sample is not part of an existing event (i.e., the result of step 966 is "no"), process 960 may proceed to creating a new event based on the state and the timestamp of the new sample (step 974). The new event may have a state that matches the state assigned to the new sample in step 964. The new event may have a start time equal to the timestamp of the sample and an end time that occurs after the timestamp of the sample such that the time period associated with the new event includes the timestamp of the sample. The end time may have a value of "Null" if the new event is the last event in the eventseries or a non-null value of the new event is not the last event in the eventseries.

For example, if the next event in the timeseries begins at timestamp 06:00, step 974 may include setting the end time of the new event to 05:59.

After creating the new event in step 974, process 960 may perform steps 976-988 to update other events in the event-series based on the new information provided by the new event. For example, if the new event is the last event in the eventseries (i.e., the result of step 976 is "yes"), process 960 may update the end time of the previous event (i.e., the event that occurs immediately before the new event) (step 978). The update performed in step 978 may include setting the end time of the previous event to a time immediately before the timestamp of the new sample. For example, if the new sample has a timestamp of 05:00, step 978 may include updating the end time of the previous event to 04:59. If the new event is not the last event in the eventseries (i.e., the result of step 976 is "no"), process 960 may proceed to step 980.

If the new event occurs between existing events in the eventseries (i.e., the result of step 980 is "yes"), process 960 may update the end time of the previous event (step 982). The update performed in step 982 may be the same as the update performed in step 978. For example, the update performed in step 982 may include setting the end time of the previous event to a time immediately before the time-stamp of the new sample. If the new event does not occur between existing events in the eventseries (i.e., the result of step 980 is "no"), process 960 may proceed to step 984.

If the new event splits an existing event in the eventseries (i.e., the result of step 984 is "yes"), process 960 may split the existing event into two events with the new event in between. In some embodiments, splitting the existing event into two events includes updating the end time of the existing event to end before the new event (step 986) and creating a second new event beginning after the first new event and ending at the previous end time of the existing event (step 988). For example, consider a situation in which the existing event has a start time of 04:00, an end time of 11:59, and a state of "Warm." The new event added in step 974 may have a start time of 08:00, an end time of 08:59, and a state of "Hot." Accordingly, step 986 may include chang-ing the end time of the existing event to 07:59 such that the existing event corresponds to a first "Warm" event and covers the time period from 04:00 to 07:59. The intervening "Hot" event may cover the time period from 08:00 to 08:59. The second new event created in step 988 (i.e., the second "Warm" event) may have a start time of 09:00 and an end time of 11:59. The state of the second new event may be the same as the state of the existing event.

Properties of Events and Eventseries

Similar to timeseries, an eventseries can be used in two ways. In some embodiments, an event series is used for storage only. For example, events can be created by an external application and stored in an eventseries. In this scenario, the eventseries is used only as a storage container. In other embodiments, eventseries can be used for both storage and processing. For example, events can be created by eventseries generator 615 based on raw or derived timeseries by applying a set of rules, as previously described. In this scenario, the eventseries is both the storage container and the mechanism for creating the events.

In some embodiments, each eventseries includes the following properties or attributes: EventseriesID, OrgID, InputTimeseriesID, StateTimeseriesID, Rules, and Status. The EventseriesID property may be a unique ID generated by eventseries generator 615 when a new eventseries is created. The EventseriesID property can be used to uniquely identify the eventseries and distinguish the eventseries from other eventseries. The OrgID property may identify the organization (e.g., "ABC Corporation") to which the event-series belongs. Similar to timeseries, each eventseries may belong to a particular organization, building, facility, or other entity (described in greater detail with reference to FIGS. 11A-11B).

The InputTimeseriesID property may identify the time-series used to create the eventseries. For example, if the eventseries is a series of outdoor air temperature (OAT) events, the InputTimeseriesID property may identify the OAT timeseries from which the OAT eventseries is gener-ated. In some embodiments, the input timeseries has the following format:

$$[ < key, timestamp_1, value_1 >, < key, timestamp_2,$$

$$value_2 >, < key, timestamp_3, value_3 >]$$

where key is an identifier of the source of the data samples (e.g., timeseries ID, sensor ID, etc.), $timestamp_i$ identifies a time associated with the ith sample, and $value_i$ indicates the value of the ith sample.

The Rules property may identify a list of rules that are applied to the input timeseries to assign a particular state to each sample of the input timeseries. In some embodiments, the list of rules includes a plurality of rules that are applied in a particular order. The order may be defined by the logical structure of the rules. For example, the rules may include a set of "If" and "ElseIf" statements that are evaluated in the order in which the statements appear in the set of rules. An example of a set of rules is as follows:

$$If \; OAT > 100, State = Hot$$

$$Else \; If \; 100 \geq OAT > 80, State = Warm$$

$$Else \; If \; 80 \geq OAT > 50, State = Cool$$

$$Else \; If \; 50 \geq OAT, State = Cold$$

The StateTimeseriesID property may identify the state timeseries in which the assigned states are stored. The state timeseries can be created by applying the set of rules to an input timeseries as previously described. In some embodi-ments, the state timeseries includes a state value and a timestamp for each sample of the state timeseries. An example of a state timeseries is as follows:

$$[ \langle state_1, timestamp_1 \rangle, \langle state_2, timestamp_2 \rangle, \ldots$$

$$\langle state_N, timestamp_N \rangle ]$$

where $state_i$ is the state assigned to the ith sample of the input timeseries, $timestamp_i$ is the timestamp of the ith sample of the input timeseries, and N is the total number of samples in the input timeseries.

The Status property may indicate whether the eventseries is active (i.e., Status=Active) or inactive (i.e., Status=Inactive). In some embodiments, an eventseries is active by default when the eventseries is created. An event-series can be deactivated by events service 603. Events service 603 can change the Status property from active to inactive upon deactivating an eventseries.

Each eventseries may include a set of events. Each event may include the following properties: EventID, State, Start-Timestamp, EndTimestamp, and EventseriesID. The EventID property may be a unique ID generated by eventseries generator 615 when a new event is created. The EventID property can be used to uniquely identify a particular event and distinguish the event from other events in the event-series. The State property may be a text string that defines the state associated with the event. Each event may be uniquely associated with one state. The StartTimestamp property may indicate the start time of the event, whereas the EndTimestamp property may indicate the end time of the event. The StartTimestamp and EndTimestamp properties may be timestamps in any of a variety of formats (e.g., 2017-01-01T00:00:00). The EventseriesID property may identify the eventseries which includes the event. The Event-seriesID property may be the same unique identifier used to identify and distinguish eventseries from each other.

Event Service

Referring again to FIG. 6, timeseries service 528 is shown to include an event service 603. In some embodiments, event service 603 is part of timeseries service 528. In other embodiments, event service 603 is a separate service (i.e., separate from timeseries service 528) within data platform services 520. Event service 603 can be configured to receive and process requests for information relating to various events and eventseries. Event service 603 can also create and update events and eventseries in response to a request from an application or a user. Several examples of how event service 603 can handle requests are described below. The following table identifies the types of actions event service 603 can perform with respect to events and eventseries:

```
    "status": "active",
    "processingType": "stream"
}
```

In some embodiments, event service 603 is configured to create a new eventseries in response to a request containing an OrgID attribute, an InputTimeseriesID attribute, a State-TimeseriesID attribute, and a Rules attribute. For example, event service 603 can receive the following request:

```
{
    "orgId": "Abc Inc",
    "inputTimeseriesId": "793c156e4-603f-4b2e-bt82-ce7b0f829uj3",
    "stateTimeseriesId": "uic157e4-6r2f-4b25-b682-ct7b0f82917u",
    "rules": [
        {"compareOp": "Gt", "scalar": 100, "state": "Hot"},
        {"compareOp": "Gt", "scalar": 80, "state": "Warm"},
        {"compareOp": "Gt", "scalar": 50, "state": "Cool"},
        {"compareOp": "Lte", "scalar": 50, "state": "Cold"}
    ]
}
``` where "793c156e4-603f-4b2e-bt82-ce7b0f829uj3" is the ID of the input timeseries used to generate the eventseries, "uic157e4-6r2f-4b25-b682-ct7b0f82917u" is the ID of the state timeseries containing the states assigned to each

| Resource | GET (read) | POST (create) | PUT (update) |
|---|---|---|---|
| /Eventseries | Retrieve list of Eventseries | Create one or more new Eventseries | N/A |
| /Eventseries/{eventseriesId} | Read a specific Eventseries | Create a specific Eventseries | Update the specific Eventseries |
| /Events | Retrieve a list of Events | Create one or more new Events | N/A |
| /Events/{eventId} | Read a specific Event | Create a specific Event | Update the specific Event |

Event service 603 can be configured to create a new eventseries in response to a request containing an OrgID attribute and a processing type attribute. For example, event service 603 can receive the following request:

```
Post {timeseriesV2}/eventseries/new
{
    "orgId": "Abc Inc",
    "ProcessingType" : "none"
}
``` where "Abc Inc" is the ID of the organization to which the new eventseries will belong and no processing type is specified.

In response to this request, event service 603 can create a new eventseries (i.e., an empty eventseries container) and assign an EventseriesID to the eventseries. For example, event service 603 can respond to the request as follows:

```
{
    "eventseriesId": "c7c157e4-603f-4b25-b182-ce7b0f8291d8",
    "orgId": "Abc Inc",
    "inputTimeseriesId": null,
    "stateTimeseriesId": null,
    "rules": null,
``` sample of the input timeseries, and the "rules" attribute contains a set of rules used to assign a state to each sample of the input timeseries.

In response to this request, event service 603 can create a new eventseries (i.e., an empty eventseries container) and assign an EventseriesID to the eventseries. For example, event service 603 can respond to the request as follows:

```
{
    "eventseriesId": "c7c157e4-603f-4b25-b182-ce7b0f8291d8",
    "orgId": "Abc Inc",
    "inputTimeseriesId": "793c156e4-603f-4b2e-bt82-ce7b0f829uj3",
    "stateTimeseriesId": "uic157e4-6r2f-4b25-b682-ct7b0f82917u",
    "rules": [
        {"compareOp": "Gt", "scalar": 100, "state": "Hot"},
        {"compareOp": "Gt", "scalar": 80, "state": "Warm"},
        {"compareOp": "Gt", "scalar": 50, "state": "Cool"},
        {"compareOp": "Lte", "scalar": 50, "state": "Cold"}
    ],
    "status": "active",
    "processingType": "stream"
}
```

In some embodiments, event service 603 is configured to add new events to an existing eventseries. For example, event service 603 can receive a request to add a new event to an eventseries. The request may specify the EventseriesID, the start time of the event, the end time of the event, and the state associated with the event, as shown in the following request:

```
Post {timeseriesV2}/eventseries/c7c157e4-603f-4b25-b182-
ce7b0f8291d8/events
[
    {
        "eventseriesId": "c7c157e4-603f-4b25-b182-ce7b0f8291d8",
        "startTimestamp": "2017-04-01 13:48:23-05:00",
        "endTimestamp": "2017-04-01 13:54:11-05:00",
        "state": "High Pressure Alarm"
    }
]
```

In response to this request, event service 603 can generate a new EventID for the new event and can add the new event to the eventseries designated by the EventseriesID "c7c157e4-603f-4b25-b182-ce7b0f8291d8." The new event may have the start time "2017-04-01 13:48:23-05:00," the end time "2017-04-01 13:54:11-05:00," and the state "High Pressure Alarm" as specified in the request. In some embodiments, event service 603 responds to the request by acknowledging that the new event has been added to the eventseries.

In some embodiments, event service 603 is configured to update existing events in an eventseries. For example, event service 603 can receive a request to add update one or more properties of an existing event in an eventseries. The request may specify the EventseriesID, the updated start time of the event, the updated end time of the event, and/or the updated state associated with the event, as shown in the following request:

```
Put {timeseriesV2}/eventseries/c7c157e4-603f-4b25-b182-
ce7b0f8291d8/events/c7c157e4-603f-4b25-b182-ce7b0f8291d8
    {
        "eventseriesId": "c7c157e4-603f-4b25-bl82-ce7b0f8291d8",
        "startTimestamp": "2017-04-01 13:48:23-05:00",
        "endTimestamp": "2017-04-01 13:54:11-05:00",
        "state": "High Pressure Alarm"
    }
```

In response to this request, event service 603 can update the specified properties of the event designated by EventseriesID "c7c157e4-603f-4b25-b182-ce7b0f8291d8." The updated event may have the start time "2017-04-01 13:48:23-05:00," the end time "2017-04-01 13:54:11-05:00," and the state "High Pressure Alarm" as specified in the request. In some embodiments, event service 603 responds to the request by acknowledging that the event has been updated.

In some embodiments, event service 603 is configured to read the events of an eventseries. For example, event service 603 can receive a request to identify all of the events associated with an eventseries. The request may be specified as a get request as follows:

```
Get{timeseriesV2}/eventseries/c7c157e4-603f-4b25-
b182-ce7b0f8291d8/events
``` where "c7c157e4-603f-4b25-b182-ce7b0f8291d8" is the EventseriesID of a specific eventseries.

In response to this request, event service 603 can search for all events of the specified eventseries and can return a list of the identified events. An example response which can be provided by event service 603 is as follows:

```
[
    {
        "eventid": "g9c197e4-003f-4u25-b182-se7b0f81945y",
        "eventseriesId": "c7c157e4-603f-4b25-b182-ce7b0f8291d8",
        "startTimestamp": "2017-04-01 13:48:23-05:00",
        "endTimestamp": "2017-04-01 13:54:11-05:00",
        "state": "High Pressure Alarm"
    }
]
``` where "g9c197e4-003f-4u25-b182-se7b0f81945y" is the EventID of an identified event matching the search parameters. The response may specify the EventseriesID, StartTimestamp, EndTimestamp, and State properties of each identified event.

In some embodiments, event service 603 is configured to search for the events of an eventseries that have a specific state. For example, event service 603 can receive a request to identify all of the events associated with a particular eventseries which have a specific state. The request may be specified as a get request as follows:

```
Get {timeseriesV2}/eventseries/c7c157e4-603f-4b25-
b182-ce7b0f8291d8/events?state=Hot
``` where "c7c157e4-603f-4b25-b182-ce7b0f8291d8" is the EventseriesID of a particular eventseries and "state=Hot" specifies that the search should return only events of the eventseries that have the state "Hot." In response to this request, event service 603 may search for all matching events (i.e., events of the specified eventseries that have the specified state) and may return a list of events that match the search parameters.

In some embodiments, event service 603 is configured to search for the events of an eventseries that have a start time or end time matching a given value. For example, event service 603 can receive a request to identify all of the events of a particular eventseries that have a start time or end time that matches a specified timestamp. The request may be specified as a get request as follows:

```
Get {timeseriesV2}/eventseries/c7c157e4-603f-4b25-b182-
ce7b0f8291d8/events?startTime=2017-04-01%2010:00:00-
05:00&endTime=2017-04-01%2010:00:00-05:00
``` where "c7c157e4-603f-4b25-b182-ce7b0f8291d8" is the EventseriesID of a particular eventseries and the "startTime" and "endTime" parameters specify the start time and end time of the event. In response to this request, event service 603 may search for all matching events (i.e., (startTimestamp of event<startTime and endTimestamp of event>endTime) and may return a list of events that match the search parameters.

In some embodiments, event service 603 is configured to search for the events of an eventseries that have a time range overlapping (at least partially) with a specified time range. For example, event service 603 can receive a request to identify all of the events of a particular eventseries that have (1) an event start time before a specified start time and an event end time after the specified start time or (2) an event start time before a specified end time and an event end time after the specified end time. The request may be specified as a get request as follows:

Get {timeseriesV2}/eventseries/c7c157e4-603f-4b25-b182-
ce7b0f8291d8/events?startTime=2017-04-01%2010:00:00-
05:00&endTime=2017-04-01%2011:59:00-05:00 where "c7c157e4-603f-4b25-b182-ce7b0f8291d8" is the EventseriesID of a particular eventseries and the "startTime" and "endTime" parameters specify the start time and end time of the event. In response to this request, event service 603 may search for all events that match the following criteria:

[(startTimestamp of event < startTime of query) AND (endTimestamp of
event > startTime of query)] OR [(startTimestamp of event < endTime of
query) AND (endTimestamp of event > endTime of query)]

and may return a list of events that match these criteria.

In some embodiments, event service 603 is configured to search for events of an eventseries that have a specific state and a time range that overlaps (at least partially) with a given time range. For example, event service 603 can receive a request to identify all of the events of a particular eventseries that have a particular state and either (1) an event start time before a specified start time and an event end time after the specified start time or (2) an event start time before a specified end time and an event end time after the specified end time. The request may be specified as a get request as follows:

Get {timeseriesV2}/eventseries/c7c157e4-603f-4b25-b182-
ce7b0f8291d8/events?state=Hot&startTime=2017-04-01%2010:00:00-
05:00&endTime=2017-04-01%2011:59:00-05:00 where "c7c157e4-603f-4b25-b182-ce7b0f8291d8" is the EventseriesID of a particular eventseries, the "state" parameter specifies a particular state, and the "startTime" and "endTime" parameters specify the start time and end time of the event. In response to this request, event service 603 may search for all events that match the following criteria:

State=Hot AND
[(startTimestamp of event < startTime of query) AND (endTimestamp of
event > startTime of query)] OR [(startTimestamp of event < endTime of
query) AND (endTimestamp of event > endTime of query)]

and may return a list of events that match these criteria.

Directed Acyclic Graphs

Referring again to FIG. 6, timeseries processing engine 604 is shown to include a directed acyclic graph (DAG) generator 620. DAG generator 620 can be configured to generate one or more DAGs for each raw data timeseries. Each DAG may define a workflow or sequence of operations which can be performed by timeseries operators 606 on the raw data timeseries. When new samples of the raw data timeseries are received, workflow manager 622 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL). In some embodiments, each DAG (i.e., each timeseries processing workflow) applies to one or more input timeseries and is triggered when a new sample of any of the one or more input timeseries is received.

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 608 can use the DAG to identify the duration of the time window (e.g., an hour, a day, a week, etc.) over which the data aggregation operation will be performed. Sample aggregator 608 can use the timestamps of the data samples in the timeseries provided as an input to the DAG to identify the location of the time window (i.e., the start time and the end time). Sample aggregator 608 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figures 10A, 10B:
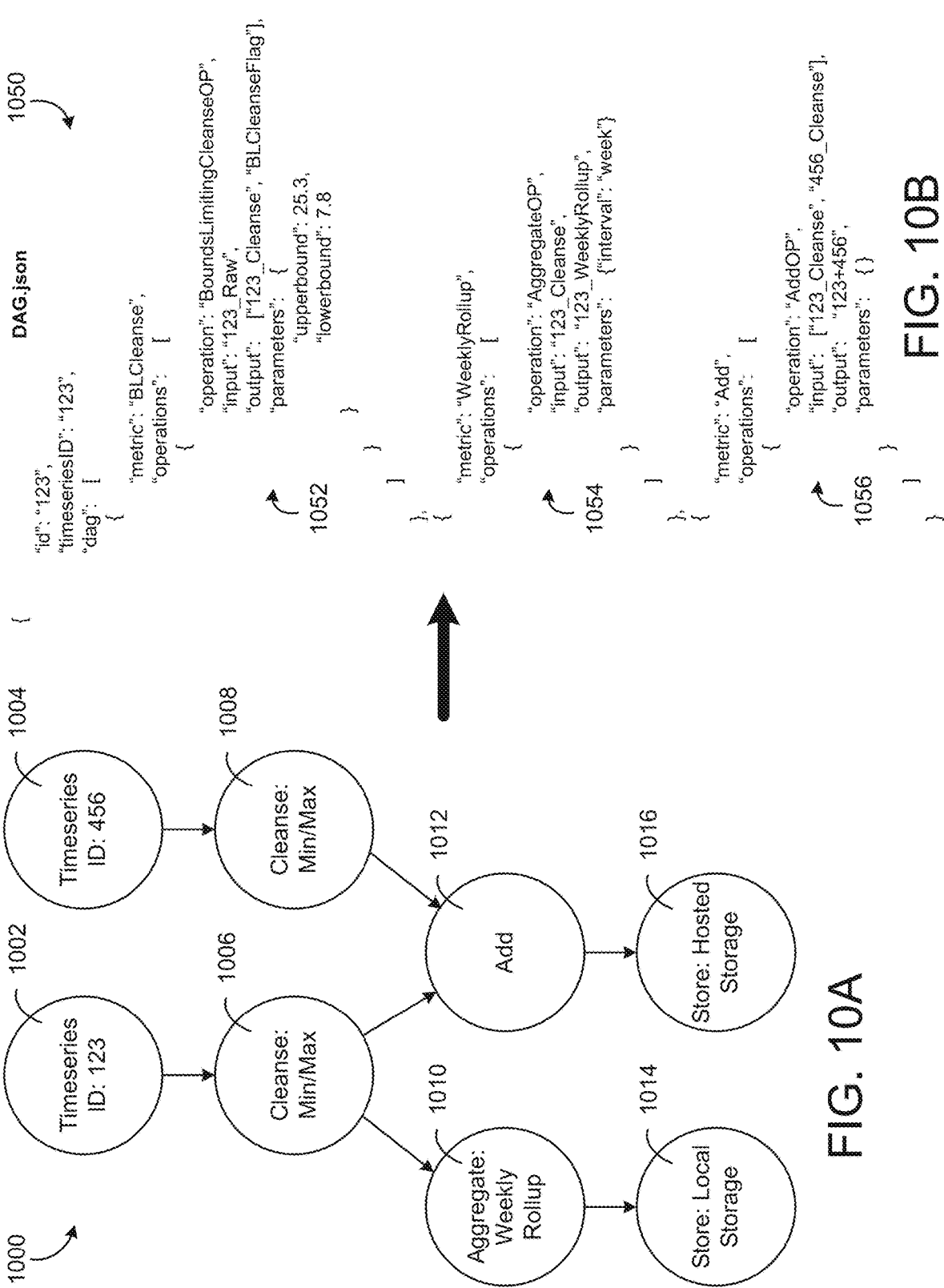
FIG. 10A is a directed acyclic graph (DAG) which can be generated by the DAG generator of FIG. 6, according to some embodiments.
FIG. 10B is a code snippet which can be automatically generated by the DAG generator of FIG. 6 based on the DAG, according to some embodiments.

Referring now to FIG. 10A, an example of a DAG 1000 which can be created by DAG generator 620 is shown, according to an exemplary embodiment. DAG 1000 is shown as a structured tree representing a graph of the dataflow rather than a formal scripting language. Blocks 1002 and 1004 represent the input timeseries which can be specified by timeseries ID (e.g., ID 123, ID 456, etc.). Blocks 1006 and 1008 are functional blocks representing data cleansing operations. Similarly, block 1010 is a functional block representing a weekly rollup aggregation and block 1012 is a functional block representing an addition operation. Blocks 1014 and 1016 represent storage operations indicating where the output of DAG 1000 should be stored (e.g., local storage, hosted storage, etc.).

In DAG 1000, the arrows connecting blocks 1002-1016 represent the flow of data and indicate the sequence in which the operations defined by the functional blocks should be performed. For example, the cleansing operation represented by block 1006 will be the first operation performed on the timeseries represented by block 1002. The output of the cleansing operation in block 1006 will then be provided as an input to both the aggregation operation represented by block 1010 and the addition operation represented by block 1012. Similarly, the cleansing operation represented by block 1008 will be the first operation performed on the timeseries represented by block 1004. The output of the cleansing operation in block 1008 will then be provided as an input to the addition operation represented by block 1012.

In some embodiments, DAG 1000 can reference other DAGs as inputs. Timeseries processing engine 604 can stitch the DAGs together into larger groups. DAG 1000 can support both scalar operators (e.g., run this function on this sample at this timestamp) and aggregate window operators (e.g., apply this function over all the values in the timeseries from this time window). The time windows can be arbitrary and are not limited to fixed aggregation windows. Logical operators can be used to express rules and implement fault detection algorithms. In some embodiments, DAG 1000 supports user-defined functions and user-defined aggregates.

In some embodiments, DAG 1000 is created based on user input. A user can drag-and-drop various input blocks 1002-1004, functional blocks 1006-1012, and output blocks 1014-1016 into DAG 1000 and connect them with arrows to define a sequence of operations. The user can edit the operations to define various parameters of the operations. For example, the user can define parameters such as upper and lower bounds for the data cleansing operations in blocks 1006-1008 and an aggregation interval for the aggregation operation in block 1010. DAG 1000 can be created and edited in a graphical drag-and-drop flow editor without requiring the user to write or edit any formal code. In some embodiments, DAG generator 620 is configured to automatically generate the formal code used by timeseries operators 606 based on DAG 1000.

Referring now to FIG. 10B, an example of code 1050 which can be generated by DAG generator 620 is shown, according to an exemplary embodiment. Code 1050 is shown as a collection of JSON objects 1052-1056 that represent the various operations defined by DAG 1000. Each JSON object corresponds to one of the functional blocks in DAG 1000 and specifies the inputs/sources, the computation, and the outputs of each block. For example, object 1052 corresponds to the cleansing operation represented by block 1006 and defines the input timeseries (i.e., "123_Raw"), the particular cleansing operation to be performed (i.e., "BoundsLimitingCleanseOP"), the parameters of the cleansing operation (i.e., "upperbound" and "lowerbound") and the outputs of the cleansing operation (i.e., "123_Cleanse" and "BLCleanseFlag").

Similarly, object 1054 corresponds to the aggregation operation represented by block 1010 and defines the input timeseries (i.e., "123_Cleanse"), the aggregation operation to be performed (i.e., "AggregateOP"), the parameter of the aggregation operation (i.e., "interval": "week") and the output of the aggregation operation (i.e., "123_WeeklyRollup"). Object 1056 corresponds to the addition operation represented by block 1012 and defines the input timeseries (i.e., "123_Cleanse" and "456_Cleanse"), the addition operation to be performed (i.e., "AddOP"), and the output of the addition operation (i.e., "123+456"). Although not specifically shown in FIG. 10B, code 1050 may include an object for each functional block in DAG 1000.

Advantageously, the declarative views defined by the DAGs provide a comprehensive view of the operations applied to various input timeseries. This provides flexibility to run the workflow defined by a DAG at query time (e.g., when a request for derived timeseries data is received) or prior to query time (e.g., when new raw data samples are received, in response to a defined event or trigger, etc.). This flexibility allows timeseries processing engine 604 to perform some or all of their operations ahead of time and/or in response to a request for specific derived data timeseries.

Referring again to FIG. 6, timeseries processing engine 604 is shown to include a DAG optimizer 618. DAG optimizer 618 can be configured to combine multiple DAGs or multiple steps of a DAG to improve the efficiency of the operations performed by timeseries operators 606. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 618 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 618 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 618 schedules timeseries operators 606 to nodes where data is resident in memory in order to further reduce the amount of data required to be loaded from timeseries databases 628 and 636.

Entity Graph

Figure 11A:
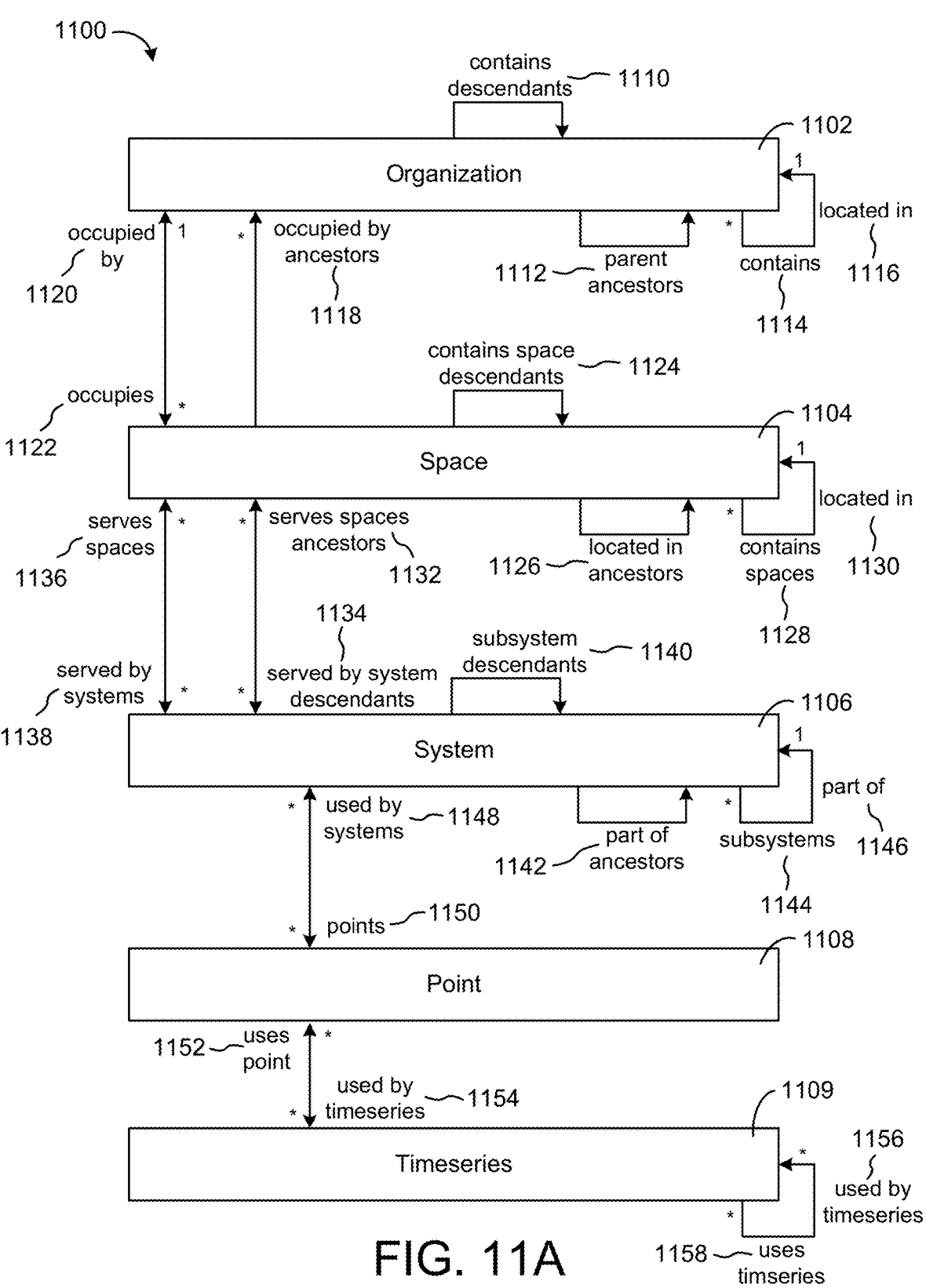
FIG. 11A is an entity graph illustrating relationships between an organization, a space, a system, a point, and a timeseries, which can be used by the data collector of FIG. 5, according to some embodiments.

Referring now to FIG. 11A, an entity graph 1100 is shown, according to some embodiments. In some embodiments, entity graph 1100 is generated or used by data collector 512, as described with reference to FIG. 5. Entity graph 1100 describes how a building is organized and how the different systems and spaces within the building relate to each other. For example, entity graph 1100 is shown to include an organization 1102, a space 1104, a system 1106, a point 1108, and a timeseries 1109. The arrows interconnecting organization 1102, space 1104, system 1106, point 1108, and timeseries 1109 identify the relationships between such entities. In some embodiments, the relationships are stored as attributes of the entity described by the attribute.

Organization 1102 is shown to include a contains descendants attribute 1110, a parent ancestors attribute 1112, a contains attribute 1114, a located in attribute 1116, an occupied by ancestors attribute 1118, and an occupies by attribute 1122. The contains descendants attribute 1110 identifies any descendant entities contained within organization 1102. The parent ancestors attribute 1112 identifies any parent entities to organization 1102. The contains attribute 1114 identifies any other organizations contained within organization 1102. The asterisk alongside the contains attribute 1114 indicates that organization 1102 can contain any number of other organizations. The located in attribute 1116 identifies another organization within which organization 1102 is located. The number 1 alongside the located in attribute 1116 indicates that organization 1102 can be located in exactly one other organization. The occupies attribute 1122 identifies any spaces occupied by organization 1102. The asterisk alongside the occupies attribute 1122 indicates that organization 1102 can occupy any number of spaces.

Space 1104 is shown to include an occupied by attribute 1120, an occupied by ancestors attribute 1118, a contains space descendants attribute 1124, a located in ancestors attribute 1126, a contains spaces attribute 1128, a located in attribute 1130, a served by systems attribute 1138, and a served by system descendants attribute 1134. The occupied by attribute 1120 identifies an organization occupied by space 1104. The number 1 alongside the occupied by attribute 1120 indicates that space 1104 can be occupied by exactly one organization. The occupied by ancestors attribute 1118 identifies one or more ancestors to organization 1102 that are occupied by space 1104. The asterisk alongside the occupied by ancestors attribute 1118 indicates that space 1104 can be occupied by any number of ancestors.

The contains space descendants attribute 1124 identifies any descendants to space 1104 that are contained within space 1104. The located in ancestors attribute 1126 identifies any ancestors to space 1104 within which space 1104 is located. The contains spaces attribute 1128 identifies any other spaces contained within space 1104. The asterisk alongside the contains spaces attribute 1128 indicates that space 1104 can contain any number of other spaces. The located in attribute 1130 identifies another space within which space 1104 is located. The number 1 alongside the located in attribute 1130 indicates that space 1104 can be located in exactly one other space. The served by systems attribute 1138 identifies any systems that serve space 1104. The asterisk alongside the served by systems attribute 1138 indicates that space 1104 can be served by any number of systems. The served by system descendants attribute 1134 identifies any descendent systems that serve space 1104. The asterisk alongside the served by descendant systems attribute 1134 indicates that space 1104 can be served by any number of descendant systems.

System 1106 is shown to include a serves spaces attribute 1136, a serves space ancestors attribute 1132, a subsystem descendants attribute 1140, a part of ancestors attribute 1142, a subsystems attribute 1144, a part of attribute 1146, and a points attribute 1150. The serves spaces attribute 1136 identifies any spaces that are served by system 1106. The asterisk alongside the serves spaces attribute 1136 indicates that system 1106 can serve any number of spaces. The serves space ancestors attribute 1132 identifies any ancestors to space 1104 that are served by system 1106. The asterisk alongside the serves ancestor spaces attribute 1132 indicates that system 1106 can serve any number of ancestor spaces.

The subsystem descendants attribute 1140 identifies any subsystem descendants of other systems contained within system 1106. The part of ancestors attribute 1142 identifies any ancestors to system 1106 that system 1106 is part of. The subsystems attribute 1144 identifies any subsystems contained within system 1106. The asterisk alongside the subsystems attribute 1144 indicates that system 1106 can contain any number of subsystems. The part of attribute 1146 identifies any other systems that system 1106 is part of. The number 1 alongside the part of attribute 1146 indicates that system 1106 can be part of exactly one other system. The points attribute 1150 identifies any data points that are associated with system 1106. The asterisk alongside the points attribute 1150 indicates that any number of data points can be associated with system 1106.

Point 1108 is shown to include a used by system attribute 1148. The asterisk alongside the used by system attribute 1148 indicates that point 1108 can be used by any number of systems. Point 1108 is also shown to include a used by timeseries attribute 1154. The asterisk alongside the used by timeseries attribute 1154 indicates that point 1108 can be used by any number of timeseries (e.g., raw data timeseries virtual point timeseries, data rollup timeseries, etc.). For example, multiple virtual point timeseries can be based on the same actual data point 1108. In some embodiments, the used by timeseries attribute 1154 is treated as a list of timeseries that subscribe to changes in value of data point 1108. When the value of point 1108 changes, the timeseries listed in the used by timeseries attribute 1154 can be identified and automatically updated to reflect the changed value of point 1108.

Timeseries 1109 is shown to include a uses point attribute 1152. The asterisk alongside the uses point attribute 1152 indicates that timeseries 1109 can use any number of actual data points. For example, a virtual point timeseries can be based on multiple actual data points. In some embodiments, the uses point attribute 1152 is treated as a list of points to monitor for changes in value. When any of the points identified by the uses point attribute 1152 are updated, timeseries 1109 can be automatically updated to reflect the changed value of the points used by timeseries 1109.

Timeseries 1109 is also shown to include a used by timeseries attribute 1156 and a uses timeseries attribute 1158. The asterisks alongside the used by timeseries attribute 1156 and the uses timeseries attribute 1158 indicate that timeseries 1109 can be used by any number of other timeseries and can use any number of other timeseries. For example, both a data rollup timeseries and a virtual point timeseries can be based on the same raw data timeseries. As another example, a single virtual point timeseries can be based on multiple other timeseries (e.g., multiple raw data timeseries). In some embodiments, the used by timeseries attribute 1156 is treated as a list of timeseries that subscribe to updates in timeseries 1109. When timeseries 1109 is updated, the timeseries listed in the used by timeseries attribute 1156 can be identified and automatically updated to reflect the change to timeseries 1109. Similarly, the uses timeseries attribute 1158 can be treated as a list of timeseries to monitor for updates. When any of the timeseries identified by the uses timeseries attribute 1158 are updated, timeseries 1109 can be automatically updated to reflect the updates to the other timeseries upon which timeseries 1109 is based.

Figure 11B:
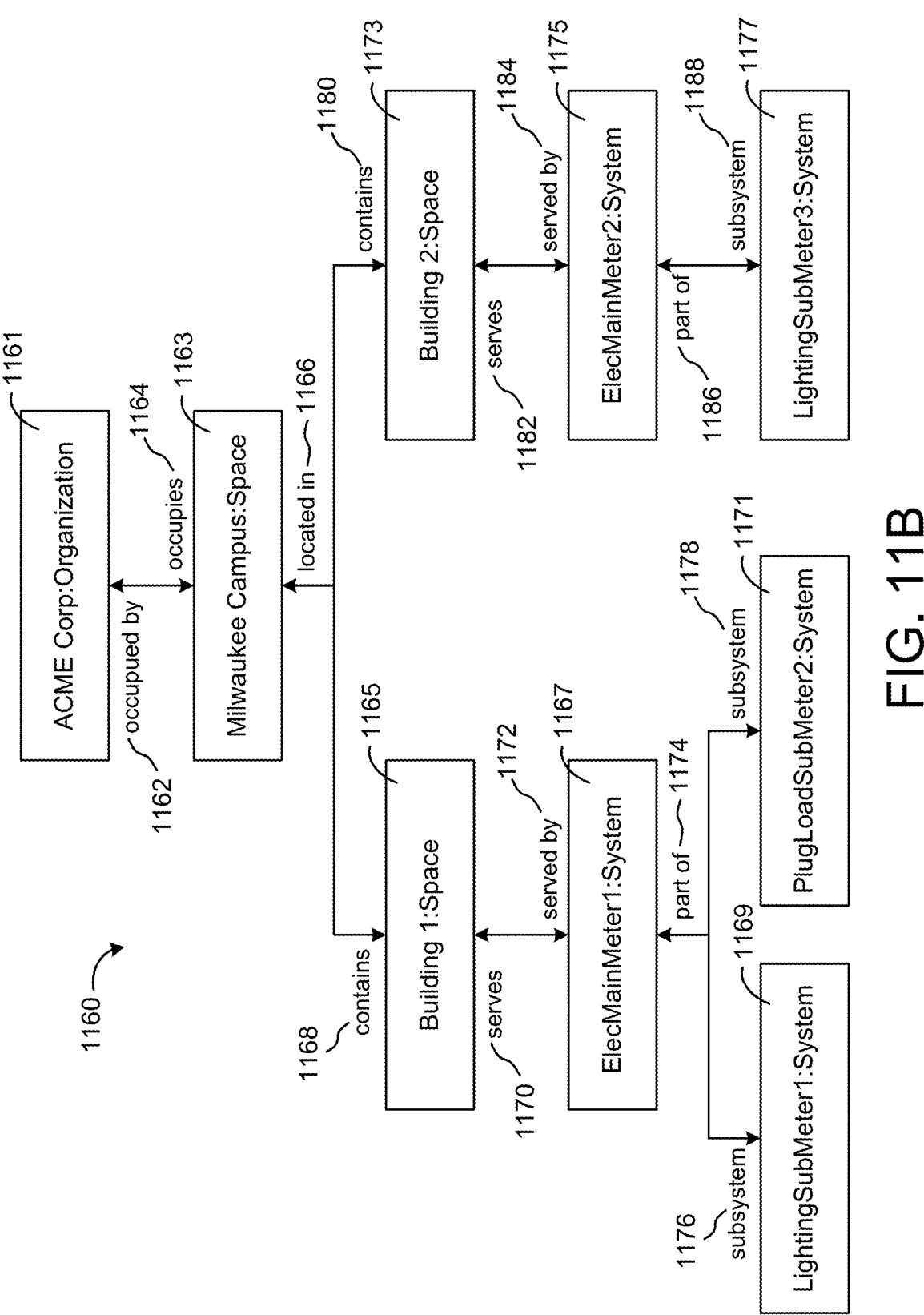
FIG. 11B is an example of an entity graph for a particular building management system according to some embodiments.

Referring now to FIG. 11B, an example of an entity graph 1160 for a particular building management system is shown, according to some embodiments. Entity graph 1160 is shown to include an organization 1161 ("ACME Corp"). Organization 1161 be a collection of people, a legal entity, a business, an agency, or other type of organization. Organization 1161 occupies space 1163 ("Milwaukee Campus"), as indicated by the occupies attribute 1164. Space 1163 is occupied by organization 1161, as indicated by the occupied by attribute 1162.

In some embodiments, space 1163 is a top level space in a hierarchy of spaces. For example, space 1163 can represent an entire campus (i.e., a collection of buildings). Space 1163 can contain various subspaces (e.g., individual buildings) such as space 1165 ("Building 1") and space 1173 ("Building 2"), as indicated by the contains attributes 1168 and 1180. Spaces 1165 and 1180 are located in space 1163, as indicated by the located in attribute 1166. Each of spaces 1165 and 1173 can contain lower level subspaces such as individual floors, zones, or rooms within each building. However, such subspaces are omitted from entity graph 1160 for simplicity.

Space 1165 is served by system 1167 ("ElecMainMeter1") as indicated by the served by attribute 1172. System 1167 can be any system that serves space 1165 (e.g., a HVAC system, a lighting system, an electrical system, a security system, etc.). The serves attribute 1170 indicates that system 1167 serves space 1165. In entity graph 1160, system 1167 is shown as an electrical system having a subsystem 1169 ("LightingSubMeter1") and a subsystem 1171 ("PlugLoadSubMeter2") as indicated by the subsystem attributes 1176 and 1178. Subsystems 1169 and 1171 are part of system 1167, as indicated by the part of attribute 1174.

Space 1173 is served by system 1175 ("ElecMainMeter2") as indicated by the served by attribute 1184. System 1175 can be any system that serves space 1173 (e.g., a HVAC system, a lighting system, an electrical system, a security system, etc.). The serves attribute 1182 indicates that system 1175 serves space 1173. In entity graph 1160, system 1175 is shown as an electrical system having a subsystem 1177 ("LightingSubMeter3") as indicated by the subsystem attribute 1188. Subsystem 1177 is part of system 1175, as indicated by the part of attribute 1186.

In addition to the attributes shown in FIG. 11B, entity graph 1160 can include "ancestors" and "descendants" attributes on each entity in the hierarchy. The ancestors attribute can identify (e.g., in a flat list) all of the entities that are ancestors to a given entity. For example, the ancestors attribute for space 1165 may identify both space 1163 and organization 1161 as ancestors. Similarly, the descendants attribute can identify all (e.g., in a flat list) of the entities that are descendants of a given entity. For example, the descendants attribute for space 1165 may identify system 1167, subsystem 1169, and subsystem 1171 as descendants. This provides each entity with a complete listing of its ancestors and descendants, regardless of how many levels are included in the hierarchical tree. This is a form of transitive closure.

In some embodiments, the transitive closure provided by the descendants and ancestors attributes allows entity graph 1160 to facilitate simple queries without having to search multiple levels of the hierarchical tree. For example, the following query can be used to find all meters under the Milwaukee Campus space 1163:

```
/Systems?$filter=(systemType eq Jci.Be.Data.SystemType'Meter')
and ancestorSpaces/any(a:a/name eq 'Milwaukee Campus')
``` and can be answered using only the descendants attribute of the Milwaukee Campus space 1163. For example, the descendants attribute of space 1163 can identify all meters that are hierarchically below space 1163. The descendants attribute can be organized as a flat list and stored as an attribute of space 1163. This allows the query to be served by searching only the descendants attribute of space 1163 without requiring other levels or entities of the hierarchy to be searched.

Figure 12:
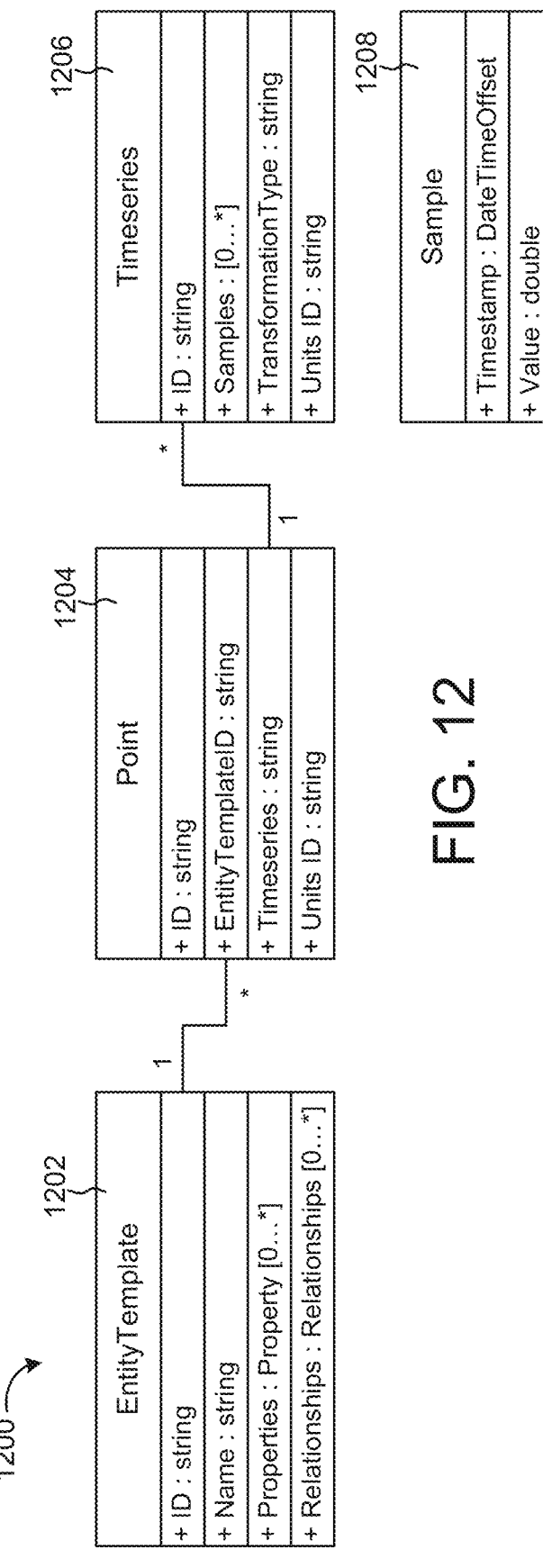
FIG. 12 is an object relationship diagram illustrating relationships between an entity template, a point, a timeseries, and a data sample, which can be used by the data collector of FIG. 5 and the timeseries service of FIG. 6, according to some embodiments.

Referring now to FIG. 12, an object relationship diagram 1200 is shown, according to some embodiments. Relationship diagram 1200 is shown to include an entity template 1202, a point 1204, a timeseries 1206, and a sample 1208. In some embodiments, entity template 1202, point 1204, timeseries 1206, and sample 1208 are stored as data objects within memory 510, local storage 514, and/or hosted storage 516. Relationship diagram 1200 illustrates the relationships between entity template 1202, point 1204, and timeseries 1206.

Entity template 1202 can include various attributes such as an ID attribute, a name attribute, a properties attribute, and a relationships attribute. The ID attribute can be provided as a text string and identifies a unique ID for entity template 1202. The name attribute can also be provided as a text string and identifies the name of entity template 1202. The properties attribute can be provided as a vector and identifies one or more properties of entity template 1202. The relationships attribute can also be provided as a vector and identifies one or more relationships of entity template 1202.

Point 1204 can include various attributes such as an ID attribute, an entity template ID attribute, a timeseries attribute, and a units ID attribute. The ID attribute can be provided as a text string and identifies a unique ID for point 1204. The entity template ID attribute can also be provided as a text string and identifies the entity template 1202 associated with point 1204 (e.g., by listing the ID attribute of entity template 1202). Any number of points 1204 can be associated with entity template 1202. However, in some embodiments, each point 1204 is associated with a single entity template 1202. The timeseries attribute can be provided as a text string and identifies any timeseries associated with point 1204 (e.g., by listing the ID string of any timeseries 1206 associated with point 1204). The units ID attribute can also be provided as a text string and identifies the units of the variable quantified by point 1204.

Timeseries 1206 can include various attributes such as an ID attribute, a samples attribute, a transformation type attribute, and a units ID attribute. The ID attribute can be provided as a text string and identifies a unique ID for timeseries 1206. The unique ID of timeseries 1206 can be listed in the timeseries attribute of point 1204 to associate timeseries 1206 with point 1204. Any number of timeseries 1206 can be associated with point 1204. Each timeseries 1206 is associated with a single point 1204. The samples attribute can be provided as a vector and identifies one or more samples associated with timeseries 1206. The transformation type attribute identifies the type of transformation used to generate timeseries 1206 (e.g., average hourly, average daily, average monthly, etc.). The units ID attribute can also be provided as a text string and identifies the units of the variable quantified by timeseries 1206.

Sample 1208 can include a timestamp attribute and a value attribute. The timestamp attribute can be provided in local time and can include an offset relative to universal time. The value attribute can include a data value of sample 1208. In some instances, the value attribute is a numerical value (e.g., for measured variables). In other instances, the value attribute can be a text string such as "Fault" if sample 1208 is part of a fault detection timeseries.

Nested Stream Generation

Referring now to FIGS. 13A-15B, BMS 500 can be configured to generate nested streams of timeseries data. Nested streams can include various types of derived timeseries created by processing DAGs. For example, nested streams can include data rollup timeseries, virtual point timeseries, weather point timeseries, fault detection timeseries, assigned state timeseries, abnormal event timeseries, and/or any other type of derived timeseries previously described. In some embodiments, the nested streams are created from input timeseries retrieved from local storage 514 and/or hosted storage 516 (as described with reference to FIGS. 13A-13B). In other embodiments, the nested streams are created from streaming data received in real-time from building equipment and/or other data sources (as described with reference to FIG. 14). In some embodiments, the nested streams are used as an intermediate timeseries in a timeseries processing workflow. For example, a first derived timeseries can be created by processing a first DAG and used as an input to a second DAG to create a second derived timeseries (as described with reference to FIGS. 15A-15B).

In some embodiments, the timeseries data contained in the nested streams are used to populate or define various types of smart entities. Smart entities are virtual representations of systems (e.g., a HVAC system, a lighting system, a security system, etc.), devices (e.g., a chiller, a boiler, a sensor, etc.), people, spaces (e.g., Conference Room A, Floor 4, Building 2), or other items associated with building management system 102. Smart entities may also define relationships between various systems, devices, people, and spaces. Smart entities may include attributes that describe a corresponding system, device, person, relationship, or other items represented by the smart entities. In some embodiments, the attributes of smart entities may include the nested timeseries data or may contain pointers to the nested time-series data. The implementation of smart entities in building management system 102 is described in detail in U.S. Provisional Patent Application No. 62/611,974 filed Dec. 29, 2017, and U.S. Provisional Patent Application No. 62/611, 984 filed Dec. 29, 2017. The entire disclosures of both these patent applications are incorporated by reference herein.

Timeseries Processing Workflow

Figure 13A:
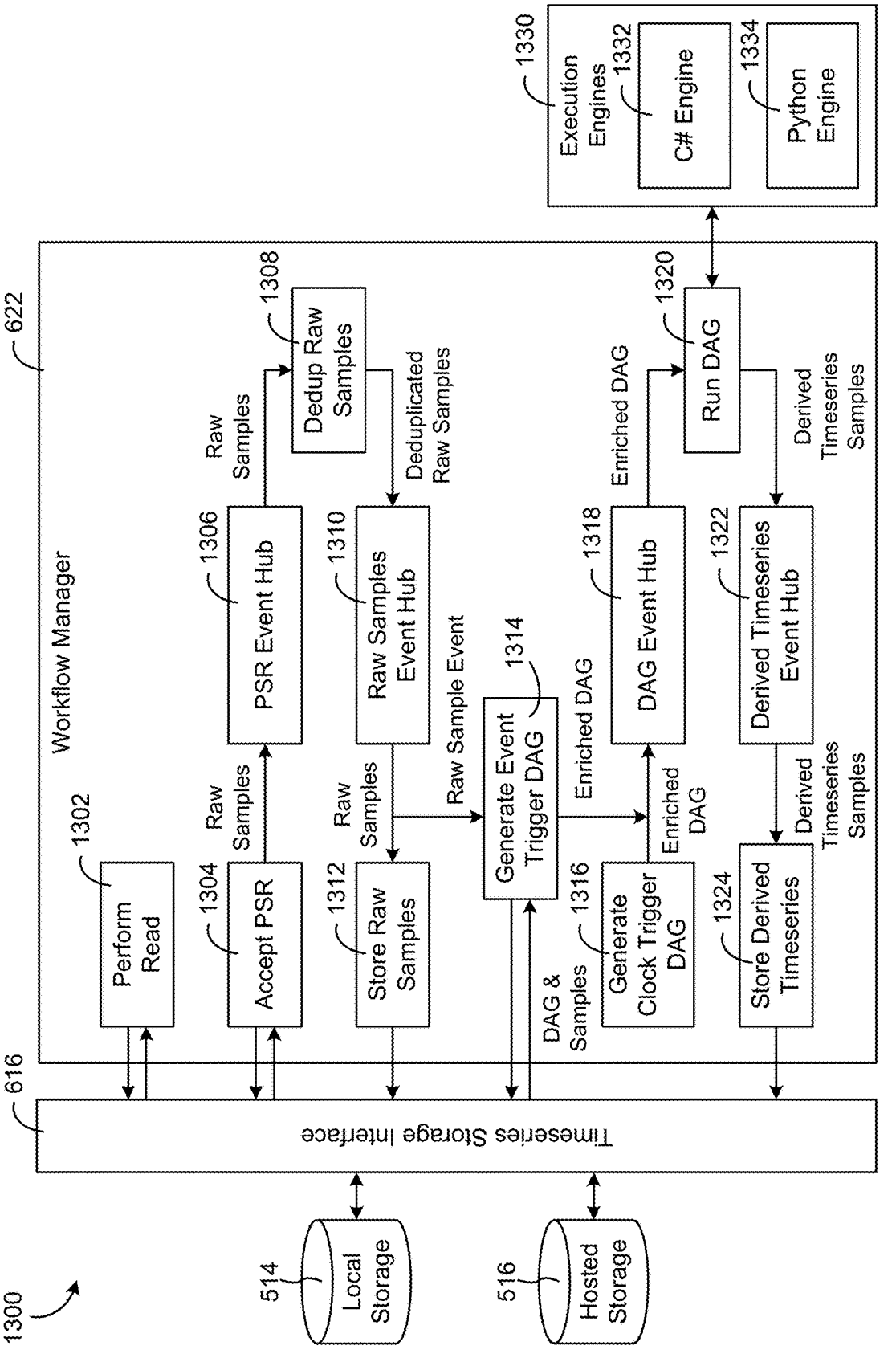
FIG. 13A is a block diagram illustrating a timeseries processing workflow which can be performed by the timeseries service of FIGS. 5-6, according to some embodiments.

Referring particularly to FIG. 13A, a block diagram illustrating a timeseries processing workflow 1300 is shown, according to an exemplary embodiment. Workflow 1300 may be performed by workflow manager 622 in combination with other components of timeseries service 528. Workflow 1300 is shown to include performing a read of the timeseries data (step 1302). Step 1302 may include reading raw data samples and/or the derived data samples provided by time-series storage interface 616. The timeseries data may be stored in local storage 514 or hosted storage 516. In some embodiments, local storage 514 includes on-site data storage (e.g., Redis, PostgreSQL, etc.). Hosted storage 516 may include cloud data storage (e.g., Azure Redis, DocDB, HBase, etc.).

Timeseries storage interface 616 can be configured to read and write a timeseries collection, a samples collection, and a post sample request (PSR) collection. Each of these collections can be stored in local storage 514 and/or hosted storage 516. The timeseries collection may contain all the timeseries registered in workflow manager 622. The time-series collection may also contain the DAG for each time-series. The timeseries collection can be used by workflow manager 622 to accept only PSRs related to valid timeseries registered in workflow manager 622. The timeseries collec-tion can also be used in steps 1314-1316 to lookup the DAG for a specific timeseries ID.

In some embodiments, the entire timeseries collection is loaded into local memory. The timeseries collection can be a regular collection or a partitioned collection (e.g., one partition for approximately every 100 timeseries). In some embodiments, the timeseries collection contains about 200, 000 to 250,000 timeseries. The ID for each document in the timeseries collection may be the timeseries ID. The DAG for each timeseries may contain a set of operations and/or transformations that need to be performed to generate the derived timeseries data based on the timeseries. On regis-tration of a new timeseries, the DAG for the timeseries can be selected from DAG templates. The DAG template may include a set of standard operations applicable to the time-series. On definition of a new metric for a timeseries, the new metric and the list of operations to generate that metric can be added to the DAG.

The samples collection may contain all of the timeseries samples (e.g., raw samples, derived timeseries samples). The samples collection can be used for all GET requests for a specific timeseries ID. A portion of the samples collection can be stored in local memory (e.g., past 48 hours) whereas the remainder of the samples collection can be stored in local storage 514 or hosted storage 516. The samples collection may act as a partitioned collection instead of a regular collection to improve efficiency and performance. In some embodiments, the samples collection is stored in a JSON format and partitioned on timeseries ID. The ID field may be unique for each partition and may have the form "Metric: Timestamp."

The PSR collection may contain all of the PSRs and can be used to provide status updates to the user for a PSR related to a specific timeseries ID. A portion of the PSR collection can be stored in local memory (e.g., past 48 hours) whereas the remainder of the PSR collection can be stored in local storage 514 or hosted storage 516. The PSR collec-tion can be partitioned on timeseries ID. In some embodi-ments, the ID for each document in the PSR collection has the form "TimeseriesID: Timestamp."

Still referring to FIG. 13A, workflow 1300 is shown to include accepting a PSR (step 1304). Step 1304 may be performed by executing a PSR process. In some embodi-ments, the PSR process receives a PSR and determines whether the PSR contains more than one timeseries ID. In response to a determination that the PSR contains more than one timeseries ID, the PSR process may break the PSR into multiple PSRs, each of which is limited to a single time-series ID. The PSRs can be provided to PSR event hub 1306. PSR event hub 1306 can be configured to store PSR events. Each PSR event may include a PSR for one timeseries ID. In some embodiments, each PSR event is stored in the form "TimeseriesID: Timestamp."

Workflow 1300 is shown to include deduplicating raw samples (step 1308). Step 1308 may be performed by executing a deduplication process. In some embodiments, the deduplication process includes accepting PSR events from PSR event hub 1306 and splitting each PSR into a list of samples. Step 1308 may include tagging each sample as a new sample, an updated sample, or a duplicate sample. New samples and updated samples can be sent to raw samples event hub 1310, whereas duplicate samples may be discarded. In some embodiments, step 1308 is deployed on Azure using Azure Worker Roles. Step 1308 can include checking for duplicate samples in local storage 514 and hosted storage 516 as well as the samples that are currently in raw samples event hub 1310.

In some embodiments, the deduplication process in step 1308 removes all duplicate data samples such that only a single unique copy of each data sample remains. Removing all duplicate samples may ensure that aggregate operations produce accurate aggregate values. In other embodiments, the deduplication process in step 1308 is configured to remove most, but not all, duplicate samples. For example, the deduplication process can be implemented using a Bloom filter, which allows for the possibility of false posi-tives but not false negatives. In step 1308, a false positive can be defined as a non-duplicate new or updated sample. Accordingly, some duplicates may be flagged as non-dupli-cate, which introduces the possibility that some duplicate samples may not be properly identified and removed. The deduplicated raw samples can be sent to raw samples event hub 1310.

Workflow 1300 is shown to include storing the raw samples (step 1312). Step 1312 can include accepting the raw samples from raw samples event hub 1310 and pushing the raw samples to persistent storage. In some embodiments, step 1312 is deployed on Azure using Azure Worker Roles. The worker role may generate requests at a rate based on X % of the capacity of the storage. For example, if the capacity of the storage is 10,000 storage units and X % is 20% (e.g., 20% of the storage throughput is reserved for sample writes), and each write takes 5 storage units, step 1312 may generate a total of 400 writes per second $$\left(\text{i.e., } \frac{10,000*20\%}{5} = 400\right).$$

Workflow 1300 is shown to include generating an event trigger DAG (step 1314). Step 1314 can be performed by executing an event trigger DAG process. Step 1314 may include accepting events (samples) from raw samples event hub 1310. For each sample event, step 1314 may include identifying the timeseries ID of the sample and accessing the timeseries collection to obtain the DAG for the corresponding timeseries. Step 1314 may include identifying each derived data timeseries generated by the DAG and each operation included in the DAG. In some embodiments, step 1314 tags each operation to indicate whether the operation should be sent to the C# engine 1332 or the Python engine 1334 for execution. While C# and Python are provided as example engines that may be utilized for operation execution, it should be understood that, in various embodiments, any engine based in any suitable programming language may be utilized. Step 1314 may include identifying and fetching any additional data (e.g., samples, timeseries, parameters, etc.) which may be necessary to perform the operations defined by the DAG. Step 1314 may generate an enriched DAG which includes the original DAG along with all the data necessary to perform the operations defined by the DAG. The enriched DAG can be sent to the DAG event hub 1318.

In some embodiments, workflow 1300 includes generating a clock trigger DAG (step 1316). Step 1316 can be performed by executing a clock trigger DAG process. Step 1316 may be similar to step 1314. However, step 1316 may be performed in response to a clock trigger rather than in response to receiving a raw sample event. The clock trigger can periodically trigger step 1316 to perform batch queries (e.g., every hour). Step 1316 may include identifying a timeseries ID specified in the clock trigger and accessing the timeseries collection to obtain the DAG for the corresponding timeseries. Step 1316 may include identifying each derived data timeseries generated by the DAG and each operation included in the DAG. In some embodiments, step 1316 tags each operation to indicate whether the operation should be sent to the C# engine 1332 or the Python engine 1334 for execution. Step 1316 may include identifying and fetching any additional data (e.g., samples, timeseries, parameters, etc.) which may be necessary to perform the operations defined by the DAG. Step 1316 may generate an enriched DAG which includes the original DAG along with all the data necessary to perform the operations defined by the DAG. The enriched DAG can be sent to the DAG event hub 1318.

DAG event hub 1318 can be configured to store enriched DAG events. Each enriched DAG event can include an enriched DAG. The enriched DAG may include a DAG for a particular timeseries along with all the data necessary to perform the operations defined by the DAG. DAG event hub 1318 can provide the enriched DAG events to step 1320.

Still referring to FIG. 13A, workflow 1300 is shown to include running the DAG (step 1320). Step 1320 can include accepting enriched DAG events from DAG event hub 1318 and running through the sequence of operations defined by the DAG. Workflow manager 622 can submit each operation in series to execution engines 1330 and wait for results before submitting the next operation. Execution engines 1330 may include a C# engine 1332, a Python engine 1334, or any other engine configured to perform the operations defined by the DAG. In some embodiments, execution engines 1330 include timeseries operators 606. When a given operation is complete, execution engines 1330 can provide the results of the operation to workflow manager 622. Workflow manager 622 can use the results of one or more operations as inputs for the next operation, along with any other inputs that are required to perform the operation. In some embodiments, the results of the operations are the derived timeseries samples. The derived timeseries samples can be provided to derived timeseries event hub 1322.

Derived timeseries event hub 1322 can be configured to store derived timeseries sample. Each derived timeseries sample may include a sample of a derived timeseries. The derived timeseries may include the results of the operations performed by execution engines 1330. Derived timeseries event hub 1322 can provide the derived timeseries samples to step 1324.

Workflow 1300 is shown to include storing the derived timeseries samples (step 1324). Step 1324 can include accepting derived timeseries samples from derived timeseries event hub 1322 and storing the derived timeseries samples in persistent storage (e.g., local storage 514, hosted storage 516). In some embodiments, step 1324 is deployed on Azure using Azure Worker Roles. The worker role may generate requests at a rate based on Y % of the capacity of the storage. For example, if the capacity of the storage is 10,000 storage units and Y % is 50% (e.g., 50% of the storage throughput is reserved for sample writes), and each write takes 5 storage units, step 1324 may generate a total of 1,000 writes per second $$\left(\text{i.e., } \frac{10,000 * 50\%}{5} = 1,000\right).$$

Referring now to FIG. 13B, a flowchart of a process 1350 for obtaining and processing timeseries data is shown, according to an exemplary embodiment. Process 1350 can be performed by workflow manager 622 in combination with other components of timeseries service 528. Process 1350 is shown to include obtaining samples of a timeseries from timeseries storage (step 1352). Step 1352 may include obtaining raw data samples and/or derived data samples via timeseries storage interface 616. The samples of the timeseries may be obtained from local storage 514, hosted storage 516, or received in real-time from a sensor or other device that generates the samples. Step 1352 can include loading the entire timeseries or a subset of the samples of the timeseries into local memory. For example, some of the samples of the timeseries may be stored in local memory (e.g., past 48 hours) whereas the remainder of the samples of the timeseries can be stored in local storage 514 or hosted storage 516.

Process 1350 is shown to include handling a post-sample request (PSR) associated with the timeseries (step 1354). The PSR may be obtained from a PSR collection via timeseries storage interface 616. The PSR can be used to provide status updates to the user for a specific timeseries ID. In some embodiments, step 1354 includes receiving a PSR and determining whether the PSR contains more than one timeseries ID. In response to a determination that the PSR contains more than one timeseries ID, step 1354 may include breaking the PSR into multiple PSRs, each of which is limited to a single timeseries ID. The PSRs can be provided to PSR event hub 1306 and stored as PSR events. Each PSR event may include a PSR for one timeseries ID. In some embodiments, each PSR event is stored in the form "TimeseriesID: Timestamp."

Process 1350 is shown to include deduplicating samples of the timeseries (step 1356). Step 1356 may be performed by executing a deduplication process. In some embodiments, the deduplication process includes accepting PSR events from PSR event hub 1306 and splitting each PSR into a list of samples. Step 1356 may include tagging each sample as a new sample, an updated sample, or a duplicate sample. New samples and updated samples can be sent to raw samples event hub 1310, whereas duplicate samples may be discarded. In some embodiments, step 1356 is deployed on Azure using Azure Worker Roles. Step 1356 can include checking for duplicate samples in local storage 514 and hosted storage 516 as well as the samples that are currently in raw samples event hub 1310.

In some embodiments, the deduplication process in step 1356 removes all duplicate data samples such that only a single unique copy of each data sample remains. Removing all duplicate samples may ensure that aggregate operations produce accurate aggregate values. In other embodiments, the deduplication process in step 1356 is configured to remove some, but not all, duplicate samples. For example, the deduplication process can be implemented using a Bloom filter, which allows for the possibility of false positives but not false negatives. In step 1356, a false positive can be defined as a non-duplicate new or updated sample. Accordingly, some duplicates may be flagged as non-duplicate, which introduces the possibility that some duplicate samples may not be properly identified and removed. The deduplicated samples can be sent to raw samples event hub 1310.

Still referring to FIG. 13B, process 1350 is shown to include identifying one or more stored DAGs that use the timeseries as an input (step 1358). Step 1358 can include obtaining the stored DAGs via timeseries storage interface 616 and identifying the required timeseries inputs of each DAG. For each DAG that uses the timeseries as an input, process 1350 can identify the timeseries processing operations defined by the DAG (step 1360). The timeseries processing operations can include data cleansing operations, data aggregation operations, timeseries adding operations, virtual point calculation operations, or any other type of operation that can be applied to one or more input timeseries.

Process 1350 is shown to include identifying and obtaining samples of any timeseries required to perform the timeseries processing operations (step 1362). The timeseries can be identified by inspecting the inputs required by each of the timeseries processing operations identified in step 1360. For example, DAG 1000 in FIG. 10A is shown to include both "Timeseries ID: 123" and "Timeseries ID: 456" as required inputs. Assuming that samples of the timeseries ID 123 are obtained in step 1352, DAG 1000 can be identified in step 1358 as a DAG that uses the timeseries ID 123 as an input. The timeseries identified in step 1362 can include timeseries ID 123, timeseries ID 456, or any other timeseries used as an input to DAG 1000. Step 1362 may include identifying and fetching any additional data (e.g., samples, timeseries, parameters, etc.) which may be necessary to perform the operations defined by the DAG.

In some embodiments, the samples obtained in step 1362 are based on the timeseries processing operations defined by the DAG, as well as the timestamps of the original samples obtained in step 1352. For example, the DAG may include a data aggregation operation that aggregates a plurality of data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the samples obtained in step 1352.

Step 1362 can include using the DAG to identify the duration of the time window (e.g., an hour, a day, a week, etc.) over which the data aggregation operation will be performed. Step 1362 can include using the timestamps of the data samples obtained in step 1352 identify the location of the time window (i.e., the start time and the end time). Step 1362 can include setting the start time and end time of the time window such that the time window has the identified duration and includes the timestamps of the data samples obtained in step 1352. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries. Once the appropriate time window has been set and the other input timeseries are identified, step 1362 can obtain samples of any input timeseries to the DAG that have timestamps within the appropriate time window. The input timeseries can include the original timeseries identified in step 1352 and any other timeseries used as input to the DAG.

Process 1350 is shown to include generating an enriched DAG including the original DAG and all timeseries samples used to perform the timeseries processing operations (step 1364). The original DAG may be the DAG identified in step 1358. The timeseries samples required to perform the timeseries processing operations may include any of the timeseries samples obtained in step 1362. In some embodiments, step 1364 includes identifying each derived data timeseries generated by the DAG and each operation included in the DAG. In some embodiments, step 1364 tags each operation to indicate a particular execution engine (e.g., C# engine 1332, Python engine 1334, etc.) to which the processing operation should be sent for execution.

Process 1350 is shown to include executing the enriched DAG to generate one or more derived timeseries (step 1366). Step 1366 can include submitting each timeseries processing operation in series to execution engines 1330 and waiting for results before submitting the next operation. When a given operation is complete, execution engines 1330 can provide the results of the operation to workflow manager 622. Process 1350 can use the results of one or more operations as inputs for the next operation, along with any other inputs that are required to perform the operation. In some embodiments, the results of the operations are the derived timeseries samples.

Process 1350 is shown to include storing the derived timeseries in the timeseries storage (step 1368). The derived timeseries may include the results of the operations performed in step 1366. Step 1368 can include accepting derived timeseries samples from derived timeseries event hub 1322 and storing the derived timeseries samples in persistent storage (e.g., local storage 514, hosted storage 516). In some embodiments, step 1368 is deployed on Azure using Azure Worker Roles. The worker role may generate requests at a rate based on Y % of the capacity of the storage. For example, if the capacity of the storage is 10,000 storage units and Y % is 50% (e.g., 50% of the storage throughput is reserved for sample writes), and each write takes 5 storage units, step 1368 may generate a total of 1,000 writes per second $$\left(\text{i.e., } \frac{10,000 * 50\%}{5} = 1,000\right).$$

Streaming Data Processing

Figure 14:
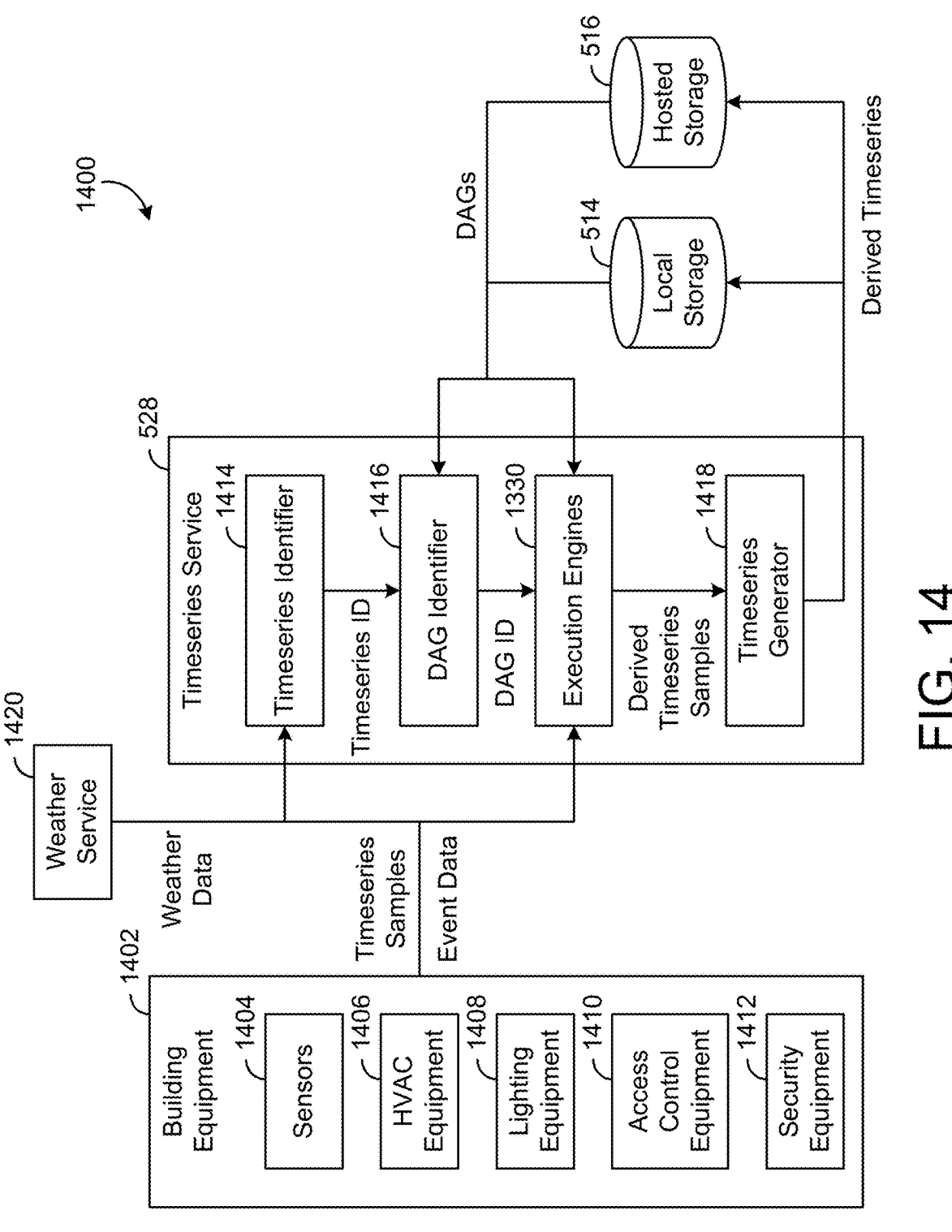
FIG. 14 is a block diagram of a system for processing streaming data, which may be implemented as part of the BMS of FIG. 5, according to some embodiments.

Referring now to FIG. 14, a system 1400 for processing streaming data is shown, according to an exemplary embodiment. System 1400 can be implemented as part of BMS 500 and may include various systems or devices installed within a building. For example, system 1400 is shown to include building equipment 1402, timeseries service 528, a weather service 1420, local storage 514, and hosted storage 516.

Building equipment 1402 may include any of a variety of equipment configured to automatically monitor or control various building functions. In some embodiments, building equipment 1402 include some or all of the components of building subsystems 428, as described with reference to FIG. 4. For example, building equipment 1402 may include a building electrical subsystem 434, an information communication technology (ICT) subsystem 436, a security subsystem 438, a HVAC subsystem 440, a lighting subsystem 442, a lift/escalators subsystem 432, and/or a fire safety subsystem 430. In various embodiments, building equipment 1402 can include fewer, additional, or alternative subsystems. For example, building equipment 1402 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building equipment 1402 include waterside system 200 and/or airside system 300, as described with reference to FIGS. 2-3.

Building equipment 1402 are shown to include sensors 1404, HVAC equipment 1406, lighting equipment 1408, access control equipment 1410, and security equipment 1412. Sensors 1404 can include temperature sensors, humidity sensors, lighting sensors, flow sensors, pressure sensors, or any other type of sensor configured to measure a variable of interest. HVAC equipment 1406 can include many of the same components as HVAC system 100, as described with reference to FIGS. 1-3. For example, HVAC equipment 1406 can include a chiller, a boiler, any number of air handling units, economizers, field controllers, supervisory controllers, actuators, temperature sensors, and other devices for controlling the temperature, humidity, airflow, or other variable conditions within building 10. Lighting equipment 1408 can include any number of light fixtures, ballasts, lighting sensors, dimmers, or other devices configured to controllably adjust the amount of light provided to a building space. Access control equipment 1410 can include electronic locks, keypads, card readers, biometric readers, or any other type of equipment configured to control access to a space in or around a building. Security equipment 1412 can include occupancy sensors, video surveillance cameras, digital video recorders, video processing servers, intrusion detection devices, access control devices and servers, or other security-related devices.

Building equipment 1402 are shown providing timeseries samples and event data to timeseries service 528. Timeseries samples can include measurements obtained by sensors 1404. For example, sensors 1404 can collect various types of measurements and send the measurements to timeseries service 528. In some embodiments, each measurement includes a measured value indicating a value of the measured variable and a timestamp indicating a time at which the variable was measured. Timeseries samples may also include monitored variables or states of HVAC equipment 1406, lighting equipment 1408, access control equipment 1410, and security equipment 1412. For example, building equipment 1402 may store internal variables that represent equipment states (e.g., lighting on/off, door open/closed, chiller operating at 50% capacity, etc.). Each timeseries sample may include a values of a particular variable or state and a timestamp indicating a time at which the variable or state was observed.

Event data may include any type of data describing various events observed by building equipment 1402. Each sample of event data may include a description or indication of the event and a timestamp indicating when the event occurred. For example, event data may include badge access events that occur when a person scans an ID badge at a card reader of access control equipment 1410 (e.g., a particular badge was scanned at a particular card reader at a particular time). Event data may include security events generated by security equipment 1412 (e.g., intruder detected at south entrance). Event data may include alarms or faults detected by HVAC equipment 1404, lighting equipment 1406, and/or other types of building equipment 1402 (e.g., a particular fault occurred within a particular device of HVAC equipment 1406 at a particular time).

Weather service 1420 is shown providing weather data to timeseries service 528. Weather data may include samples of various weather-related variables observed by weather service 1420. For example, weather data can include temperature data, humidity data, precipitation data, wind speed data, cloud position data, atmospheric pressure data, and/or other types of weather-related variables. Weather data can include current values of the weather-related variables, past values of the weather-related variables (e.g., historical values), and/or future values of the weather-related variables (e.g., predicted or estimated values). Each sample of the weather data may include a value of a particular weather-related variable and a timestamp indicating a time at which the corresponding value was observed or a time for which the corresponding value is predicted.

Timeseries service 528 is shown to include a timeseries identifier 1414, a DAG identifier 1416, execution engines 1330, and a timeseries generator 1418. Timeseries identifier 1414 can receive the timeseries samples and event data from building equipment 1402 and the weather data from weather service 1420. Timeseries identifier 1414 can identify a timeseries associated with each incoming data sample. The identified timeseries for a particular data sample may be a raw data timeseries stored in local storage 514 or hosted storage 516 that contains a series of values for the same variable or data source. For example, timeseries can be stored in the following format:

$$[\langle key, timestamp_1, value_1 \rangle, \langle key, timestamp_2, value_2 \rangle, \\ \langle key, timestamp_3, value_3 \rangle]$$

where key is an identifier of the source of the data samples (e.g., timeseries ID, sensor ID, etc.), $timestamp_i$ identifies a time associated with the ith sample, and $value_1$ indicates the value of the ith sample. Timeseries identifier 1414 can use attributes of the incoming data samples (e.g., data source, sensor ID, variable ID, etc.) to identify a particular timeseries associated with each sample and can provide the identified timeseries ID to DAG identifier 1416.

DAG identifier 1416 can use the timeseries ID received from timeseries identifier 1414 to identify one or more DAGs that use the identified timeseries as an input. As described above, a DAG may be a predefined sequence of processing operations that transform one or more input timeseries into one or more output timeseries. Accordingly, each DAG may have one or more input timeseries associated therewith. In some embodiments, the input timeseries for each DAG are stored as attributes of the DAG in local storage 514 or hosted storage 516. DAG identifier 1416 can read such information from local storage 514 or hosted storage 516 to determine which of the stored DAGs use the identified timeseries as an input. DAG identifier 1416 can then provide an indication of the identified DAGs to execution engines 1330 in the form of one or more DAG IDs.

As described above, execution engines 1330 can include a C# engine 1332, a Python engine 1334, or any other engine configured to perform the operations defined by a DAG. In some embodiments, execution engines 1330 include timeseries operators 606. Execution engines 1330 can receive the incoming data from building equipment 1402 and weather service 1420 (i.e., the timeseries samples, event data, and weather data), as well as the DAG IDs from DAG identifier 1416. Execution engines 1330 can execute the DAGs, using the incoming data as an input, to generate derived timeseries samples. Each derived timeseries sample may be the result of a timeseries processing operation that uses an incoming data sample as an input. In some embodiments, each derived timeseries sample includes a key (e.g., a timeseries ID), a timestamp, and a value.

One type of derived timeseries sample is a virtual point sample. Execution engines 1330 can calculate virtual data points by applying any of a variety of mathematical operations or functions to actual data points or other virtual data points. For example, execution engines 1330 can calculate a virtual data point ($pointID_3$) by adding two or more actual data points ($pointID_1$ and $pointID_2$) (e.g., $pointID_3=pointID_1+pointID_2$). As another example, execution engines 1330 can calculate an enthalpy data point ($pointID_4$) based on a measured temperature data point ($pointID_5$) and a measured pressure data point ($pointID_6$) (e.g., $pointID_4=enthalpy(pointID_5, pointID_6)$). In some instances, a virtual data point can be derived from a single actual data point. For example, execution engines 1330 can calculate a saturation temperature ($pointID_7$) of a known refrigerant based on a measured refrigerant pressure ($pointID_8$) (e.g., $pointID_7=T_{sat}(pointID_8)$).

Another type of derived timeseries sample is a virtual weather point sample. Execution engines 1330 can calculate values of virtual weather point samples by applying the timeseries processing operations defined by a DAG to the incoming weather data. For example, execution engines 1330 can perform weather-based calculations using the incoming weather data to generate values for weather-related variables such as cooling degree days (CDD), heating degree days (HDD), cooling energy days (CED), heating energy days (HED), and normalized energy consumption. These and other examples of weather-related derived timeseries samples are described in detail with reference to weather point calculator 612.

Another type of derived timeseries sample is a sample of a fault detection timeseries. Execution engines 1330 can evaluate fault detection rules defined by a DAG to detect faults in the incoming data. For example, execution engines 1330 can apply the fault detection rules to the input timeseries samples to determine whether each sample of the input timeseries qualifies as a fault. In some embodiments, each derived timeseries sample includes a timestamp and a fault detection value. The timestamp can be the same as the timestamp of the corresponding data sample of the input timeseries. The fault detection value can indicate whether the corresponding data sample of the data timeseries qualifies as a fault. For example, the fault detection value can have a value of "Fault" if a fault is detected and a value of "Not in Fault" if a fault is not detected in the corresponding data sample of the data timeseries.

Another type of derived timeseries sample is a sample of an abnormal event timeseries. Execution engines 1330 can evaluate abnormal event detection rules defined by a DAG to detect abnormal events in the event data. For example, execution engines 1330 can apply the abnormal event detection rules to the event data to determine whether each sample of the event data qualifies as an abnormal event. In some embodiments, each derived timeseries sample of an abnormal event timeseries includes a timestamp and an abnormal event value. The timestamp can be the same as the timestamp of the corresponding sample of the event data. The abnormal event value can indicate whether the corresponding sample of the event data is normal or abnormal. For example, the abnormal event value can have a value of "Abnormal" if the event meets the criteria for abnormal events and a value of "Normal" if the event does not meet the criteria for abnormal events.

In some embodiments, an event is considered abnormal if it deviates significantly from other similar events (e.g., events associated with the same individual, the same space, the same equipment, etc.). For example, if the event data indicates that a particular person typically badges into a building between 8:30 AM and 9:00 AM every day, an event indicating that the person is badging into the building at 3:00 AM may be considered abnormal. Similarly, if the weather data indicates that a particular building typically experiences outdoor air temperatures between 30° F. and 40° F. during a particular month, a temperature of 60° F. during that month may be considered abnormal.

An event may be considered abnormal if it falls outside a normal range or deviates from an average or typical value for similar events by more than a threshold amount. For example, execution engines 1330 can compare a variable associated with an event (e.g., a time at which the event occurs, a temperature measurement, etc.) with an average or median value of the variable for similar events. If the difference between the variable and the average or median value exceeds a threshold, execution engines 1330 may classify the event as abnormal. However, if the difference does not exceed the threshold, execution engines 1330 may classify the event as normal.

Timeseries generator 1418 can use the derived timeseries samples to generate various derived timeseries. The derived timeseries can include data rollup timeseries, virtual point timeseries, weather point timeseries, fault detection timeseries, assigned state timeseries, abnormal event timeseries, and/or any other type of derived timeseries created by executing the identified DAGs. Timeseries generator 1418 can store the derived timeseries in local storage 514, hosted storage 516, or other persistent storage.

Iterative Timeseries Processing

Figures 15A, 15B:
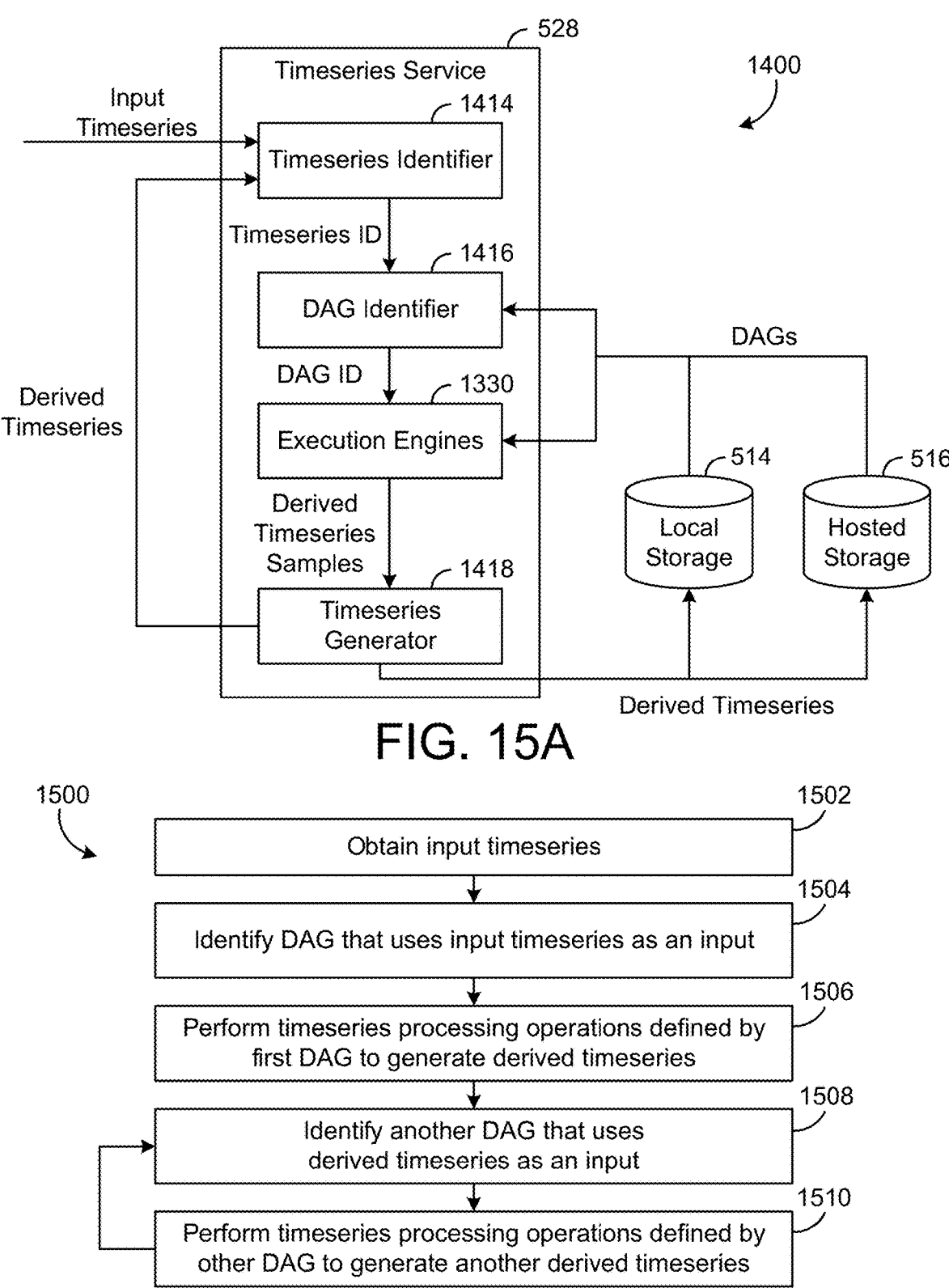
FIG. 15A is a block diagram illustrating an iterative timeseries processing technique used by the system of FIG. 14, according to some embodiments.
FIG. 15B is a flowchart of an iterative timeseries processing process which can be performed by the system of FIG. 14, according to some embodiments.

Referring now to FIG. 15A, system 1400 can be configured perform iterative timeseries processing. For example, timeseries identifier 1414 is shown receiving an input timeseries. The input timeseries can be a raw data timeseries, a derived timeseries, or a collection of timeseries samples received from building equipment 1402 or weather service 1420 in real-time (e.g., incoming streaming data). Timeseries identifier 1414 identify a timeseries ID associated with the input timeseries and can provide the timeseries ID to DAG identifier 1416.

DAG identifier 1416 can use the timeseries ID received from timeseries identifier 1414 to identify one or more DAGs that use the input timeseries as an input. As described above, a DAG may be a predefined sequence of processing operations that transform one or more input timeseries into one or more output timeseries. Accordingly, each DAG may have one or more input timeseries associated therewith. In some embodiments, the input timeseries for each DAG are stored as attributes of the DAG in local storage 514 or hosted storage 516. DAG identifier 1416 can read such information from local storage 514 or hosted storage 516 to determine which of the stored DAGs use the input timeseries as an input. DAG identifier 1416 can then provide an indication of the identified DAGs to execution engines 1330 in the form of one or more DAG IDs.

Execution engines 1330 can execute the identified DAGs, using the input timeseries as an input, to generate derived timeseries samples. Timeseries generator 1418 can then assemble the derived timeseries samples into a first derived timeseries. The first derived timeseries can be stored in local storage 514 or hosted storage 516. The first derived timeseries can also be provided as an input to timeseries identifier 1414.

Timeseries identifier 1414 can treat the first derived timeseries as an input and the entire process can be repeated. For example, timeseries identifier 1414 identifies a timeseries ID associated with the first derived timeseries and can provide the timeseries ID to DAG identifier 1416. DAG identifier 1416 can use the timeseries ID received from timeseries identifier 1414 to identify one or more DAGs that use the first derived timeseries as an input. DAG identifier 1416 can then provide an indication of the identified DAGs to execution engines 1330 in the form of one or more DAG IDs. Execution engines 1330 can execute the identified DAGs, using the first derived timeseries as an input, to generate derived timeseries samples. Timeseries generator 1418 can then assemble the derived timeseries samples into a second derived timeseries. The second derived timeseries can be stored in local storage 514 or hosted storage 516.

Referring now to FIG. 15B, a flowchart of an iterative timeseries processing process 1500 is shown, according to an exemplary embodiment. Process 1500 can be performed by one or more components of BMS 500 or system 1400 as previously described. Process 1500 is shown to include obtaining an input timeseries (step 1502) and identifying a first DAG that uses the input timeseries as an input (step 1504). Process 1500 is shown to include performing timeseries processing operations defined by the DAG to generate a derived timeseries (step 1506). The derived timeseries can be stored in local storage 514 or hosted storage 516.

The derived timeseries can then be treated as an input to timeseries service 528. For example, process 1500 is shown to include identifying another DAG that uses the derived timeseries as an input (step 1508) and performing timeseries processing operations defined by the other DAG to generate another derived timeseries (step 1510). In some embodiments, the DAG that uses the derived timeseries as an input is different from the first DAG that uses the input timeseries as an input. The derived timeseries created in step 1510 can be stored in local storage 514 or hosted storage 516.

The derived timeseries created in step 1510 can also be treated as another input to timeseries service 528. Steps 1508-1510 can be repeated iteratively until the timeseries created in the most recent iteration of step 1510 is not used as an input to any of the DAGs. Each iteration of steps 1508-1510 may generate another derived timeseries which can be stored in local storage 514 or hosted storage 516.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A building system, comprising:
   a directed acyclic graph (DAG) database storing a plurality of DAGs defining processing workflows; and
   one or more non-transitory computer-readable media having instructions stored thereon that, when executed by one or more processors, cause the one or more processors to:
      receive a time correlated data stream from a data source;
      identify a DAG of the DAG database that uses the time correlated data stream as an input to derive a data rollup comprising a plurality of aggregated values formed from aggregating values of the time correlated data stream in predefined intervals, identifying the DAG including determining that the DAG of the plurality of DAGs stored in the DAG database uses the time correlated data stream as the input, wherein the DAG defines one or more processing operations of a processing workflow to be applied to the time correlated data stream;
      determining a frequency at which the data rollup is queried to be displayed on a user device;
      determining that the frequency is greater than a threshold;
      responsive to determining that the frequency is greater than the threshold, generate, the data rollup based on the DAG and the time correlated data stream without waiting to receive a query to display graphic data on the user device including the data rollup; and
      generate the graphic data to display the data rollup on the user device without aggregating the time correlated data stream in response to receiving the query to display the graphic data on the user device.

2. The building system of claim 1, wherein the instructions cause the one or more processors to:
   identify a second DAG of the DAG database that uses the data rollup as an input to derive a second data rollup by determining whether any of the plurality of DAGs stored in the DAG database use the data rollup as an input, wherein the second DAG defines one or more processing operations of a second processing workflow to be applied to the data rollup; and
   generate the second data rollup based on the second DAG and the data rollup.

3. The building system of claim 1, wherein the data rollup is a timeseries.

4. The building system of claim 1, wherein the instructions cause the one or more processors to:
   store the data rollup in a database.

5. The building system of claim 1, wherein the instructions cause the one or more processors to:
   collect, from building equipment, samples of one or more data points of the building equipment;
   generate the time correlated data stream to include the samples; and
   generate the data rollup according to the DAG by:
      performing the one or more processing operations defined by the DAG on at least some of the samples to generate a set of derived samples; and
      storing the set of derived samples in the time correlated data stream.

6. The building system of claim 1, wherein the instructions cause the one or more processors to:
   generate the data rollup according to the processing workflow based on data received from building equipment, wherein the building equipment include at least one of a sensor, heating, ventilation, and air conditioning (HVAC) equipment, lighting equipment, access control equipment, or security equipment.

7. The building system of claim 1, wherein the instructions cause the one or more processors to:
   identify one or more other timeseries to be used as inputs to the DAG; and
   generate an enriched event comprising the DAG, the time correlated data stream, and the one or more other timeseries.

8. The building system of claim 1, wherein the instructions cause the one or more processors to generate the data rollup by:
   transforming one or more samples of an input time correlated data streams into one or more samples of a first set of derived samples by applying the one or more samples of the input time correlated data streams as an input to the processing workflow of the DAG; and
   assembling the first set of derived samples to form the data rollup.

9. The building system of claim 1, wherein the DAG defines a first timeseries processing workflow and one or more first processing operations of the DAG are timeseries processing operations;
   wherein a second DAG of the plurality of DAGS defines a second timeseries processing workflow and the one or more processing operations of the second DAG are timeseries processing operations.

10. The building system of claim 1, wherein the instructions cause the one or more processors to:
   identify a second DAG of the plurality of DAGS that uses the data rollup as an input, wherein the second DAG defines the one or more processing operations to be applied to samples of the data rollup; and
   generate a second data rollup by performing the one or more processing operations defined by the second DAG, the second data rollup comprising a second set of derived samples.

11. The building system of claim 1, wherein the instructions cause the one or more processors to generate a second data rollup by:
   transforming one or more samples of a first set of derived samples of the data rollup into one or more samples of a second set of derived samples by applying the one or more samples of the first set of derived samples as an input to a second DAG of the plurality of DAGS; and assembling the second set of derived samples to form the second data rollup.

12. A method, comprising:

storing, by one or more processing circuits, a plurality of directed acyclic graphs (DAGs) in a DAG database, the plurality of DAGs defining processing workflows;

receiving, by the one or more processing circuits, a time correlated data stream from a data source;

identifying, by the one or more processing circuits, a DAG of the DAG database that uses the time correlated data stream as an input to derive a data rollup comprising a plurality of aggregated values formed from aggregating values of the time correlated data stream in predefined intervals, identifying the DAG including determining that the DAG of the plurality of DAGs stored in the DAG database uses the time correlated data stream as an input, wherein the DAG defines one or more processing operations of a processing workflow to be applied to the time correlated data stream;

determining a frequency at which the data rollup is queried to be displayed on a user device;

determining that the frequency is greater than a threshold;

responsive to determining that the frequency is greater than the threshold, generating, by the one or more processing circuits, the data rollup based on the DAG and the time correlated data stream without waiting to receive a query to display graphic data on the user device including the data rollup; and generating, by the one or more processing circuits, the graphic data to display the data rollup on the user device without aggregating the time correlated data stream in response to receiving the query to display the graphic data on the user device.

13. The method of claim 12, comprising:

identifying, by the one or more processing circuits, a second DAG of the DAG database that uses the data rollup as an input to derive a second data rollup by determining whether any of the plurality of DAGs stored in the DAG database use the data rollup as an input, wherein the second DAG defines one or more processing operations of a second processing workflow to be applied to the data rollup; and generating, by the one or more processing circuits, the second data rollup based on the second DAG and the data rollup.

14. The method of claim 12, comprising:

collecting, by the one or more processing circuits, from building equipment, samples of one or more data points of the building equipment;

generating, by the one or more processing circuits, the time correlated data stream to include the samples; and generating, by the one or more processing circuits, the data rollup according to the DAG by:

performing the one or more processing operations defined by the DAG on at least some of the samples to generate a set of derived samples; and storing the set of derived samples in the time correlated data stream.

15. The method of claim 12, comprising:

generating, by the one or more processing circuits, the data rollup according to the processing workflow based on data received from building equipment, wherein the building equipment include at least one of a sensor, heating, ventilation, and air conditioning (HVAC) equipment, lighting equipment, access control equipment, or security equipment.

16. The method of claim 12, comprising:

identifying, by the one or more processing circuits, one or more other timeseries to be used as inputs to the DAG; and generating, by the one or more processing circuits, an enriched processing workflow comprising the DAG, an input time correlated data streams, and the one or more other timeseries.

17. The method of claim 12, comprising:

generating, by the one or more processing circuits, the data rollup by:

transforming one or more samples of an input time correlated data streams into one or more samples of a first set of derived samples by applying the one or more samples of the input time correlated data streams as an input to the processing workflow of the DAG; and assembling the first set of derived samples to form the data rollup.

18. One or more non-transitory storage media storing instructions thereon, that, when executed by one or more processors, cause the one or more processors to perform operations, comprising:

storing a plurality of directed acyclic graphs (DAGs) in a DAG database, the plurality of DAGs defining processing workflows;

receiving a time correlated data stream from a data source;

identifying a DAG of the DAG database that uses the time correlated data stream as an input to derive a data rollup comprising a plurality of aggregated values formed from aggregating values of the time correlated data stream in predefined intervals, identifying the DAG including determining that the DAG of the plurality of DAGs stored in the DAG database uses the time correlated data stream as an input, wherein the DAG defines one or more processing operations of a processing workflow to be applied to the time correlated data stream;

determining a frequency at which the data rollup is queried to be displayed on a user device;

determining that the frequency is greater than a threshold;

responsive to determining that the frequency is greater than the threshold, generating, the data rollup based on the DAG and the time correlated data stream without waiting to receive a query to display graphic data on the user device including the data rollup; and generating the graphic data to display the data rollup on the user device without aggregating the time correlated data stream in response to receiving the query to display the graphic data on the user device.

19. The one or more non-transitory storage media of claim 18, the operations comprising:

collecting, from building equipment, samples of one or more data points of the building equipment;

generating the time correlated data stream to include the samples; and generating the data rollup according to the DAG by:

performing the one or more processing operations defined by the DAG on at least some of the samples to generate a set of derived samples; and storing the set of derived samples in the time correlated data stream.

20. The one or more non-transitory storage media of claim 18, the operations comprising:

identifying one or more other timeseries to be used as inputs to the DAG; and generating an enriched processing workflow comprising the DAG, an input time correlated data streams, and the one or more other timeseries.

\* \* \* \* \*